(12) United States Patent
Jin et al.

(10) Patent No.: US 12,496,588 B2
(45) Date of Patent: Dec. 16, 2025

(54) FOOD WASTE DISPOSER

(71) Applicant: SAMSUNG ELECTRONICS CO., LTD., Suwon-si (KR)

(72) Inventors: Yongjie Jin, Suwon-si (KR); Daegeon Kim, Suwon-si (KR); Namsoo Park, Suwon-si (KR); Wonyoung Seo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 410 days.

(21) Appl. No.: 18/313,045

(22) Filed: May 5, 2023

(65) Prior Publication Data

US 2024/0009677 A1 Jan. 11, 2024

Related U.S. Application Data

(63) Continuation of application No. PCT/KR2023/005639, filed on Apr. 26, 2023.

(30) Foreign Application Priority Data

Jul. 6, 2022 (KR) .................. 10-2022-0083391
Aug. 31, 2022 (KR) .................. 10-2022-0110360

(51) Int. Cl.
*B02C 18/00* (2006.01)
*B02C 18/22* (2006.01)

(52) U.S. Cl.
CPC ...... *B02C 18/0092* (2013.01); *B02C 18/2216* (2013.01); *B02C 2201/06* (2013.01)

(58) Field of Classification Search
CPC .................. B02C 18/0084; B02C 18/0092
See application file for complete search history.

(56) References Cited

U.S. PATENT DOCUMENTS 4,973,002 A * 11/1990 Waller ............... B02C 18/0092
241/46.17
8,267,339 B2 * 9/2012 Park ..................... F26B 1/005
241/73

(Continued)

FOREIGN PATENT DOCUMENTS

KR          100212208 B1    8/1999
KR      10-2001-0035154 A   5/2001
(Continued)

OTHER PUBLICATIONS

International Search Report and Written Opinion of the International Searching Authority dated Aug. 21, 2023, in connection with International Application No. PCT/KR2023/005639, 10 pages.

*Primary Examiner* — Matthew Katcoff

(57) ABSTRACT

A food waste disposer includes a housing, a grinding case inside the housing to dispose of food waste, a valve assembly mounted to a lower portion of the grinding case, and a driving device arranged on one side of the valve assembly to operate the valve assembly. The grinding case includes a discharge hole formed on a bottom surface. The valve assembly includes a valve member configured to open or close the discharge hole. The driving device includes: a driving motor to generate power; a power transmission member connected to the driving motor and configured to be moved in a first direction and a second direction opposite to the first direction; a holding member that rotates based on the movement of the power transmission member and connects to the valve member to guide an open or closed state of the valve member; and a sensor in contact with the power transmission member.

20 Claims, 31 Drawing Sheets

(56) References Cited

U.S. PATENT DOCUMENTS

| | | | |
|---|---|---|---|
| 9,308,535 B2* | 4/2016 | Delgado | B02C 18/0084 |
| 10,906,046 B2* | 2/2021 | Crepeau | C05F 17/90 |
| 10,995,042 B2* | 5/2021 | Atkinson | C05F 17/907 |
| 11,235,297 B2* | 2/2022 | Atkinson | B02C 18/24 |
| 12,251,705 B2* | 3/2025 | Maxwell | B01D 46/4227 |
| 12,330,165 B2* | 6/2025 | Kim | F26B 9/08 |
| 2021/0039109 A1* | 2/2021 | Hoen | B02C 18/0092 |
| 2022/0242799 A1* | 8/2022 | Ying | B01D 46/0038 |
| 2023/0142555 A1* | 5/2023 | Hotte | B02C 23/26 |
| | | | 241/18 |

FOREIGN PATENT DOCUMENTS

| | | |
|---|---|---|
| KR | 100370478 B1 | 2/2003 |
| KR | 200410480 Y1 | 3/2006 |
| KR | 20070089664 A | 8/2007 |
| KR | 20080048196 A | 6/2008 |
| KR | 10-0900025 B1 | 6/2009 |
| KR | 20130006181 A | 1/2013 |
| KR | 20130142498 A | 12/2013 |
| KR | 10-1375322 B1 | 3/2014 |
| KR | 101523759 B1 | 5/2015 |
| KR | 101579963 B1 | 12/2015 |
| KR | 10-2016-0043283 A | 4/2016 |
| KR | 20160112602 A | 9/2016 |
| KR | 102152948 B1 | 9/2020 |

* cited by examiner

FOOD WASTE DISPOSER

CROSS-REFERENCE TO RELATED APPLICATION(S)

This application is a continuation application, under 35 U.S.C. § 111(a), of international application No. PCT/KR2023/005639, filed on Apr. 26, 2023, which claims priority to Korean Patent Application No. 10-2022-0083391, filed on Jul. 6, 2022, and No. 10-2022-0110360, filed on Aug. 31, 2022, in the Korean Intellectual Property Office, the disclosure of which is incorporated by reference herein in their entireties

BACKGROUND

1. Field

The disclosure relates to a food waste disposer including an improved structure.

2. Description of Related Art

Generally, a food waste disposer is a device that disposes of food waste by drying, string and grinding the food waste. The food waste disposer may include a disposal device in which food waste is dried, stirred, and grinded.

The disposal device may include a rotary grinder configured to be rotated inside a grinding case. Food waste processed by the rotary grinder may be discharged to the outside of the disposal device through a discharge hole formed in the grinding case.

In addition, the disposal device may include a valve member coupled to one side of the grinding case to open or close the discharge hole of the grinding case.

SUMMARY

Therefore, it is an aspect of the disclosure to provide a food waste disposer including an improved structure to compensate for a rotation angle of a valve member.

Additional aspects of the disclosure will be set forth in part in the description which follows and, in part, may be learned by practice of the disclosure.

SUMMARY

In accordance with an aspect of the disclosure, a food waste disposer includes a housing. The food waste disposer includes a grinding case positioned inside the housing to dispose of food waste, the grinding case including a discharge hole formed on a bottom surface. The food waste disposer includes a valve assembly mounted to a lower portion of the grinding case and including a valve member configured to open or close the discharge hole. The food waste disposer includes a driving device positioned on one side of the valve assembly to operate the valve assembly.

The driving device may include a driving motor configured to generate power. The driving device may include a power transmission member connected to the driving motor and configured to move in a first direction and a second direction opposite to the first direction. The driving device may include a holding member configured to rotate based on movement of the power transmission member, and connected to the valve member to guide an open or closed state of the valve member. The driving device may include a sensor in contact with the power transmission member.

The food waste disposer may further include a controller configured to, in response to a signal being applied to the sensor as the power transmission member is moved in the first direction and in contact with the sensor, control the driving motor for a first period of time to allow the power transmission member to be further moved in the first direction.

The driving device may further include a case to accommodate the holding member and includes an interference portion to interfere with the holding member.

The holding member may contact the interference portion in response to the power transmission member being moved in the first direction for the first period of time.

The controller may be configured to temporarily stop the driving motor after the first period of time elapses, and to control the driving motor for a second period of time to allow the power transmission member to be moved in the second direction.

The valve member connected to the holding member may be positioned at a correct position to close the discharge hole in response to the power transmission member being moved in the second direction for the second period of time.

The valve assembly may further include a valve shaft configured to connect the valve member and the holding member. The holding member may include a shaft through-groove opened upward to allow the valve shaft to be separated from the holding member in a first state in which the valve member closes the discharge hole.

The holding member may further include a holding body that accommodates the valve shaft to prevent the valve shaft from separating from the holding member in a second state in which the valve member opens the discharge hole.

The holding body may include a guide portion inclined outwardly of the shaft through-groove to guide insertion of the valve shaft.

The valve shaft may be accommodated in the shaft through-groove to be spaced apart from the holding body by a predetermined distance.

The holding member may be configured to rotate with respect to the valve shaft according to the movement of the power transmission member.

The power transmission member may include a pinion gear connected to the driving motor, and a rack gear configured to be linearly moved by engaging with the pinion gear, and connected to the holding member to rotate the holding member.

The sensor may include a detection switch protruding to be in contact with the rack gear.

The power transmission member may include a pinion gear, and a detection member protruding from the pinion gear.

The detection member may include a first detection member protruding from a first surface that is perpendicular to a rotation axis of the pinion gear, and a second detection member protruding from a second surface opposite to the first surface.

The food waste disposer may include a first sensor positioned outside the pinion gear and in contact with the first detection member, and a second sensor positioned inside the pinion gear and in contact with the second detection member.

The sensor may be a first sensor, and the sensor may further include a second sensor. The controller may be configured to, in response to a signal being applied to the second sensor as the power transmission member is moved in the second direction, control the driving motor for a third period of time to allow the power transmission member to be further moved in the second direction. In order to allow the valve member to be positioned at a correct position to open the discharge hole, the controller may be configured to temporarily stop the driving motor after the third period of time elapses, and configured to control the driving motor for a fourth period of time to allow the power transmission member to be moved in the first direction.

In accordance with an aspect of the disclosure, a food waste disposer includes a housing. The food waste disposer includes a grinding case positioned inside the housing to dispose of food waste and including a discharge hole formed on a bottom surface. The food waste disposer includes a valve assembly mounted to a lower portion of the grinding case and including a valve member configured to open or close the discharge hole, and a valve shaft connected to the valve member. The food waste disposer includes a driving device positioned on one side of the valve assembly to operate the valve assembly.

The driving device may include a driving motor configured to generate power, and a power transmission member connected to the driving motor so as to be movable. The driving device may include a holding member configured to be rotated in a first direction and a second direction opposite to the first direction based on the movement of the power transmission member, and connected to the valve member to guide an open or closed state of the valve member. The driving device may include a sensor in contact with the holding member.

The food waste disposer may include a controller configured to, in response to a signal being applied to the sensor as the holding member is rotated in the first direction and in contact with the sensor, control the driving motor for a first period of time to allow the holding member to be further moved in the first direction.

The food waste disposer may further include a case provided to accommodate the holding member and including an interference portion provided to interfere with the holding member. The holding member may include a holding body into which the valve shaft is inserted, and an extension body extending downward from the holding body so as to be in contact with the sensor and the interference portion.

By being rotated in the first direction for the first period of time, the holding member may be in contact with the extension body and the interference portion.

In accordance with an aspect of the disclosure, a food waste disposer includes a housing. The food waste disposer includes a grinding case arranged inside the housing to dispose of food waste and including a discharge hole formed on a bottom surface. The food waste disposer includes a valve assembly mounted to a lower portion of the grinding case and including a valve member configured to open or close the discharge hole, and a valve shaft connected to the valve member. The food waste disposer includes a holding member coupled to the valve shaft so as to rotate the valve member. The food waste disposer includes a power transmission member connected to the holding member. The food waste disposer includes a driving motor configured to supply power to the power transmission member. The food waste disposer includes a sensor including a detection switch provided to be pressed by the holding member or the power transmission member. The food waste disposer includes a controller configured to, in response to a signal being applied to the sensor as the detection switch is pressed, control the driving motor to generate power in the first direction for a first period of time, and then control the driving motor to generate power in a second direction, which is opposite to the first direction, for a second period of time.

The food waste disposer may further include a case provided to accommodate the holding member and including an interference portion provided to interfere with the holding member. The holding member may be in contact with the interference portion of the case in response to the expiration of the first period of time.

In accordance with one aspect of the disclosure, a driving device for operating a valve assembly of a food waste disposer, the valve assembly including a valve shaft and a valve member connected to the valve shaft, the driving device may include a driving motor configured to generate power, a power transmission member connected to the driving motor and configured to move in a first direction and a second direction opposite to the first direction, a holding member configured to rotate based on movement of the power transmission member, and to connect to the valve member to guide an open or closed state of the valve member, and a sensor in contact with the power transmission member.

The driving device may further include a case to accommodate the holding member and an interference portion to interfere with the holding member, wherein the holding member may contact the interference portion in response to the power transmission member being moved in the first direction for a first period of time.

The holding member may include a shaft through-groove opened upward to allow the valve shaft to be separated from the holding member in a first state in which the valve member is in the closed state.

The holding member may further include a holding body configured to accommodate the valve shaft that is configured to connect the valve member and the holding member and prevent the valve shaft from separating from the holding member in a second state in which the valve member is in the open state.

The holding member may be configured rotate with respect to the valve shaft according to the movement of the power transmission member.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or, the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like, and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

These and/or other aspects of the disclosure will become apparent and more readily appreciated from the following description of embodiments, taken in conjunction with the accompanying drawings of which.

DETAILED DESCRIPTION

Figure 1:
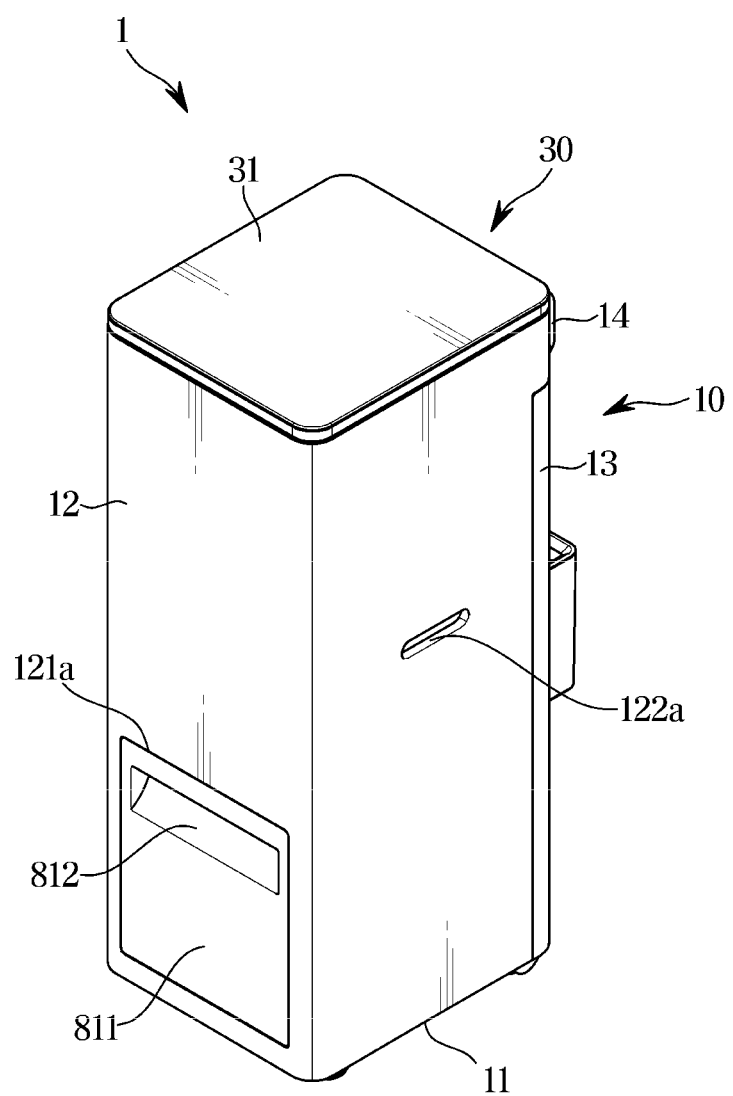
FIG. 1 is a front-perspective view of a food waste disposer according to an embodiment of the disclosure.

FIGS. 1 through 31, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Embodiments described in the disclosure and configurations illustrated in the drawings are merely examples of the embodiments of the disclosure, and may be modified in various different ways at the time of filing of the present application to replace the embodiments and drawings of the disclosure.

In addition, the same reference numerals or signs illustrated in the drawings of the disclosure indicate elements or components performing substantially the same function.

Also, the terms used herein are used to describe the embodiments and are not intended to limit and/or restrict the disclosure. The singular forms "a," "an" and "the" are intended to include the plural forms as well, unless the context clearly indicates otherwise. In this disclosure, the terms "including", "having", and the like are used to specify features, numbers, steps, operations, elements, components, or combinations thereof, but do not preclude the presence or addition of one or more of the features, elements, steps, operations, elements, components, or combinations thereof.

It will be understood that, although the terms first, second, third, etc., may be used herein to describe various elements, but elements are not limited by these terms. These terms are only used to distinguish one element from another element. For example, without departing from the scope of the disclosure, a first element may be termed as a second element, and a second element may be termed as a first element. The term of "and/or" includes a plurality of combinations of relevant items or any one item among a plurality of relevant items.

Hereinafter an embodiment according to the disclosure will be described in detail with reference to the accompanying drawings.

Figure 2:
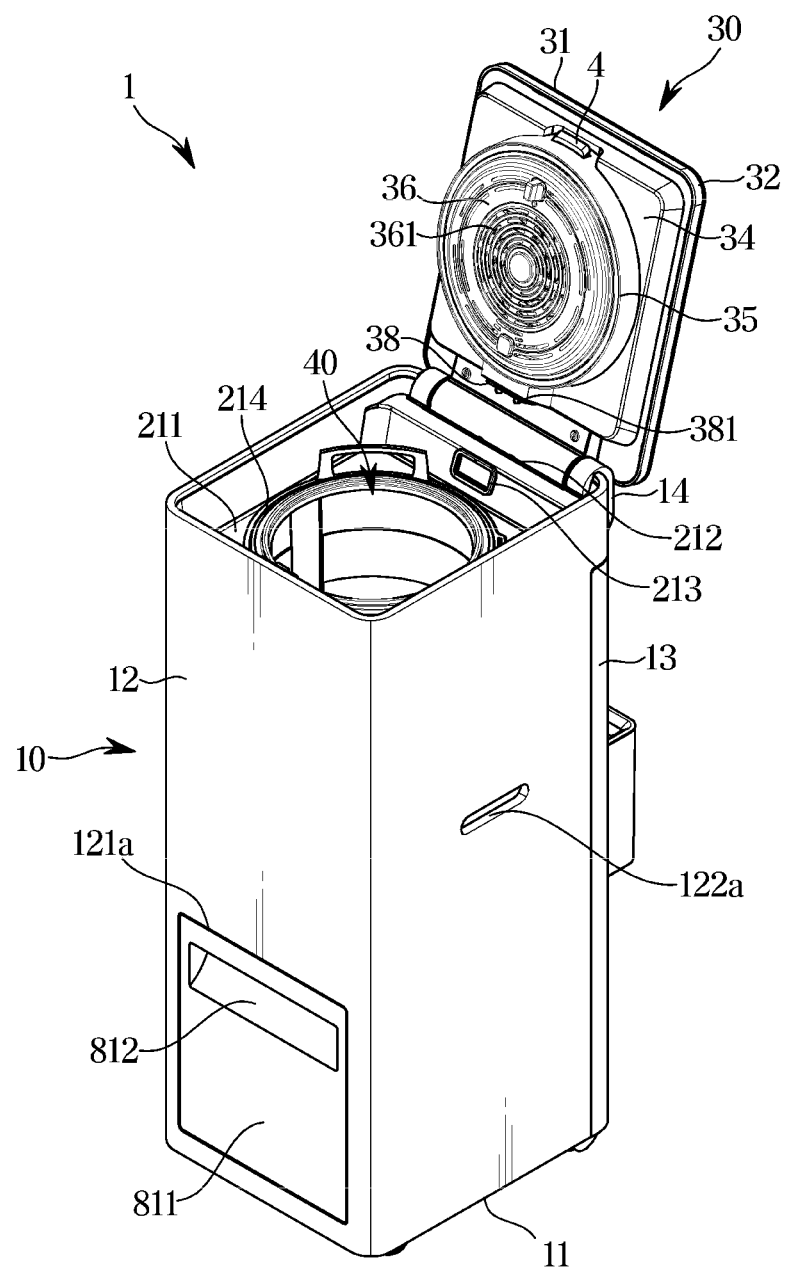
FIG. 2 is a front-perspective view illustrating a state in which a cover device of the food waste disposer according to an embodiment of the disclosure is opened.
Figure 3:
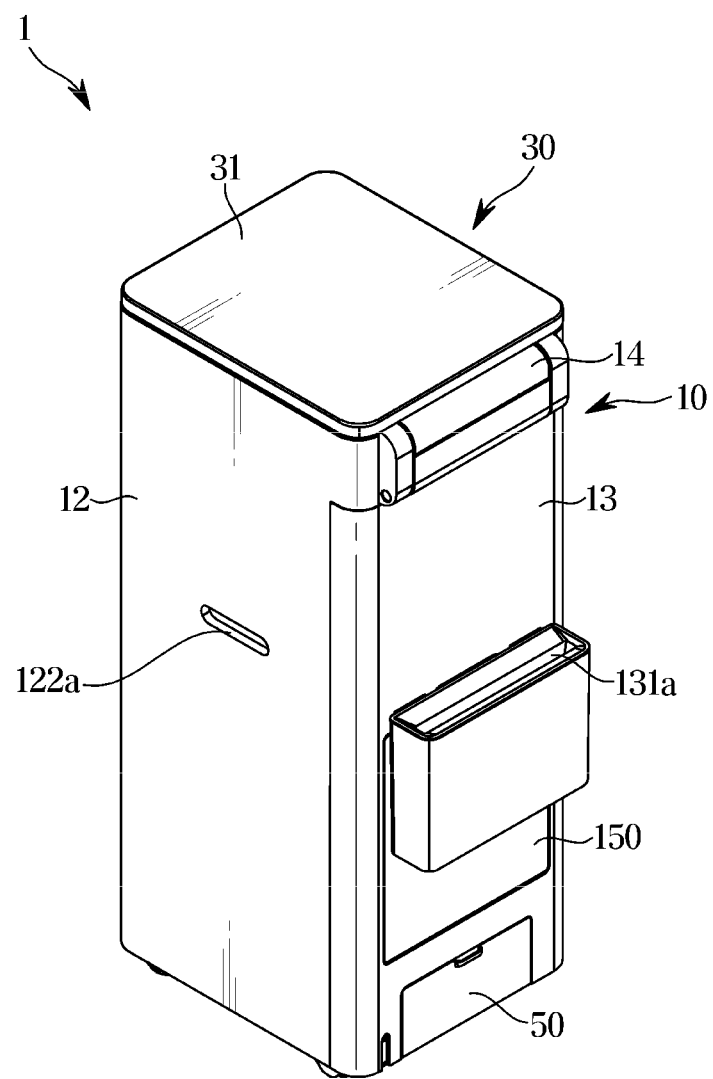
FIG. 3 is a rear-perspective view of the food waste disposer according to an embodiment of the disclosure.

FIG. 1 is a front-perspective view of a food waste disposer according to an embodiment of the disclosure. FIG. 2 is a front-perspective view illustrating a state in which a cover device of the food waste disposer according to an embodiment of the disclosure is opened. FIG. 3 is a rear-perspective view of the food waste disposer according to an embodiment of the disclosure.

Referring to FIGS. 1 to 3, a food waste disposer 1 may include a housing 10 and a cover device 30 covering an upper portion of the housing 10.

The housing 10 may form an exterior of the food waste disposer 1. For example, the housing 10 may include a base housing 11, and a first cover housing 12 and a second cover housing 13 which are arranged above the base housing 11.

The base housing 11 may form a bottom surface of the food waste disposer 1, and the first cover housing 12 and the second cover housing 13 may form side surfaces of the food waste disposer 1.

The base housing 11, the first cover housing 12, and the second cover housing 13 may be detachably coupled to each other.

It is illustrated that the first cover housing 12 and the second cover housing 13 are formed separately in FIGS. 1 to 3, but are not limited thereto. Alternatively, the first cover housing 12 and the second cover housing 13 may be integrally formed with each other.

A user or an installer can easily access various components arranged inside the food waste disposer 1 by separating the first cover housing 12 and the second cover housing 13 from the base housing 11.

The first cover housing 12 of the food waste disposer 1 may include a storage device accommodating member 121a and a housing grip 122a.

The storage device accommodating member 121a may be formed by opening a portion of a front surface of the first cover housing 12. The storage device accommodating member 121a may be provided to accommodate a storage case 81 of a storage device 80 to be described later. The storage case 81 may be provided to be inserted into or withdrawn from the storage device accommodating member 121a.

For example, the storage case 81 may slide along the front and rear direction of the food waste disposer 1 and be inserted into or withdrawn from the storage device accommodating member 121a.

A storage grip 812 provided to be gripped may be formed on a front surface of the storage case 81.

A storage body 811 of the storage case 81 may form the front surface of the storage case 81. The storage body 811 of the storage case 81 may be exposed to the outside of the food waste disposer 1 through the storage device accommodating member 121a of the first cover housing 12.

The storage grip 812 of the storage case 81 may have a shape that is recessed rearward from the front surface of the storage body 811 of the storage case 81.

Although not shown in the drawing, the storage body 811 of the storage case 81 may include a window. A user can visually check an amount of food waste collected inside the storage case 81 through the window formed of a transparent material.

The housing grip 122a of the first cover housing 12 may be formed by cutting a portion of the first cover housing 12. A user can move the position of the food waste disposer 1 by holding the food waste disposer 1 through the housing grip 122a.

The food waste disposer 1 may include a housing exhaust member 131a provided at the rear of the second cover housing 13.

The housing exhaust member 131a may be provided to communicate with a filter discharger 153 (refer to FIG. 4) of a filter assembly 150. Accordingly, air filtered inside the filter assembly 150 may be discharged to the outside of the food waste disposer 1 through the filter discharger 153 and the housing exhaust member 131a.

A water storage container 50 may be arranged under the filter assembly 150. The water storage container 50 may be detachably mounted on the base housing 11. The water storage container 50 may be provided to collect condensed water generated in a deodorizing device 100. Details thereof will be described later.

The food waste disposer 1 may include a hinge housing 14. The hinge housing 14 may be provided to connect the housing 10 and the cover device 30. For example, the hinge housing 14 may be connected to the cover device 30 and coupled to the second cover housing 13. Accordingly, the cover device 30 may be provided to be rotatable with respect to the housing 10 through the configuration of the hinge housing 14.

The cover device 30 may be configured to open or close an open upper surface of the housing 10. The cover device 30 may be rotatably mounted on the housing 10 to cover an upper portion of the housing 10.

For example, the cover device 30 may be provided to cover the open upper surfaces of the first cover housing 12 and the second cover housing 13.

The cover device 30 may be mounted on the housing 10 to cover an upper portion of a disposal device 40. The cover device 30 may be provided to transfer air in the disposal device 40 to the deodorizing device 100 in a state in which the housing 10 is closed. Details thereof will be described later.

Figure 4:
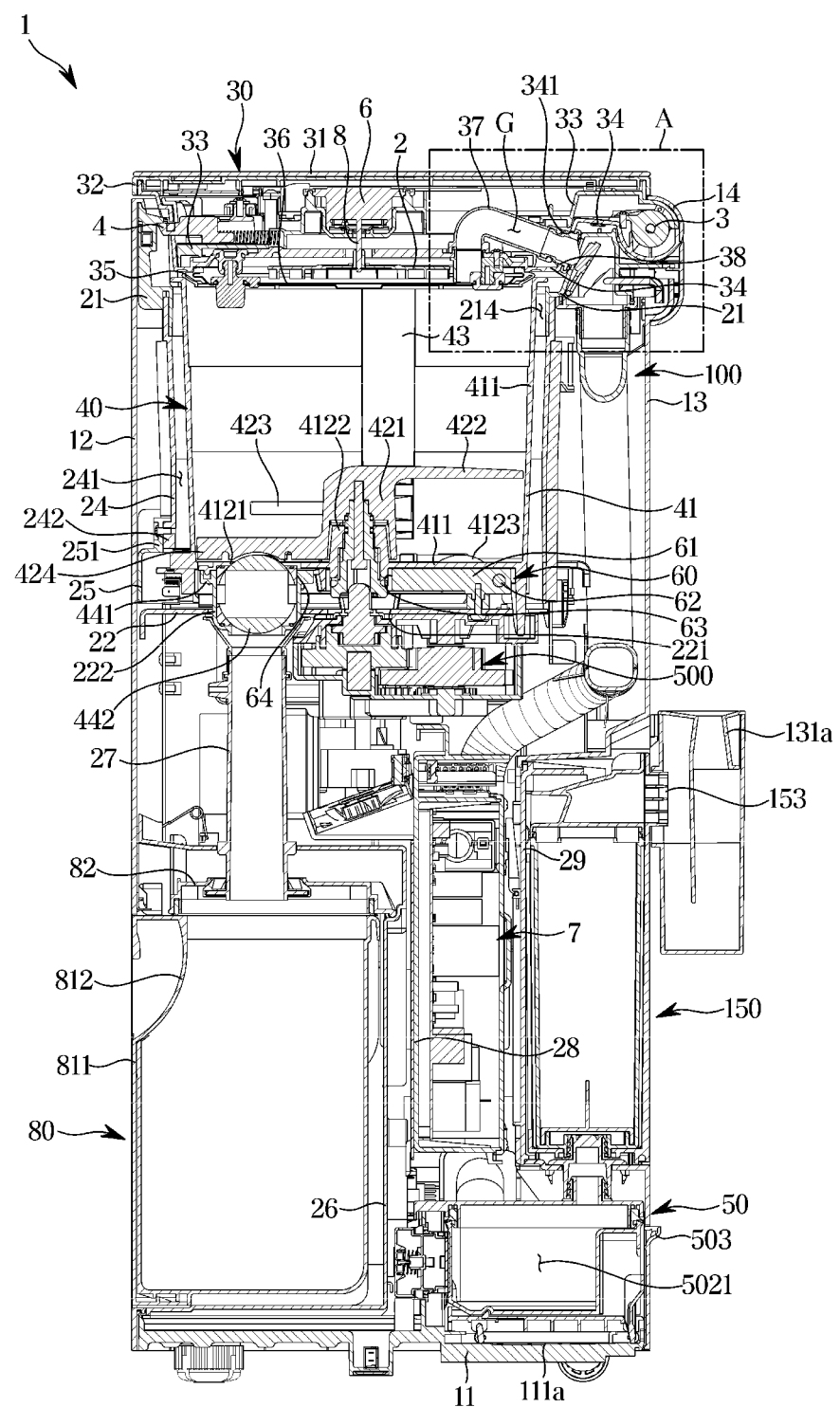
FIG. 4 is a cross-sectional view of the food waste disposer according to an embodiment of the disclosure.
Figure 5:
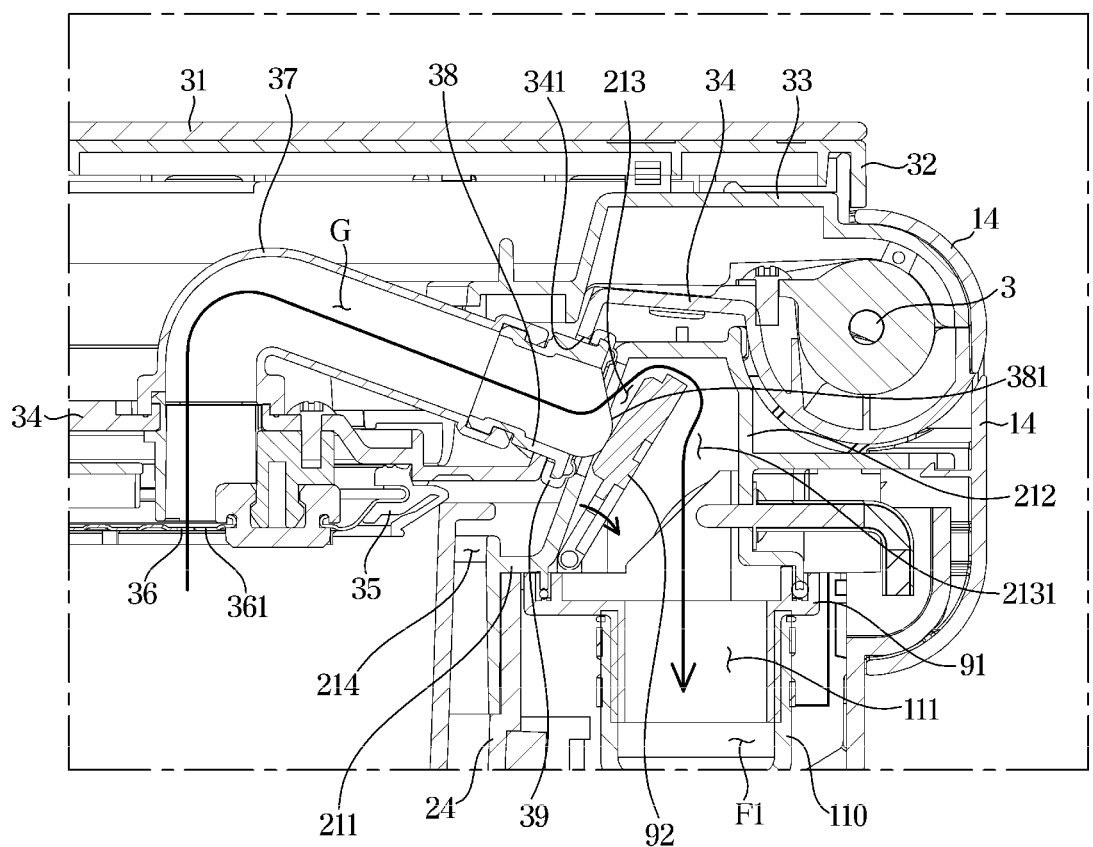
FIG. 5 is an enlarged view of part A of FIG. 4.

FIG. 4 is a cross-sectional view of the food waste disposer according to an embodiment of the disclosure. FIG. 5 is an enlarged view of part A of FIG. 4.

Hereinafter the overall configuration of the food waste disposer 1 according to an embodiment of the disclosure will be described with reference to FIGS. 1 to 5.

Referring to FIGS. 4 and 5, the food waste disposer 1 may include the cover device 30 mounted on the outside of the housing 10 to open or close the upper surface of the disposal device 40, and the disposal device 40 accommodated in the housing 10.

The cover device 30 may include a top plate 31, an upper frame 32, a middle frame 33 and a lower frame 34.

The top plate 31 may form an upper surface of the food waste disposer 1. For example, when the cover device 30 closes the upper portion of the housing 10, the top plate 31 may be provided as the upper surface of the food waste disposer 1. The top plate 31 may form an upper exterior of the food waste disposer 1.

The upper frame 32, the middle frame 33, and the lower frame 34 may be arranged under the top plate 31. The upper frame 32 may be coupled to the middle frame 33. The middle frame 33 may be coupled to the lower frame 34. The middle frame 33 may be arranged between the upper frame 32 and the lower frame 34.

A predetermined accommodation space may be formed between the upper frame 32 and the middle frame 33. A predetermined accommodation space may be formed between the middle frame 33 and the lower frame 34.

For example, the upper frame 32 and the middle frame 33 may be coupled to form a space spaced apart by a predetermined distance in a vertical direction. In addition, the middle frame 33 and the lower frame 34 may be coupled to form a space spaced apart by a predetermined distance in the vertical direction.

The cover device 30 may include a cover frame 36 and a cover gasket 35.

The cover frame 36 may form a lower surface of the cover device 30. The cover frame 36 may be provided in a size that is accommodated in a food waste inlet port arranged in an upper portion of the disposal device 40. The cover frame 36 may include an inlet hole 361 (refer to FIG. 2) through which air flows from the disposal device 40. Air inside the disposal device 40 may flow to a guide duct 37, to be described later, through the inlet hole 361 of the cover frame 36.

The cover frame 36 may be provided in a shape corresponding to the inlet port of the disposal device 40. Referring to FIG. 2, as the inlet port of the disposal device 40 is provided in a circular shape, the cover frame 36 may also be provided in a circular shape. However, the shapes of the cover frame 36 and the inlet port of the disposal device 40 are not limited thereto.

The cover gasket 35 may be arranged to cover an outer rim of the cover frame 36.

The cover gasket 35 may be provided to seal between the cover frame 36 and the inlet port of the disposal device 40. The cover gasket 35 may be provided to be in contact with an upper edge of the disposal device 40.

For example, the cover gasket 35 may be provided to prevent air, which is in the disposal device 40, from leaking out of the cover device 30 in a state in which the cover device 30 closes the upper portion of the housing 10. Accordingly, the cover gasket 35 may prevent a state in which air, which contains contaminants inside the disposal device 40, leaks out of the food waste disposer 1 without passing through the deodorizing device 100.

The cover gasket 35 may be formed of a material having a predetermined elasticity.

The cover device 30 may be configured to be rotated with respect to a cover rotation shaft 3 and relative to the housing 10. For example, the cover rotation shaft 3 may be coupled to the hinge housing 14 to allow the cover device 30 to rotatably open or close the top of the housing 10.

However, the operation of the cover device 30 is not limited thereto, and the upper portion of the housing 10 may be opened or closed in a sliding manner without a separate hinge housing 14, or the upper portion of the housing 10 may be opened or closed in a manner in which the cover device 30 is completely separated from the housing 10.

The cover device 30 may include a locking member 4.

The locking member 4 may be mounted on the middle frame 33. The locking member 4 may be provided to be elastically movable along the front and rear direction of the food waste disposer 1.

The locking member 4 may be provided to be inserted into an accommodation frame 21 to be described later. Accordingly, the locking member 4 may be provided to maintain a closed state of the cover device 30 when the cover device 30 closes the upper portion of the housing 10.

However, the shape of the locking member 4 is not limited thereto, and the locking member 4 may be provided in a hook shape to fix the position of the cover device 30.

The cover device 30 may include a circulation fan 2, a circulation fan rotation shaft 8 and a circulation fan driver 6.

The circulation fan 2 may be arranged between the middle frame 33 and the lower frame 34. The circulation fan driver 6 may be arranged between the upper frame 32 and the middle frame 33.

The circulation fan rotation shaft 8 may be provided to transmit power of the circulation fan driver 6 to the circulation fan 2 by connecting the circulation fan driver 6 and the circulation fan 2. The circulation fan rotation shaft 8 may pass through the middle frame 33 and be coupled to the circulation fan 2.

The circulation fan 2 may be provided above the disposal device 40 to allow heat inside a grinding case 41 of the disposal device 40 to be evenly distributed.

For example, as a heater 60 provided under the disposal device 40 heats the disposal device 40, food waste inside the disposal device 40 may be heated.

In the disposal device 40, food waste adjacent to the heater 60 is heated more. Therefore, heat may be non-uniformly transferred to the food waste accommodated in the disposal device 40.

Therefore, as the circulation fan 2 is arranged in the cover device 30, heat inside the disposal device 40 may be evenly circulated. In other words, the circulation fan 2 may be provided to induce convection inside the grinding case 41.

Therefore, a temperature inside the grinding case 41 may be almost uniform regardless of the position of the grinding case, and a drying efficiency of the food waste accommodated inside the grinding case 41 may be improved.

The cover device 30 may include a guide duct 37.

The guide duct 37 may be provided to penetrate the lower frame 34. The guide duct 37 may be provided to be rotated together with the cover device 30 as the cover device 30 rotates.

For example, when the cover device 30 closes the upper portion of the housing 10, one end of the guide duct 37 may be arranged to face the inside of the grinding case 41 together with the cover frame 36.

For example, when the cover device 30 closes the upper portion of the housing 10, one end of the guide duct 37 may be provided to face downward.

The guide duct 37 may be mounted inside the cover device 30. One end of the guide duct 37 may be fixed to the lower frame 34. One end of the guide duct 37 may be open toward the cover frame 36. The other end of the guide duct 37 may be coupled to a connecting duct 38 to be described later.

The guide duct 37 may extend in a curved shape. However, the shape of the guide duct 37 is not limited thereto. For example, it is sufficient that the shape of the guide duct 37 is provided to guide the air in the grinding case 41 to an exhaust pipe.

The guide duct 37 may form a guide flow path G into which air of the disposal device 40 is introduced. The guide flow path G may communicate with the disposal device 40. Particularly, as one end of the guide duct 37 is provided to open toward the cover frame 36, the air of the disposal device 40 introduced through the inlet hole 361 of the cover frame 36 may be introduced into the guide duct 37.

The cover device 30 may include the connecting duct 38 and a duct sealing member 39.

The connecting duct 38 may be coupled to the other end of the guide duct 37. For example, the connecting duct 38 may be coupled to a rear end of the guide duct 37. The connecting duct 38 may be coupled to a duct mounting member 341 of the lower frame 34.

The connecting duct 38 may be provided to connect the guide duct 37 accommodated in the cover device 30 and an exhaust member 213 formed in the accommodation frame 21. One end of the connecting duct 38 may be connected to the guide duct 37 and the other end of the connecting duct 38 may protrude outward from the cover device 30 through the duct mounting member 341.

The connecting duct 38 may include a pusher 381. The pusher 381 may protrude outward from the rear of the cover device 30.

The pusher 381 may be provided to press a blocking member 92 provided to maintain the exhaust member 213 of the accommodation frame 21 in a closed state, which will be described later. Details thereof will be described later.

The duct sealing member 39 may be coupled to the other end of the connecting duct 38. For example, the duct sealing member 39 may be coupled to a portion, which protrudes outward of the cover device 30 through the duct mounting member 341, in the connecting duct 38.

The duct sealing member 39 may be provided to seal between the connecting duct 38 of the cover device 30 and the exhaust member 213 of the accommodation frame 21. When the cover device 30 closes the upper portion of the housing 10, the duct sealing member 39 may prevent the air, which flows to the connecting duct 38 through the guide duct 37, from leaking into a gap between the connecting duct 38 and the exhaust member 213. Therefore, air containing contaminants may not flow out without passing through the deodorizing device.

The disposal device 40 may be arranged under the cover device 30 so as to be opened or closed by the cover device 30.

The disposal device 40 may include the grinding case 41 in which food waste is disposed of. Disposal of food waste may be used as a term referring to drying, stirring, and grinding of food waste. Alternatively, disposal of food waste may be used as a term referring to one of drying, stirring, or grinding of food waste.

The disposal device 40 may be provided to accommodate food waste. The disposal device 40 may be arranged inside the housing 10 and separated out of the housing 10. The disposal device 40 may include a handle 413. A user can separate the disposal device 40 from the inside of the housing 10 to the outside by gripping the handle 413.

The grinding case 41 may include an open upper surface so as to form an inlet port. A user can insert food waste into the disposal device 40 through the inlet port of the grinding case 41.

The inlet port of the grinding case 41 may be closed by the cover frame 36 of the cover device 30. The cover gasket 35 of the cover device 30 may be provided to seal a gap between the inlet port of the grinding case 41 and the cover frame 36.

The grinding case 41 may include a sidewall 411 and a bottom surface 412.

A fixed grinder 43 may be mounted on the sidewall 411 of the grinding case 41. On the bottom surface 412 of the grinding case 41, a rotary grinder 42 may be connected to a first driving device 500 so as to be rotatable.

The rotary grinder 42 and the fixed grinder 43 may be provided to grind food waste through interaction with each other.

The rotary grinder 42 may include a rotary body 421 to which a grinder shaft of the first driving device 500 is coupled. The rotary grinder 42 may include a first grinder 422, a second grinder 423, and a third grinder 424 that extend radially from the rotary body 421.

The first grinder 422, the second grinder 423, and the third grinder 424 may be arranged at different heights to stir and grind food waste.

It is illustrated that the rotary grinder 42 includes the first grinder 422 to the third grinder 424 in FIG. 4, but the number of grinders is not limited thereto.

A discharge hole 4121 may be formed on the bottom surface 412 of the grinding case 41. The discharge hole 4121 may be formed by cutting a portion of the bottom surface 412 of the grinding case 41. Food waste that is disposed of inside the grinding case 41 may be transported to the storage device 80 through the discharge hole 4121.

A rotation shaft accommodating member 4122 may be formed on the bottom surface 412 of the grinding case 41. The rotation shaft accommodating member 4122 may be formed to extend upward from the center of the grinding case 41. The grinder shaft of the first driving device 500 may be inserted into the rotation shaft accommodating member 4122 to transmit power to the rotary body 421 of the rotary grinder 42.

The disposal device 40 may include a valve assembly 44.

The valve assembly 44 may include a valve case 441 and a valve member 442.

The valve case 441 may be coupled to a lower portion of the grinding case 41. The valve case 441 may be coupled to the grinding case 41 at a position communicating with the discharge hole 4121 of the grinding case 41.

The valve case 441 may be provided to accommodate the valve member 442 therein. Particularly, the valve case 441 may cover the outside of the valve member 442 to allow the valve member 442 to be rotated therein, The valve member 442 may be rotated inside the valve case 441. The valve member 442 may be rotated so as to open and close the discharge hole 4121 of the grinding case 41.

The valve member 442 may pass through the discharge hole 4121 of the grinding case 41 and protrude upward from the bottom surface 412 of the grinding case 41. Accordingly, a lower surface of the third grinder 424 of the rotary grinder 42 may be recessed inward to correspond to the protruding shape of the valve member 442. Accordingly, the third grinder 424 may be provided to avoid interference with the valve member 442.

In addition, due to the shape of the third grinder 424, a protrusion 4123 may be formed on the bottom surface 412 of the grinding case 41.

The protrusion 4123 may be provided to protrude upward from the bottom surface 412.

As the protrusion 4123 corresponding to the recessed shape of the third grinder 424 is formed on the bottom surface 412 of the grinding case 41, the third grinder 424 may transfer all the food waste accumulated in the food waste to the discharge hole 4121 and effectively stir the food waste.

The valve member 442 may be provided in a ball shape in which a part of an inner portion thereof is opened. The valve member 442 may be a ball valve provided in a ball shape. However, the shape of the valve member 442 may not be limited thereto, and the shape of the valve member 442 may vary as long as the valve member 442 is configured to open or close the discharge hole 4121.

The valve member 442 of the valve assembly 44 may be rotated by receiving a driving force from the driving devices 500 and 600. For example, the valve member 442 may be provided to open or close the discharge hole 4121 of the grinding case 41 through rotation by receiving the driving force from a second driving device 600.

In addition, in response to the valve member 442 being rotated to open the discharge hole 4121, the second driving device 600 may interfere with the upward movement of the valve member 442 so as to prevent the valve member 442 from being separated from the second driving device 600.

Accordingly, it is possible to prevent food waste from leaking out when a user separates the disposal device 40 without recognizing the open state of the discharge hole 4121. Details thereof will be described later.

The food waste disposer 1 may include the heater 60.

The heater 60 may include a heating frame 61 and a heating wire 62 accommodated inside the heating frame 61.

The heating frame 61 may be arranged to be in contact with the lower portion of the disposal device 40. The bottom surface 412 of the disposal device 40 may be heated by the heating wire 62 accommodated inside the heating frame 61.

The food waste disposer 1 may include the driving devices 500 and 600.

The driving devices 500 and 600 may be arranged below the heater 60.

Figure 6:
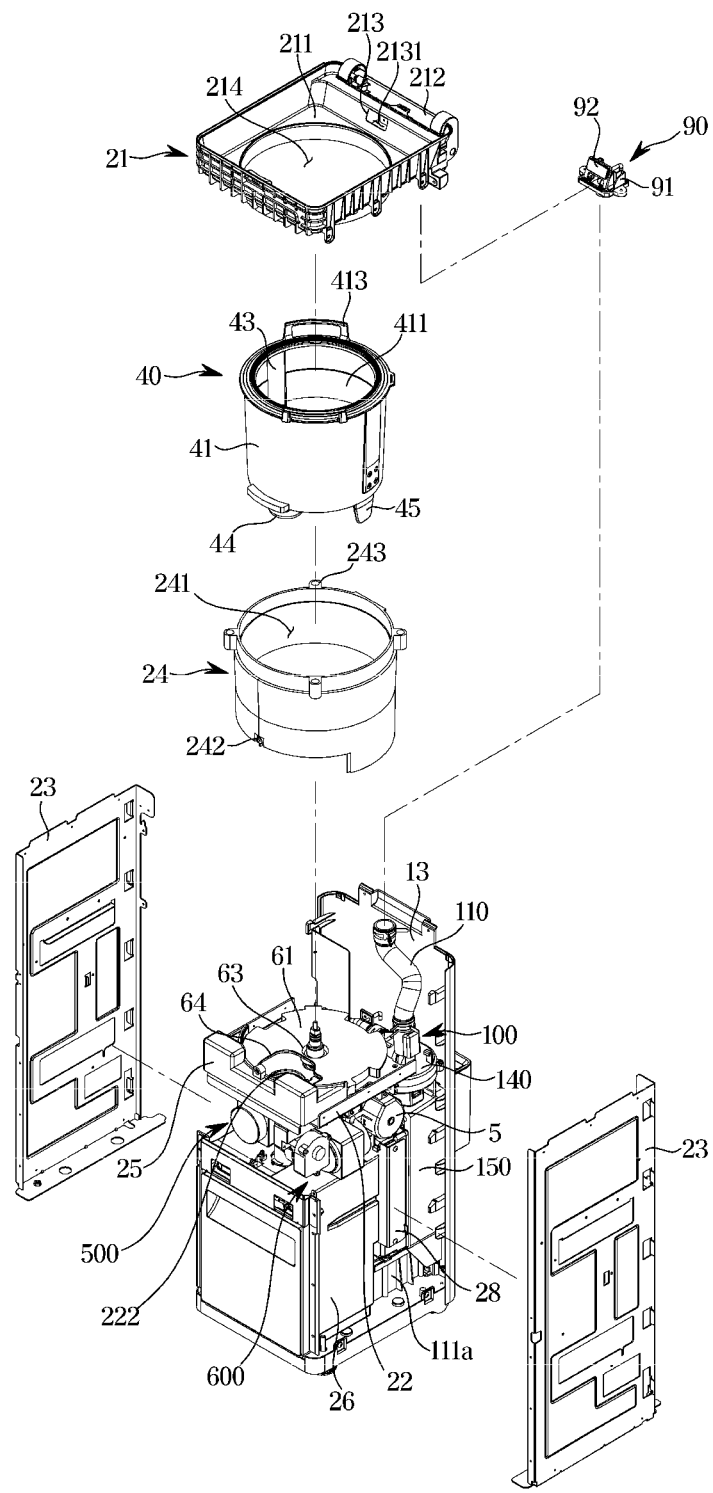
FIG. 6 is a front-exploded view illustrating some components of the food waste disposer according to an embodiment of the disclosure.

The driving devices 500 and 600 may include the first driving device 500 (refer to FIG. 6) and the second driving device 600 (refer to FIG. 6).

The first driving device 500 may transmit a driving force to the rotary grinder 42 of the disposal device 40, and the second driving device 600 may transmit a driving force to the valve assembly 44 of the disposal device 40. Details thereof will be described later.

The food waste disposer 1 may include the storage device 80.

The storage device 80 may be arranged inside the storage frame. The storage device 80 may be connected to a transfer pipe 27.

An upper end of the transfer pipe 27 may be connected to the valve assembly 44 and a lower end of the transfer pipe 27 may be connected to the storage device 80.

Food waste processed by the disposal device 40 may be transferred to the transfer pipe 27 as the valve assembly 44 opens the discharge hole 4121. Food waste transported through the transfer pipe 27 may be stored in the storage device 80.

The storage device 80 may be arranged on the front lower side of the disposal device 40 to store food waste processed by the disposal device 40.

The storage device 80 may include the storage case 81 and the storage body 811 coupled to the storage case 81 and exposed to the outside of the food waste disposer 1. The storage grip 812 may be formed at an upper end of the storage body 811. Accordingly, a user can empty the food waste collected in the storage device 80 from the storage device 80 by holding the storage grip 812 and separating the storage device 80 from the housing 10.

The food waste disposer 1 may include an electrical component chamber 7. Electrical components such as various circuit boards may be arranged in the electrical component chamber 7.

The food waste disposer 1 may include a controller C. The controller C may control various components of the food waste disposer 1. Accordingly, the controller C of the food waste disposer 1 may control the operation of the food waste disposer 1 based on the electronic signal. Details thereof will be described later.

The food waste disposer 1 may include an exhaust member opening and closing device 90.

The exhaust member opening and closing device 90 may include a frame coupling body 91 and the blocking member 92. The blocking member 92 may be provided to open or close the exhaust member 213 of the accommodation frame 21. The blocking member 92 may be positioned to close the exhaust member 213 in response to the cover device 30 opening the top of the housing 10.

The frame coupling body 91 may be connected to an end of a first exhaust pipe 110 to be described later. The frame coupling body 91 may be coupled to a lower portion of the accommodation frame 21.

The frame coupling body 91 may be provided to connect the accommodation frame 21 and the first exhaust pipe 110. The frame coupling body 91 may form a communication space 2131 therein. The communication space 2131 may be provided to communicate with the guide flow path G of the guide duct 37. The communication space 2131 may be provided to communicate with a first exhaust flow path F1 of the first exhaust pipe 110.

The blocking member 92 may be elastically supported by the frame coupling body 91. The blocking member 92 may be coupled to the frame coupling body 91 to maintain a state in which the exhaust member 213 of the accommodation frame 21 is closed. The blocking member 92 may be movably arranged inside the communication space 2131.

The food waste disposer 1 may include the deodorizing device 100.

The deodorizing device 100 may be connected to the cover device 30. The deodorizing device 100 may include the first exhaust pipe 110 connected to the cover device 30.

The first exhaust pipe 110 may include a first inlet 111 connected to the communication space 2131 of the frame coupling body 91. The first exhaust pipe 110 may form the first exhaust flow path F1 through which air of the disposal device 40 flows.

The deodorizing device 100 may be arranged in a rear portion of the food waste disposer 1 to suck air from the disposal device 40, filter the air, and discharge the filtered air to the outside. Details regarding the deodorizing device 100 will be described later.

Details regarding the deodorizing device 100 will be described later.

The food waste disposer 1 may include the water storage container 50.

The water storage container 50 may be arranged on the base housing 11 to collect condensed water generated in the exhaust flow path of the deodorizing device 100.

For example, the water storage container 50 may be mounted on a water storage container mounting member 111a of the base housing 11. The water storage container 50 may form a collecting space 5021 therein. The water storage container 50 may be arranged below the filter assembly 150 and connected to the filter assembly 150.

A flow of air in a state in which the upper portion of the housing 10 is closed by the cover device 30 will be described with reference to FIG. 5.

As shown in FIG. 5, when the cover device 30 closes the upper portion of the housing 10, the pusher 381 formed on the connecting duct 38 may press the blocking member 92 arranged inside the accommodation frame 21.

For example, the pusher 381 may pass through the exhaust member 213 of the accommodation frame 21 and press the blocking member 92. As the blocking member 92 is pressed and rotated toward the communication space 2131, the blocking member 92 may open the exhaust member 213 of the accommodation frame 21.

As the blocking member 92 opens the exhaust member 213 of the accommodation frame 21, the inside of the connecting duct 38 and the communication space 2131 may be connected to each other to allow air to flow therebetween.

In addition, the communication space 2131 is provided to communicate with the first inlet 111 of the first exhaust pipe 110, and thus the pusher 381 may open the first inlet 111 of the first exhaust pipe 110 by pressing the blocking member 92.

That is, when the cover device 30 closes the upper portion of the housing 10, the blocking member 92 may be elastically moved to a position in which the exhaust member 213 is opened.

Therefore, air inside the disposal device 40 may flow into the cover device 30 through the inlet hole 361 of the cover frame 36 of the cover device 30. Air passing through the inlet hole 361 may flow to the guide duct 37 of the cover device 30. In other words, the air of the disposal device 40 may flow along the guide flow path G.

Thereafter, the air passing through the guide duct 37 and the connecting duct 38 may flow into the communication space 2131 through the open exhaust member 213 of the accommodation frame 21.

The air flowing into the communication space 2131 may flow along the first exhaust flow path F1 through the first inlet 111 of the first exhaust pipe 110. The air flow may be formed by an exhaust fan 140 to be described later.

Figure 7:
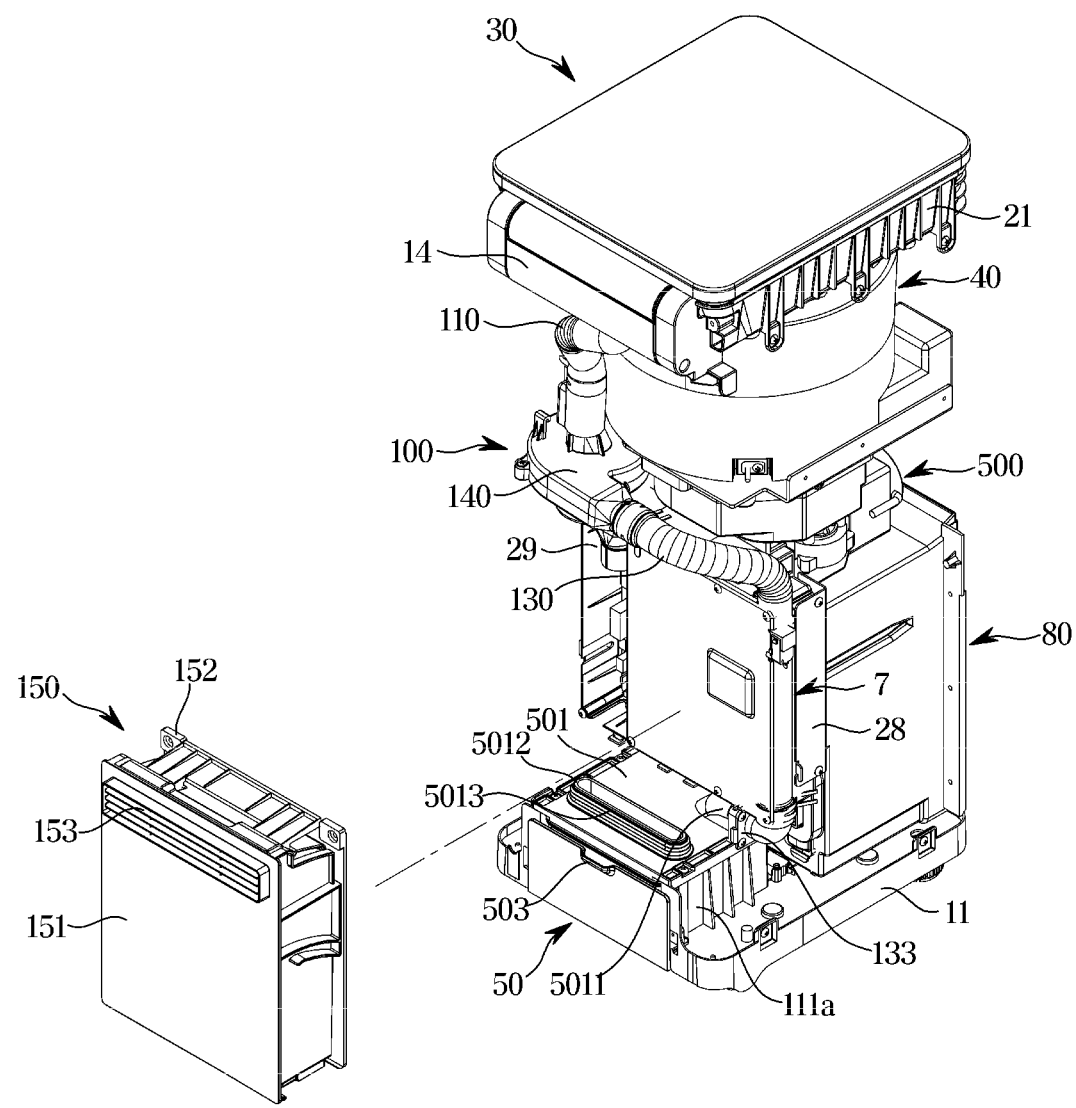
FIG. 7 is a rear-exploded view illustrating some components of the food waste disposer according to an embodiment of the disclosure.

FIG. 6 is a front-exploded view illustrating some components of the food waste disposer according to an embodiment of the disclosure. FIG. 7 is a rear-exploded view illustrating some components of the food waste disposer according to an embodiment of the disclosure.

The food waste disposer 1 may include a plurality of inner frames 20. In FIG. 6, the cover device 30 and the first cover housing 12 are omitted for convenience of description.

Hereinafter the detailed structure of the inner frame 20 of the food waste disposer 1 and arrangement of various devices will be described.

Referring to FIGS. 6 and 7, the food waste disposer 1 may include the accommodation frame 21.

The accommodation frame 21 may include a base member 211, a hinge mounting member 212, the exhaust member 213 and an opening 214.

The accommodation frame 21 may be arranged between the housing 10 and the disposal device 40 to cover the outside of the disposal device 40. For example, the base member 211 of the accommodation frame 21 may be arranged between the housing 10 and the disposal device 40 to cover the outside of the disposal device 40.

The hinge mounting member 212 may be formed at the rear of the base member 211. The hinge housing 14 may be coupled to the hinge mounting member 212 of the accommodation frame 21. The cover device 30 may be provided to be rotated by being coupled to the hinge mounting member 212 of the accommodation frame 21.

The exhaust member 213 may be formed behind the base member 211. The exhaust member 213 may be provided to connect the guide flow path G of the cover device 30 and the exhaust flow path of the deodorizing device 100.

The exhaust member 213 may communicate with the guide flow path G and the exhaust flow path. The exhaust member 213 may be formed by cutting an inner portion of the base member 211.

The accommodation frame 21 may include the communication space 2131 connected to the exhaust member 213. The communication space 2131 may be formed in the rear portion of the accommodation frame 21. The exhaust member opening and closing device 90 may be accommodated in the communication space 2131.

The opening 214 may be provided to be open inside the base member 211. Through the opening 214, the disposal device 40 may be separated out of the accommodation frame 21. The opening 214 may be provided to communicate with the inlet port of the disposal device 40.

The food waste disposer 1 may include a support frame 22, a case frame 24, and a fixing frame 25.

The support frame 22 may be arranged below the heater 60 to support the heater 60 and the disposal device 40. The fixing frame 25 may be arranged in front of the support frame 22. The fixing frame 25 may include a frame fixer 251 coupled to the case frame 24.

The case frame 24 may be provided to accommodate the disposal device 40. The case frame 24 may be provided in a shape corresponding to the disposal device 40. For example, the case frame 24 may be provided in a substantially cylindrical shape with open upper and lower surfaces.

The case frame 24 may include a grinding device accommodation space 241. In the grinding device accommodation space 241, the disposal device 40 may be arranged to be spaced apart from the case frame 24 by a predetermined distance.

The case frame 24 may include a case fixer 242. The case fixer 242 may be coupled to the frame fixer 251 of the fixing frame 25. Accordingly, the case frame 24 may be fixed relative to the fixing frame 25.

The case frame 24 may include a frame coupler 243. The case frame 24 may be coupled to the lower portion of the accommodation frame 21 by the frame coupler 243. Accordingly, the case frame 24 may be fixed relative to the accommodation frame 21.

The food waste disposer 1 may include a side frame 23. The side frame 23 may be provided as a pair.

A pair of side frames 23 may be arranged to face each other. The side frame 23 may be coupled to both sides of the accommodation frame 21. The side frame 23 may be coupled to the second cover housing 13.

The side frame 23 may be arranged on the left and right side of the food waste disposer 1 to cover the disposal device 40, the heater 60, the driving devices 500 and 600, the storage device 80, and the deodorizing device 100.

Referring to FIGS. 4 and 6, the food waste disposer 1 may include a storage frame 26.

The storage frame 26 may form a space in which the storage device 80 is accommodated. The storage frame 26 may be connected to the transfer pipe 27.

The storage frame 26 may be provided to prevent food waste from affecting to other components inside the food waste disposer 1 in an accident in which food waste is transferred through the transfer pipe 27 in a state in which the storage device 80 is not accommodated in the housing, or an accident in which food waste is leaked from the storage device 80 when a user withdraws the storage device 80.

The storage frame 26 may accommodate a storage cover 82 of the storage device 80. The storage cover 82 may be provided to cover the open upper surface of the storage case 81.

In addition, the storage cover 82 may be provided to be rotatable relative to the upper surface of the storage case 81. Accordingly, when the storage case 81 is withdrawn to the front of the housing 10, the storage cover 82 may be inclined rearward, and when the storage case 81 is inserted into the inside of the housing 10, the storage cover 82 may be inclined forward to close the upper surface of the storage case 81.

The food waste disposer 1 may include a first partition plate 28 arranged behind the storage device 80 to define the electrical component chamber 7.

The driving devices 500 and 600 of the food waste disposer 1 may include the first driving device 500 and the second driving device 600.

The first driving device 500 may include the grinder shaft extending upward by penetrating the center of the heater 60 so as to supply power to the rotary grinder 42.

The second driving device 600 may be configured to supply power to the valve assembly 44. The first driving device 500 and the second driving device 600 may be respectively controlled by the controller C.

The heater 60 may include a first shaft through-hole 63 and a first valve through-hole 64. The support frame 22 may include a second shaft through-hole 221 and a second valve through-hole 222.

The first shaft through-hole 63 and the second shaft through-hole 221 may be formed side by side in the vertical direction. The first valve through-hole 64 and the second valve through-hole 222 may be formed side by side in the vertical direction.

The grinder shaft of the first driving device 500 may be provided to pass through the first shaft through-hole 63 and the second shaft through-hole 221. Accordingly, the first driving device 500 may pass through the support frame 22 and the heater 60, thereby transmitting the driving force to the disposal device 40.

As the valve assembly 44 of the disposal device 40 is formed to protrude downward from the grinding case 41, the valve assembly 44 may protrude to a lower side of the heater 60 and the support frame 22 by passing through the first valve through-hole 64 and the second valve through-hole 222.

The valve assembly 44 protruding to the lower side of the heater 60 and the support frame 22 may be driven by the second driving device 600.

The valve member 442 of the valve assembly 44 may be rotated by the second driving device 600 so as to open or close the discharge hole 4121 of the grinding case 41.

The food waste disposer 1 may include a cooling fan 5.

The cooling fan 5 may be arranged below the heater 60.

The cooling fan 5 may be configured to circulate air inside the housing 10 to allow heat inside the housing 10 to be discharged to the outside. The cooling fan 5 may be arranged on one side of the driving devices 500 and 600. The cooling fan 5 may be arranged in front of the exhaust fan 140.

The deodorizing device 100 may be arranged in a region behind the disposal device 40. The deodorizing device 100 may be arranged inside the second cover housing 13.

Referring to FIGS. 6 and 7, the deodorizing device 100 may include the first exhaust pipe 110, the exhaust fan 140, a second exhaust pipe 130 and the filter assembly 150.

The exhaust fan 140 may be arranged inside the housing 10 to form the air flow. The exhaust fan 140 may be arranged at the rear of the housing 10. The exhaust fan 140 may be provided to suck air from the disposal device 40. The first exhaust pipe 110 and the second exhaust pipe 130 may be connected to the exhaust fan 140.

At an upstream side of the exhaust fan 140, the first exhaust pipe 110 may be connected to the exhaust fan 140, and at a downstream side of the exhaust fan 140, the second exhaust pipe 130 may be connected to the exhaust fan 140. The first exhaust pipe 110 may be connected to the exhaust fan 140 to form the first exhaust flow path F1 (refer to FIG. 5) communicating with the guide flow path G.

The first exhaust pipe 110 may form the first exhaust flow path F1 (refer to FIG. 5). The second exhaust pipe 130 may form a second exhaust flow path. The first exhaust flow path F1 and the second exhaust flow path may be collectively referred to as an exhaust flow path.

The first exhaust pipe 110 and the second exhaust pipe 130 may be provided to allow air, which is introduced from the disposal device 40 by the exhaust fan 140, to flow.

The filter assembly 150 may be provided to adsorb pollutants from air flowing along the first exhaust pipe 110 and the second exhaust pipe 130. A filter provided to filter out pollutants in the air may be provided inside the filter assembly 150.

The filter assembly 150 may be connected to the exhaust flow path through the exhaust pipe to adsorb pollutants from air flowing along the first exhaust flow path F1 and the second exhaust flow path.

Air introduced from the disposal device 40 into the first exhaust pipe 110 and the second exhaust pipe 130 may flow along the exhaust flow path. The filter assembly 150 may be connected to the exhaust flow path. Particularly, the filter assembly 150 may be connected to the exhaust flow path through the first exhaust pipe 110 and the second exhaust pipe 130.

The water storage container 50 may be connected to the filter assembly 150 and the second exhaust pipe 130. Accordingly, the air flowing inside the second exhaust pipe 130 may pass through the inside of the water storage container 50 and flow to the filter assembly 150.

The water storage container 50 may be mounted on the water storage container mounting member 111a of the base housing 11. The water storage container 50 may include a water storage cover 501.

The water storage cover 501 may form an upper surface of the water storage container 50. The water storage cover 501 may include a connection pipe coupler 5011 connected to the second exhaust pipe 130. For example, the connection pipe coupler 5011 of the water storage cover 501 may be coupled to a coupling flange 133 of the second exhaust pipe 130.

The water storage cover 501 may include a filter coupler 5012. The filter coupler 5012 may extend to an upper side of the water storage cover 501 and be connected to the lower portion of the filter assembly 150. The filter coupler 5012 may form a path through which air flowing into the water storage container 50 through the second exhaust pipe 130 flows to the filter assembly 150.

The water storage container 50 may include a filter sealing member 5013 coupled to the filter coupler 5012. The filter sealing member 5013 may be provided to seal a gap between the water storage container 50 and the filter assembly 150.

The water storage container 50 may include a grip 503. The grip 503 may be exposed to the outside of the second cover housing 13 of the food waste disposer 1. A user can remove the collected condensed water by separating the water storage container 50 from the housing 10 by gripping the grip 503.

The filter assembly 150 may include a filter case 151 in which the filter is accommodated. The filter case 151 may be coupled to a filter mounting plate 152. The filter mounting plate 152 may be coupled to a second partition plate 29 that defines the electrical component chamber 7 from the rear.

The filter discharger 153 may be formed behind the filter case 151. The air flowing through the first exhaust pipe 110 and the second exhaust pipe 130 may pass through the inside of the water storage container 50 and flow to the filter assembly 150, and then contaminants may be removed by the filter assembly 150. The air, from which contaminants are removed, may be discharged to the outside of the food waste disposer 1 through the filter discharger 153.

Figure 8:
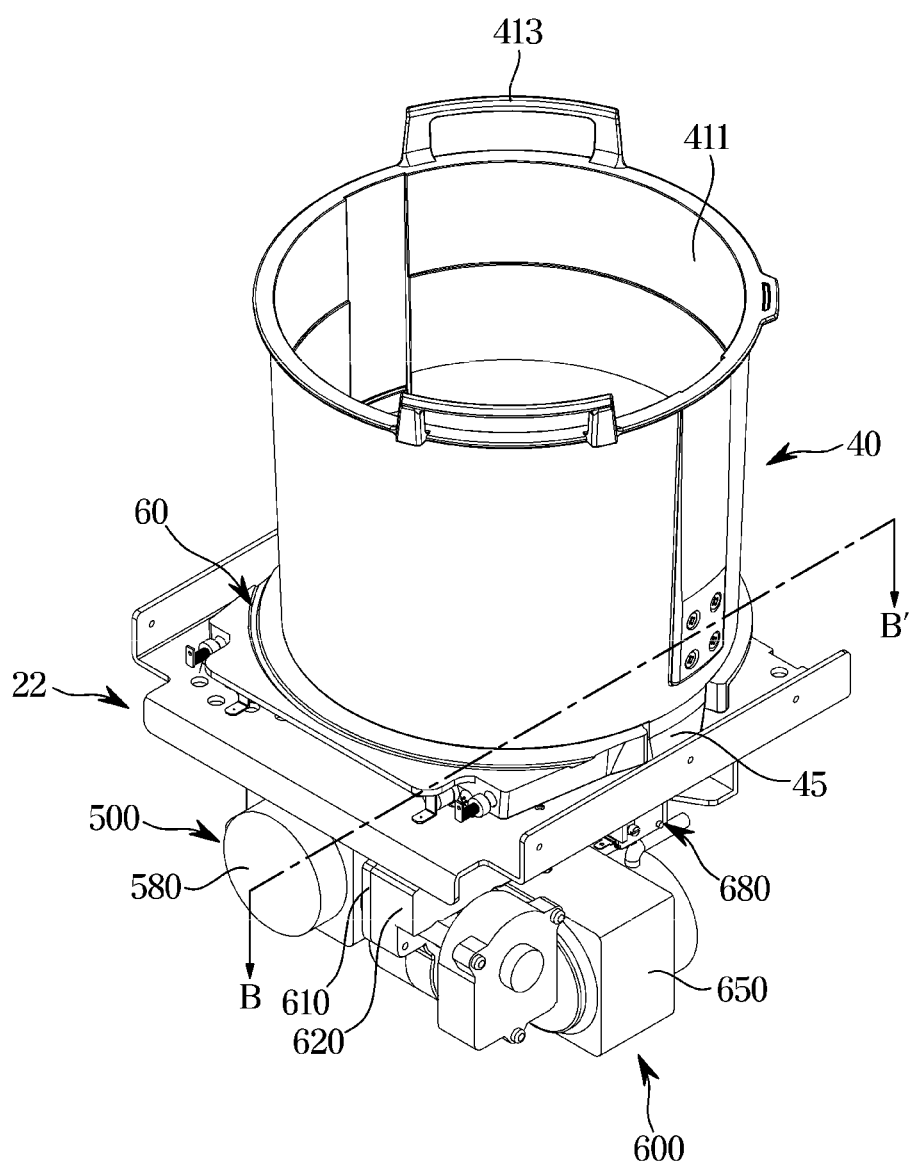
FIG. 8 is a view illustrating a state in which a disposal device, a heater, a support frame, and a driving device are coupled according to an embodiment of the disclosure.
Figure 9:
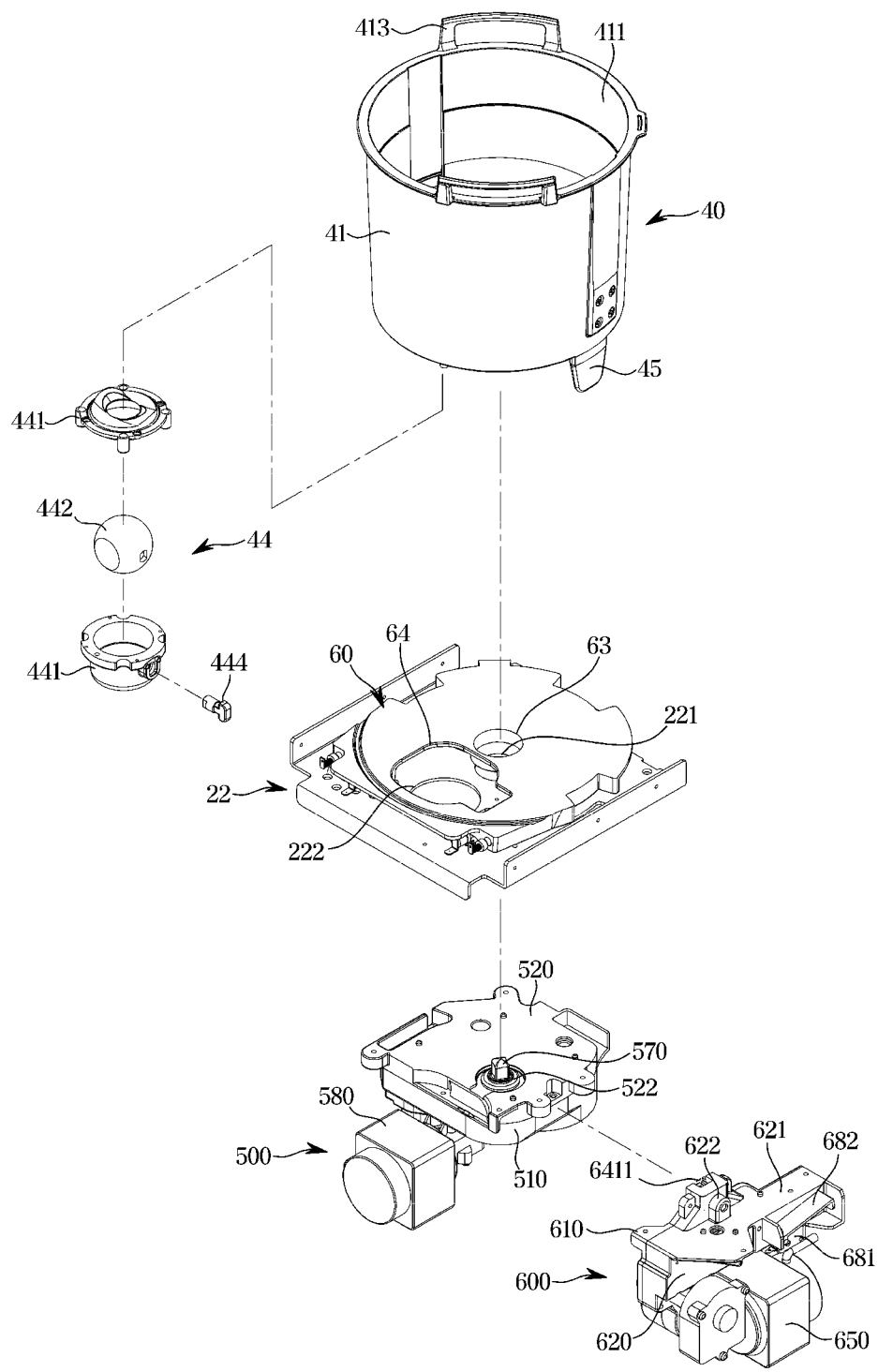
FIG. 9 is an exploded view illustrating the configuration shown in FIG. 8.

FIG. 8 is a view illustrating a state in which a disposer, a heater, a support frame, and a driving device are coupled according to an embodiment of the disclosure. FIG. 9 is an exploded view illustrating the configuration shown in FIG. 8.

Referring to FIGS. 8 and 9, the food waste disposer 1 may include the grinding case 41 arranged inside the housing 10 to dispose of food waste, and including the discharge hole 4121 (refer to FIG. 4) formed at the bottom of the grinding case 41.

The grinding case 41 may include the handle 413 extending upward from the sidewall 411. A user can separate the disposal device 40 from the inside of the housing 10 to the outside by gripping the handle 413.

The grinding case 41 may include a case extension 45 extending downward from the sidewall 411 of the grinding case 41. The case extension 45 may be provided to press a mounting sensor 680 so as to be detected by the mounting sensor 680 to be described later.

The food waste disposer 1 may include the valve assembly 44 including the valve member 442 mounted on the lower portion of the grinding case 41 and configured to open or close the discharge hole 4121.

The valve assembly 44 may include the valve case 441, the valve member 442, and a valve shaft 444.

The valve case 441 may be provided in plurality so as to be vertically coupled to accommodate the valve member 442 therein. An upper portion of the valve case 441 may be inserted into the grinding case 41 to cover the discharge hole 4121 formed on the bottom surface 412. A cutout may be formed in a lower portion of the valve case 441 to allow the valve shaft 444 to be inserted thereinto.

The valve member 442 may be accommodated inside the valve case 441 and rotated. The valve member 442 may be provided to have a ball shape in which a portion thereof is open. However, the shape of the valve member 442 is not limited thereto, and the shape of the valve member 442 may vary as long as the valve member 442 is configured to open or close the discharge hole 4121.

A portion of the lateral side of the valve member 442 may be recessed to allow the valve shaft 444 to be inserted thereinto. The valve shaft 444 may pass through the valve case 441 and be connected to the valve member 442.

One side of the valve shaft 444 may be connected to the valve member 442 to rotate the valve member 442, and the other side of the valve shaft 444 may be connected to a holding member 640 of the second driving device 600 to be described later (refer to FIG. 11) and receive power from the second driving motor 650.

The valve shaft 444 may connect the valve member 442 and the holding member 640.

Although not separately shown, a valve sealing member (not shown) may be arranged between the valve case 441 and the valve member 442 to provide airtightness. Accordingly, when the valve member 442 is in a closed state of closing the discharge hole 4121, it is possible to prevent moisture in food waste from leaking to the outside of the disposal device 40 through a gap between the valve member 442 and the valve case 441.

The disposal device 40 may be provided to penetrate the heater 60 and the support frame 22.

The support frame 22 may be arranged below the heater 60 to support the heater 60 and the disposal device 40. The support frame 22 may include the first shaft through-hole 221 and the first valve through-hole 222.

The first shaft through-hole 221 may be provided to allow a connecting shaft 570 to pass therethrough, so as to allow the first driving device 500 to rotate the rotary grinder 42 of the disposal device 40. For example, the first shaft through-hole 221 may be formed by cutting a portion of the support frame 22.

The first valve through-hole 222 may be located in front of the first shaft through-hole 221. The first valve through-hole 222 may be provided to allow the valve assembly 44 of the disposal device 40 to pass therethrough.

The heater 60 may include the second shaft through-hole 63 and the second valve through-hole 64.

The second shaft through-hole 63 may be aligned on the upper side of the first shaft through-hole 221. The second shaft through-hole 63 may be provided to allow the connecting shaft 570 to pass therethrough, so as to allow the first driving device 500 to rotate the rotary grinder 42 of the disposal device 40. For example, the second shaft through-hole 63 may be formed by cutting a part of the heating frame 61 of the heater 60.

The second valve through-hole 64 may be aligned on the upper side of the second shaft through-hole 63. The second valve through-hole 64 may be located in front of the second shaft through-hole 63. The second valve through-hole 64 may be provided to allow the valve assembly 44 of the disposal device 40 to pass therethrough.

Because the valve assembly 44 protrudes from the bottom of the grinding case 41, the bottom surface 412 of the grinding case 41 may be in contact with the upper surface of the heater 60 to receive heat, and the valve assembly 44 may pass through the second valve through-hole 64 of the heater 60 and the first valve through-hole 222 of the support frame 22 and be connected to the second driving device 600.

The food waste disposer 1 may include the first driving device 500.

The first driving device 500 may be arranged below the grinding case 41 to operate the rotary grinder 42.

The first driving device 500 may include a first driving motor 580 configured to generate power.

The first driving device 500 may include a case. The case may include a first driving case 510 and a first cover case 520. The first driving motor 580 may be coupled to one side of the case to supply power.

The first driving device 500 may include the connecting shaft 570 provided to transmit power to the rotary grinder 42 of the disposal device 40. The connecting shaft 570 may protrude to the upper side of the first cover case 520 by passing through the shaft through-hole 522 of the first cover case 520.

The food waste disposer 1 may include the second driving device 600.

The second driving device 600 may be arranged on one side of the valve assembly 44 to operate the valve assembly 44.

The second driving device 600 may include a second driving motor 650 configured to generate power.

The second driving device 600 may include a case. The case may include a second driving case 610 and a second cover case 620. The second driving motor 650 may be coupled to one side of the case to supply power.

The second driving device 600 may include the holding member 640 provided to transmit power to the valve assembly 44 of the disposal device 40. The holding member 640 may include a shaft through-groove 6411 accommodating the valve shaft 444 of the valve assembly 44. The holding member 640 may rotate the valve shaft 444 so as to rotate the valve member 442 connected to the valve shaft 444.

A detailed description of the second driving device 600 will be described later.

Figure 10:
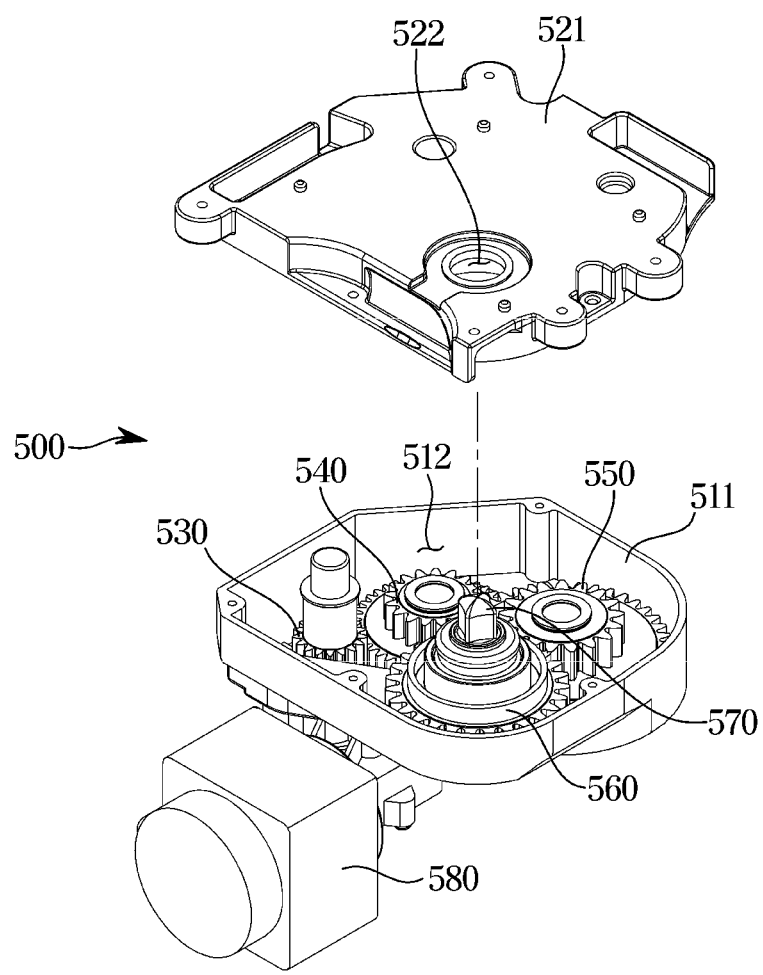
FIG. 10 is a view illustrating a configuration of a first driving device shown in FIG. 8.

FIG. 10 is a view illustrating a configuration of a first driving device shown in FIG. 8.

Referring to FIG. 10, the first driving device 500 may include the first driving case 510 and the first cover case 520. The first driving case 510 and the first cover case 520 may be referred to as 'case'.

The first driving case 510 may include a first driving case body 511 forming an exterior. The first driving case body 511 may include an open upper surface.

A first gear accommodation space 512 may be formed inside the first driving case body 511. The first driving case body 511 may be provided to allow the first driving motor 580 to be coupled thereto and to allow the driving shaft of the first driving motor 580 to be inserted thereinto.

The first cover case 520 may include a first cover case body 521 forming an exterior. The first cover case body 521 may cover the open upper surface of the first driving case body 511. The first cover case body 521 may be coupled to the first driving case body 511 to accommodate a plurality of gears therein.

The first cover case 520 may include a shaft through-hole 522 formed by cutting a portion of the first cover case body 521. A portion of the connecting shaft 570 may protrude upward from the first cover case 520 through the shaft through-hole 522.

The connecting shaft 570 may pass through the first cover case 520, the first shaft through-hole 221 of the support frame 22, and the second shaft through-hole 63 of the heater 60, and then be inserted into the rotary grinder 42, thereby transmitting power to the rotary grinder 42.

However, the coupling direction of the first cover case 520 and the first driving case 510 is not limited thereto, and the first cover case 520 and the first driving case 510 may be coupled horizontally to each other.

The first driving device 500 may include the first driving motor 580.

The first driving motor 580 may be coupled to a lower portion of the first driving case 510. The first driving motor 580 may generate power and transmit the power to a gear accommodated inside the first driving case 510. However, the coupling position of the first driving motor 580 is not limited thereto, and the first driving motor 580 may be coupled to any side of the first driving case 510 to generate and transmit power.

The first driving device 500 may include a plurality of power transmission gears.

The plurality of power transmission gears may include a first power transmission gear 530, a second power transmission gear 540 and a third power transmission gear 550. Although three power transmission gears are provided in FIG. 10, the number of power transmission gears is not limited thereto and may be provided in various ways.

The first power transmission gear 530 may be connected to the first driving motor 580 to receive power. The second power transmission gear 540 may be engaged with the first power transmission gear 530 and receive power from the first power transmission gear 530. The third power transmission gear 550 may be engaged with the second power transmission gear 540 and receive power from the second power transmission gear 540.

The first driving device 500 may include a shaft driving gear 560.

The shaft driving gear 560 may be engaged with the third power transmission gear 550 and receive power from the third power transmission gear 550.

The first driving device 500 may include the connecting shaft 570.

The connecting shaft 570 may be accommodated in the shaft driving gear 560 and be rotated together as the shaft driving gear 560 is rotated. A lower portion of the connecting shaft 570 may be accommodated in the shaft driving gear 560, and an upper portion of the connecting shaft 570 may pass through the first cover case 520 and be inserted into the rotary grinder 42.

Figure 11:
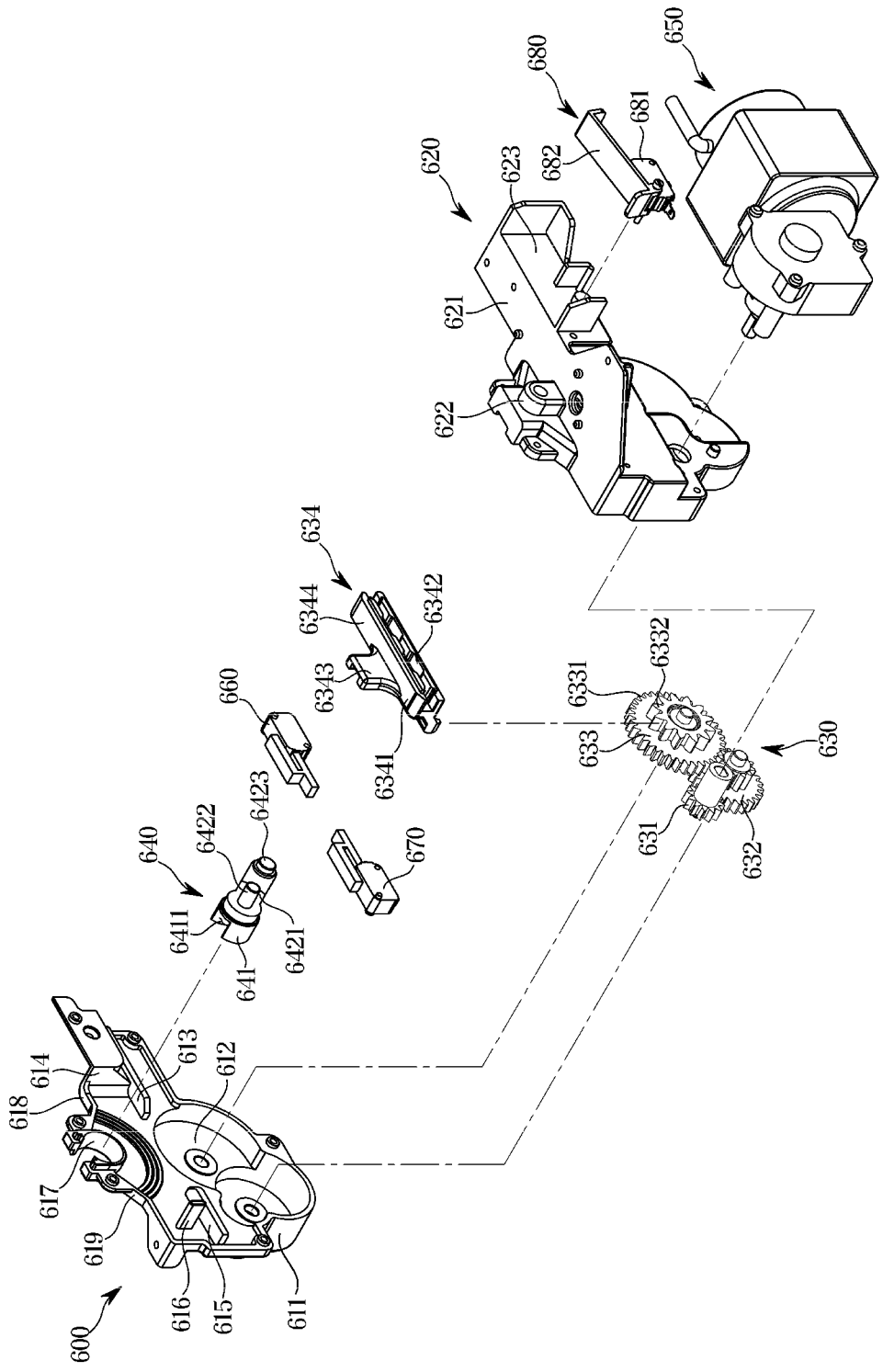
FIG. 11 is an exploded view illustrating a configuration of a second driving device shown in FIG. 8.
Figure 12:
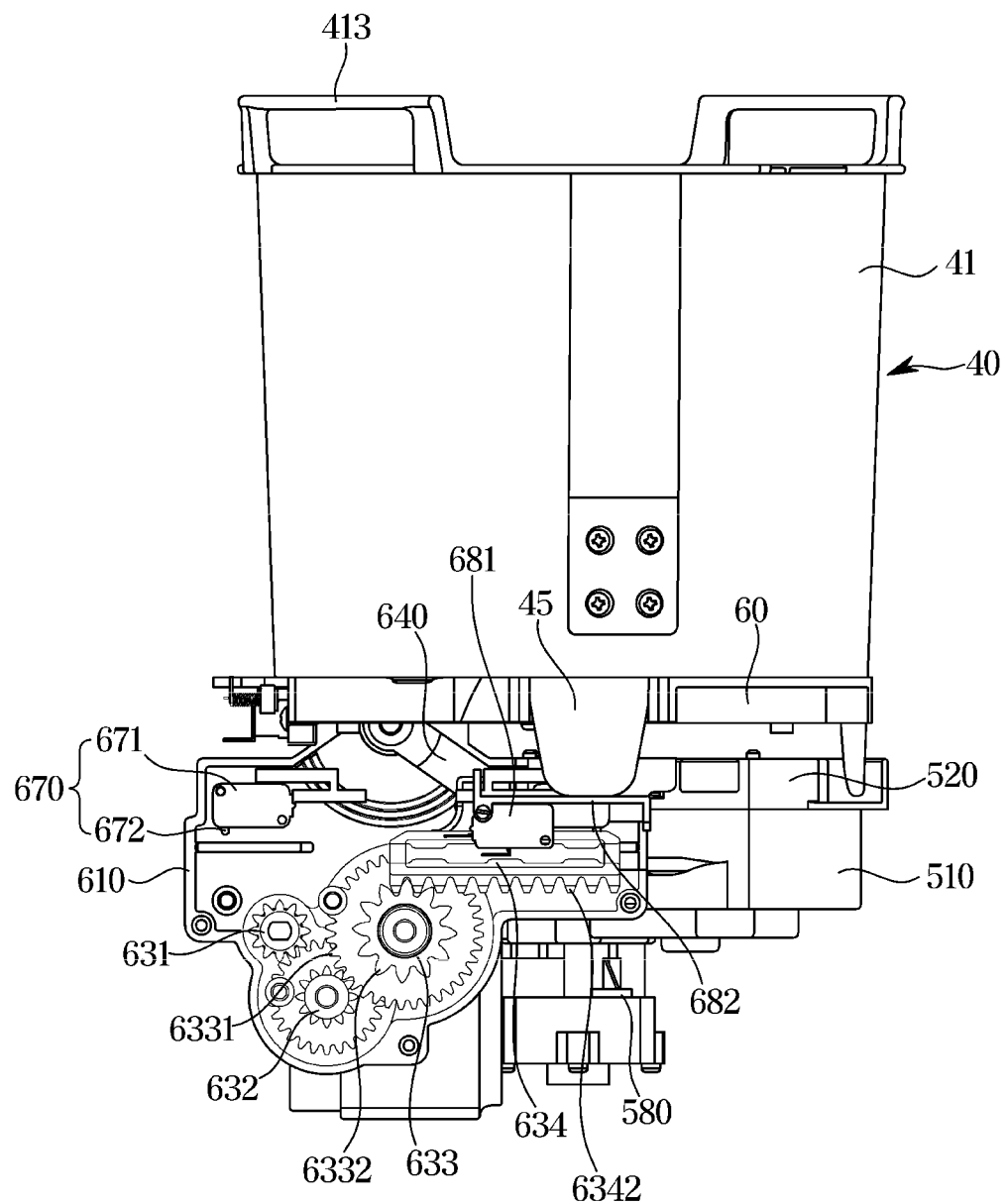
FIG. 12 is a view illustrating a state in which a second driving motor and a second cover case of the second driving device are removed from FIG. 8.

FIG. 11 is an exploded view illustrating a configuration of a second driving device shown in FIG. 8. FIG. 12 is a view illustrating a state in which a second driving motor and a second cover case of the second driving device are removed from FIG. 8.

Referring to FIG. 11, the second driving device 600 may include the second driving case 610 and the second cover case 620. The second driving case 610 and the second cover case 620 may be referred to as 'case'.

The second driving case 610 may include a second driving case body 611 forming an exterior.

The second driving case body 611 may include a gear accommodating member 612 in which a plurality of power transmission members 630 is accommodated. One side of the second driving case body 611 may be open to form an accommodation space therein.

The second driving case body 611 may include a first rack guide 613 and a second rack guide 615. The first rack guide 613 and the second rack guide 615 may be provided to guide a linear movement of a rack gear 634 to be described later.

The second driving case body 611 may include a first stopper 614 connected to the first rack guide 613. The first stopper 614 may extend upward from the first rack guide 613 toward a direction perpendicular to the first rack guide 613.

The first stopper 614 may be provided to prevent the rack gear 634 from being separated from a moving radius.

The second driving case body 611 may include a second stopper 616 connected to the second rack guide 615. The second stopper 616 may extend upward from the second rack guide 615 toward a direction perpendicular to the second rack guide 615.

The second stopper 616 may be provided to prevent the rack gear 634 from being separated from a moving radius.

The first rack guide 613 and the second rack guide 615 may be spaced apart from each other on one side and the other side of the second driving case 610. The first stopper 614 and the second stopper 616 may be spaced apart from each other on one side and the other side of the second driving case 610.

The second driving case 610 may include a holding member coupler 617. The holding member 640 to be described below may be rotatably coupled to the holding member coupler 617. The holding member coupler 617 may be provided to open inwardly and outwardly.

Accordingly, a holding body 641 of the holding member 640 may be exposed toward the valve assembly 44 through the holding member coupler 617. The valve shaft 444 of the valve assembly 44 may be inserted into the exposed shaft through-groove 6411 of the holding body 641.

The second driving case 610 may include a first interference portion 618 and a second interference portion 619.

The first interference portion 618 may be a part of the sidewall 411 of one side of the second driving case 610. The second interference portion 619 may be provided at a position opposite to the first interference portion 618 and may be a part of the sidewall 411 of the other side of the second driving case 610.

The first interference portion 618 and the second interference portion 619 may be provided to be in contact with the holding member 640. The first interference portion 618 and the second interference portion 619 may come into contact with the holding member 640 to prevent the holding member 640 from being rotated beyond a predetermined range.

The second cover case 620 may include a second cover case body 621 forming an exterior.

The second cover case body 621 may include a holding member support 622. The holding member support 622 may be formed at a position corresponding to the holding member coupler 617 of the second driving case body 611.

The holding member support 622 may accommodate a portion of the holding member 640 so as to assist the rotation of the holding member 640 with respect to the case. The holding member support 622 may be provided to cover one side of the holding member 640 to prevent the holding member 640 from being exposed to the outside.

The second cover case body 621 may include a mounting sensor support 623. The mounting sensor support 623 may be formed on an outer surface of the second cover case body 621. The mounting sensor 680 to be described below may be mounted on the mounting sensor support 623. The case extension 45 of the grinding case 41 may pass through the mounting sensor support 623, and the case extension 45 may press the mounting sensor 680.

The second driving device 600 may include the second driving motor 650.

The second driving motor 650 may be coupled to the second cover case 620. The second driving motor 650 may generate power. The second driving motor 650 may be inserted into the second cover case 620 to transmit power to the plurality of power transmission members 630. However, the coupling position of the second driving motor 650 is not limited thereto and may be coupled to any coupling position capable of transmitting power to the plurality of power transmission members 630.

The second driving device 600 may include the mounting sensor 680.

The mounting sensor 680 may include a mounting detection switch 681 and a pressed-member 682. The mounting sensor 680 may be seated on the mounting sensor support 623 of the second cover case 620.

The pressed-member 682 of the mounting sensor 680 may be elastically coupled to the mounting detection switch 681. Therefore, when the disposal device 40 is inserted into the housing 10, the case extension 45 of the grinding case 41 may press the pressed-member 682 of the mounting sensor 680, and thus the pressed-member 682 may pivot downward. Accordingly, the mounting sensor 680 may detect whether the disposal device 40 is mounted or not, and transmit a signal to the controller C.

However, the detection method of the mounting sensor 680 may not be limited thereto. For example, without using a separate pressed-member 682, the mounting sensor 680 may be provided as a motion sensor or the like configured to recognize whether or not the disposal device 40 is arranged.

The second driving device 600 may include the power transmission member 630 and the holding member 640.

The power transmission member 630 may be connected to the second driving motor 650 so as to be movable in a first direction and a second direction opposite to the first direction.

The power transmission member 630 may include a plurality of pinion gears and the rack gear 634. The plurality of pinion gears may be connected to the driving motor. Although three pinion gears are illustrated in FIG. 11, the number of pinion gears may not be limited thereto.

The plurality of pinion gears may include a first pinion gear 631, a second pinion gear 632 and a third pinion gear 633.

The first pinion gear 631 may be connected to the second driving motor 650. The first pinion gear 631 may be rotated by being coupled to the driving shaft of the second driving motor 650.

The second pinion gear 632 may be connected to the first pinion gear 631. The second pinion gear 632 may be engaged with the first pinion gear 631 and rotated in conjunction with the rotation of the first pinion gear 631.

The third pinion gear 633 may be connected to the second pinion gear 632. The third pinion gear 633 may be engaged with the second pinion gear 632 and rotated in conjunction with the rotation of the second pinion gear 632.

The third pinion gear 633 may include a gear tooth 6331 and a rack tooth 6332.

The gear tooth 6331 may be provided to be engaged with the second pinion gear 632. The rack tooth 6332 may be provided to be engaged with the rack gear 634.

Therefore, the third pinion gear 633 may be rotated by receiving power from the second pinion gear 632 through the gear tooth 6331, and transfer the received rotational force to the rack gear 634 through the rack tooth 6332.

The rack gear 634 may be provided to be linearly moved while meshing with the third pinion gear 633. The rack gear 634 may be connected to the holding member 640 to rotate the holding member 640.

The rack gear 634 may include a gear body 6341, a toothed member 6342, a holding member connector 6343, and a detection member 6344.

The toothed member 6342 may be formed in a lower portion of the gear body 6341 to engage with the third pinion gear 633. The detection member 6344 may be provided in an upper portion of the gear body 6341. For example, an upper surface of the rack gear 634 may be provided as the detection member 6344.

The detection member 6344 may be provided to be in contact with a first detection switch 662 of a first sensor 660 and a second detection switch 672 of a second sensor 670 to be described later.

The holding member connector 6343 may be connected to a rack gear connector 6423 of the holding member 640 to be described later. The holding member connector 6343 may extend upward from the gear body 6341. Although not shown in FIG. 11, a recessed portion may be provided on an inner surface of the holding member connector 6343 to allow the rack gear connector 6423 of the holding member 640 to be inserted thereinto.

The holding member 640 may be rotated based on the movement of the power transmission member 630. The holding member 640 may be connected to the valve member 442 to guide an open or closed state of the valve member 442.

Based on the movement of the power transmission member 630, the holding member 640 may be rotated in the first direction and in the second direction opposite to the first direction.

The holding member 640 may be coupled to the valve shaft 444 so as to rotate the valve member 442.

The holding member 640 may include the holding body 641 and an extension body 642.

The holding body 641 may be accommodated in the holding member coupler 617 of the second driving case 610. The holding body 641 may be rotated with respect to the holding member coupler 617 of the second driving case 610.

The holding body 641 may include the shaft through-groove 6411.

The shaft through-groove 6411 may open upward to allow the valve shaft 444 to be separated from the holding member 640 in a state in which the valve member 442 closes the discharge hole.

In addition, the holding body 641 may accommodate the valve shaft 444 to prevent the valve shaft 444 from being separated from the holding member 640 in a state in which the valve member 442 opens the discharge hole.

The extension body 642 may include a holding shaft 6422, a swing member 6421, and the rack gear connector 6423.

The holding shaft 6422 may be inserted into the holding member support 622 of the second cover case 620. The holding shaft 6422 may vertically extend from the extension body 642.

The holding shaft 6422 may be provided as a rotation shaft of the holding member 640.

The swing member 6421 may extend downward from the holding body 641. The swing member 6421 may be configured to be moved inside the second driving case 610. For example, the swing member 6421 may be rotated inside the second driving case 610 by using the holding shaft 6422 as a rotational center.

The swing member 6421 may be provided to be in contact with the first interference portion 618 and the second interference portion 619 of the second driving case 610. The swing member 6421 may prevent the holding member 640 from being rotated at an angle greater than or equal to an inclination angle of the first interference portion 618 and the second interference portion 619, in the second driving case 610.

The rack gear connector 6423 may be formed at an end of the swing member 6421. The rack gear connector 6423 may be inserted into the holding member connector 6343 of the rack gear 634. Through the rack gear connector 6423, the holding member 640 may be rotated and moved based on the linear movement of the rack gear 634.

The rack gear connector 6423 may vertically extend from the swing member 6421. The rack gear connector 6423 may extend from the swing member 6421 toward the rack gear 634.

The second driving device 600 may include a sensor.

The sensor may come into contact with the power transmission member 630. For example, the sensor may be in contact with the rack gear 634 of the power transmission member 630.

The sensor may include the first sensor 660 and the second sensor 670.

The first sensor 660 may be arranged on one side of the second driving case 610. The first sensor 660 may be coupled to the case in a screw manner and thus the position of the first sensor 660 may be fixed.

The first sensor 660 may be arranged on a side, on which the first interference portion 618 is formed, in the second driving case 610.

The second sensor 670 may be arranged on the other side of the second driving case 610. The second sensor 670 may be coupled to the case in a screw manner, and thus the position of the second sensor 670 may be fixed.

The second sensor 670 may be arranged on a side, on which the second interference portion 619 is formed, in the second driving case 610.

The first sensor 660 and the second sensor 670 may be arranged symmetrically on both sides of the holding member coupler 617 of the second driving case 610.

It is appropriate that the first sensor 660 and the second sensor 670 of the food waste disposer 1 according to an embodiment may include a micro switch.

The food waste disposer 1 according to an embodiment of the disclosure includes an algorithm configured to precisely control the open or closed state of the valve assembly 44 using a micro switch configured to detect whether a signal is turned on or off.

However, the type of the first sensor 660 and the second sensor 670 is not limited thereto and may be provided with various types of sensors.

A method of detecting the first sensor 660 and the second sensor 670 will be described later.

Referring to FIG. 12, the first driving device 500 and the second driving device 600 may be arranged under the disposal device 40.

The second driving device 600 may be arranged on one lower side of the disposal device 40 to operate the valve assembly 44.

The disposal device 40 may be withdrawn from the inside of the housing 10, and inserted into the inside of the housing 10 as a user grips the handle 413 of the grinding case 41. In other words, the disposal device 40 may be detachably arranged in the housing 10.

The mounting sensor 680 of the second driving device 600 may be pressed by the case extension 45 of the grinding case 41 when the grinding case 41 is mounted inside the housing 10.

For example, the pressed-member 682 of the mounting sensor 680 may be pressed downward by the case extension 45 of the grinding case 41. Accordingly, the mounting sensor 680 may detect that the disposal device 40 is inserted into the housing 10.

The second driving device 600 may be arranged outside the valve assembly 44 to operate the valve assembly 44. For example, the holding member 640 of the second driving device 600 may be connected to the valve shaft 444 of the valve assembly 44 to rotate the valve shaft 444. A detailed operation of the second driving device 600 will be described later.

Figure 13:
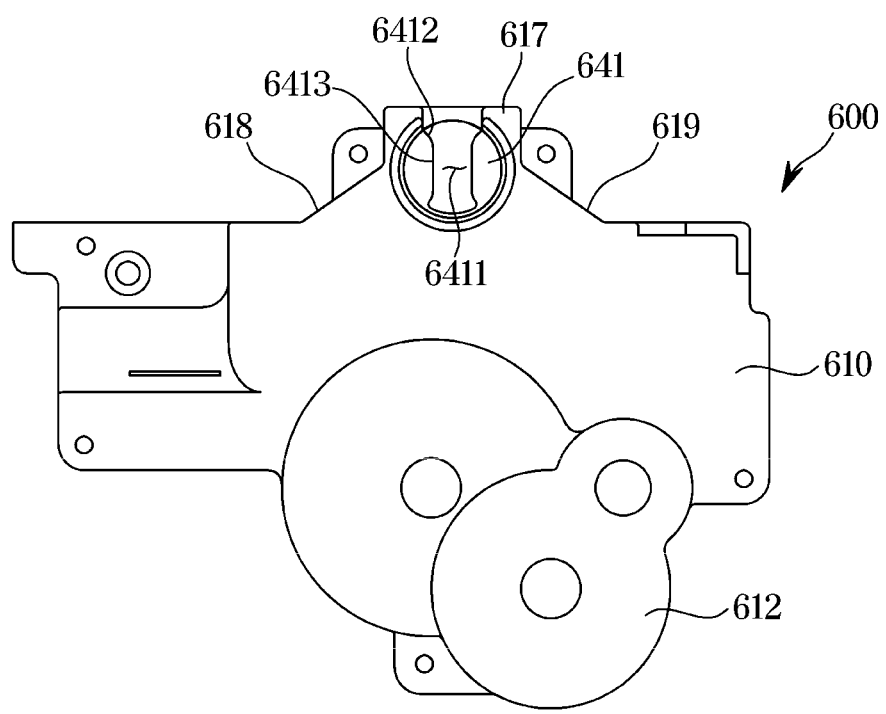
FIG. 13 is a view illustrating the second driving device according to an embodiment of the disclosure, when viewed from the inside.

FIG. 13 is a view illustrating the second driving device according to an embodiment of the disclosure, when viewed from the inside.

Referring to FIG. 13, the holding member 640 may be accommodated in the holding member coupler 617 of the second driving case 610. The holding member 640 may be rotated with respect to the holding member coupler 617 of the second driving case 610. For example, the holding body 641 of the holding member 640 may be accommodated in the holding member coupler 617.

The holding body 641 may include the shaft through-groove 6411, a guide 6412, and a shaft support 6413.

The shaft through-groove 6411 of the holding body 641 may be provided to accommodate the valve shaft 444 of the valve assembly 44. The shaft through-groove 6411 may be provided to open upward when the valve assembly 44 closes the grinding case 41.

Further, when the valve assembly 44 opens the grinding case 41, the position of the shaft through-groove 6411 may be changed so as to open laterally. This is a position movement based on rotation of the holding body 641.

The shaft support 6413 may be provided to include a vertical support surface.

The guide 6412 may be inclined outwardly of the shaft through-groove 6411 to guide insertion of the valve shaft 444. For example, the guide 6412 may be inclined outwardly from the shaft support 6413.

An arrangement relationship between the valve shaft 444 and the holding body 641 will be described later.

Figure 14:
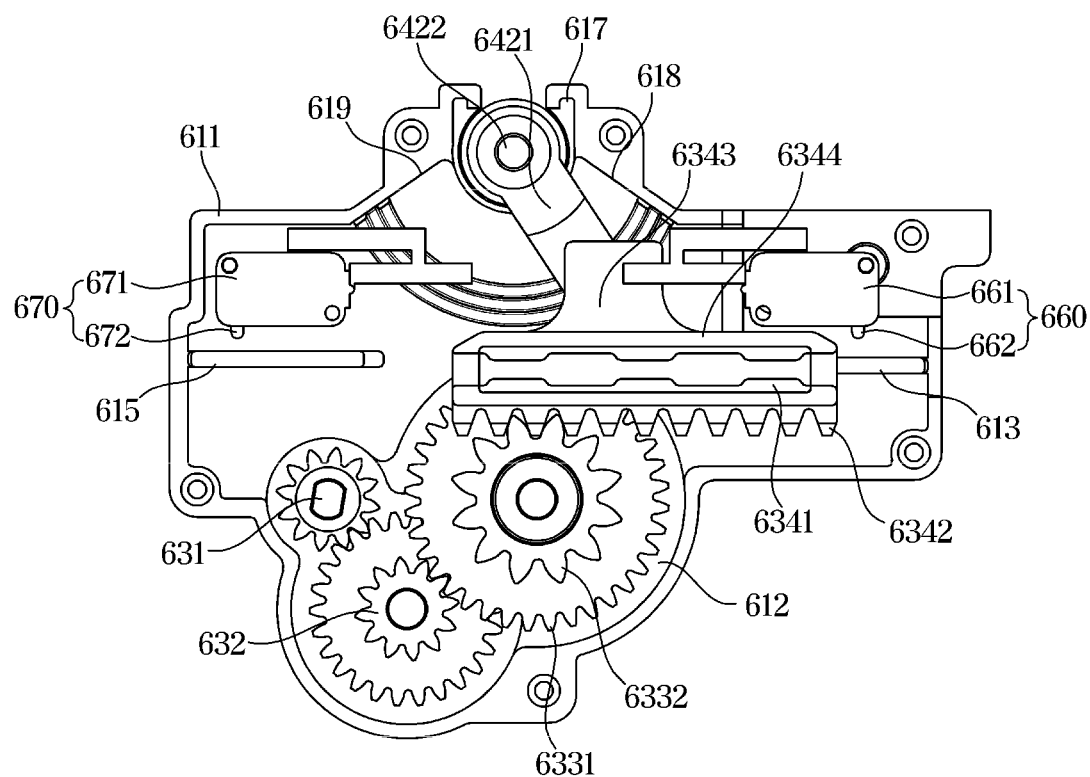
FIG. 14 is a view illustrating a process of adjusting a closed state of a valve member to a correct position in the second driving device according to an embodiment of the disclosure.
Figure 15:
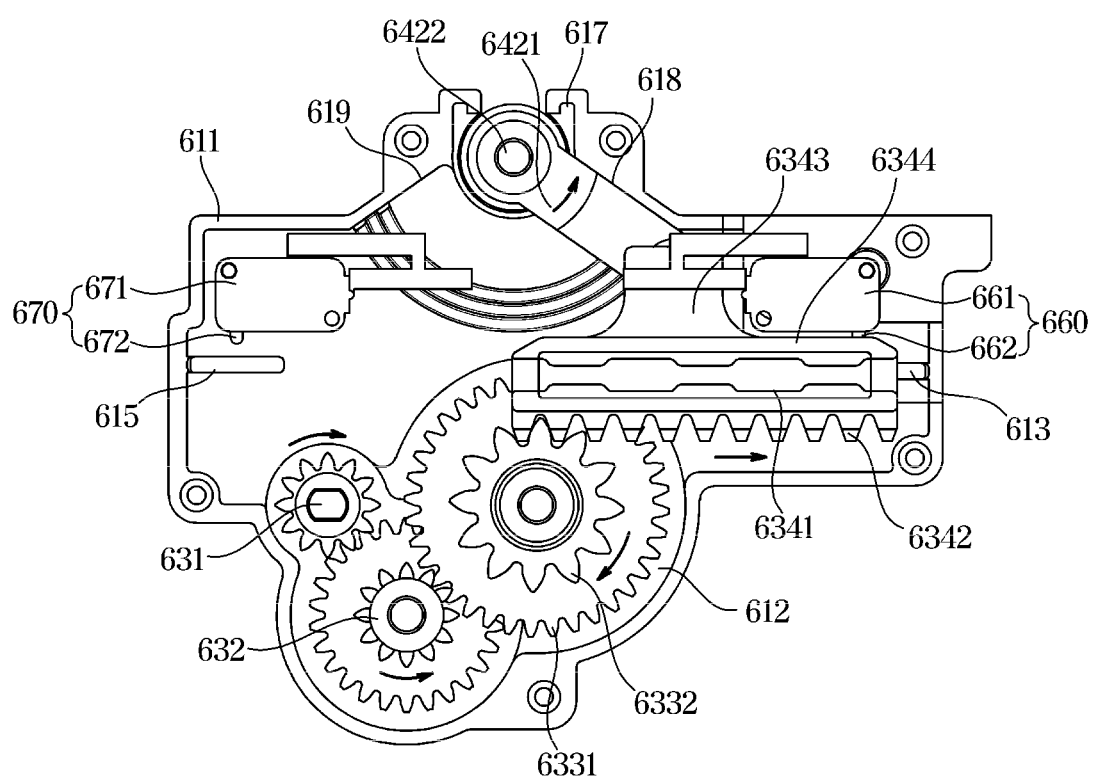
FIG. 15 is a view illustrating the process of adjusting the closed state of the valve member to the correct position in the second driving device according to an embodiment of the disclosure.
Figure 16:
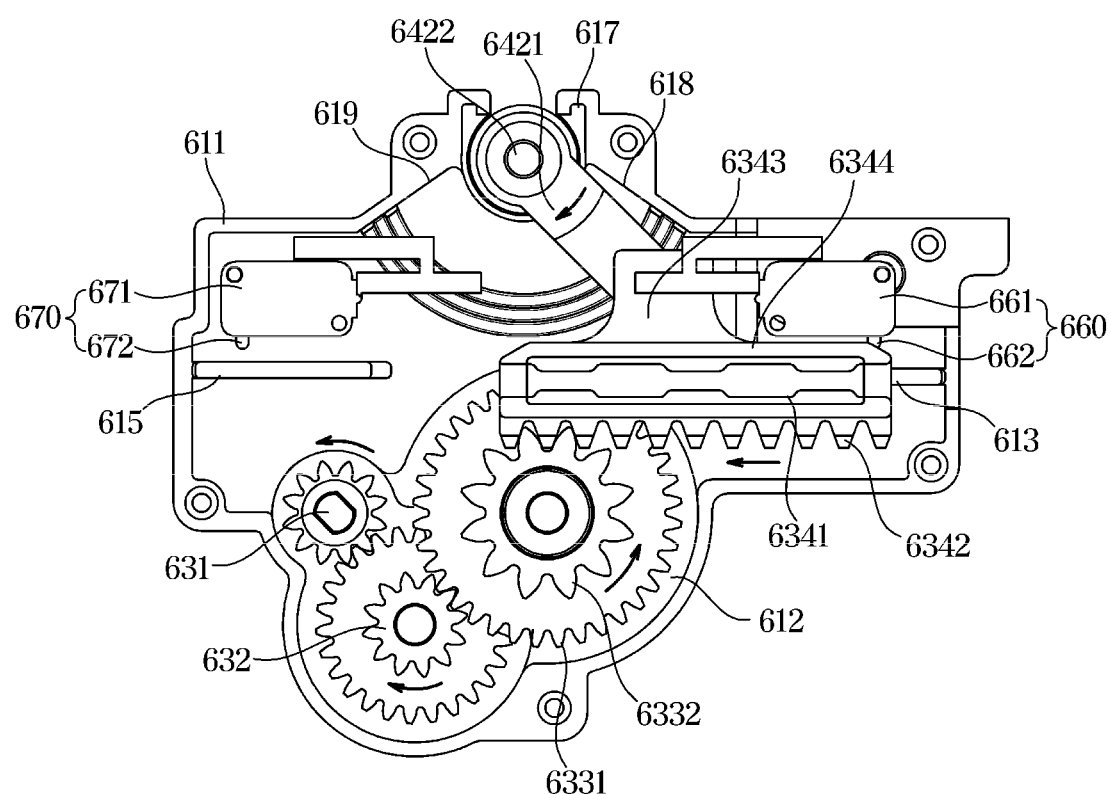
FIG. 16 is a view illustrating the process of adjusting the closed state of the valve member to the correct position in the second driving device according to an embodiment of the disclosure.
Figure 17:
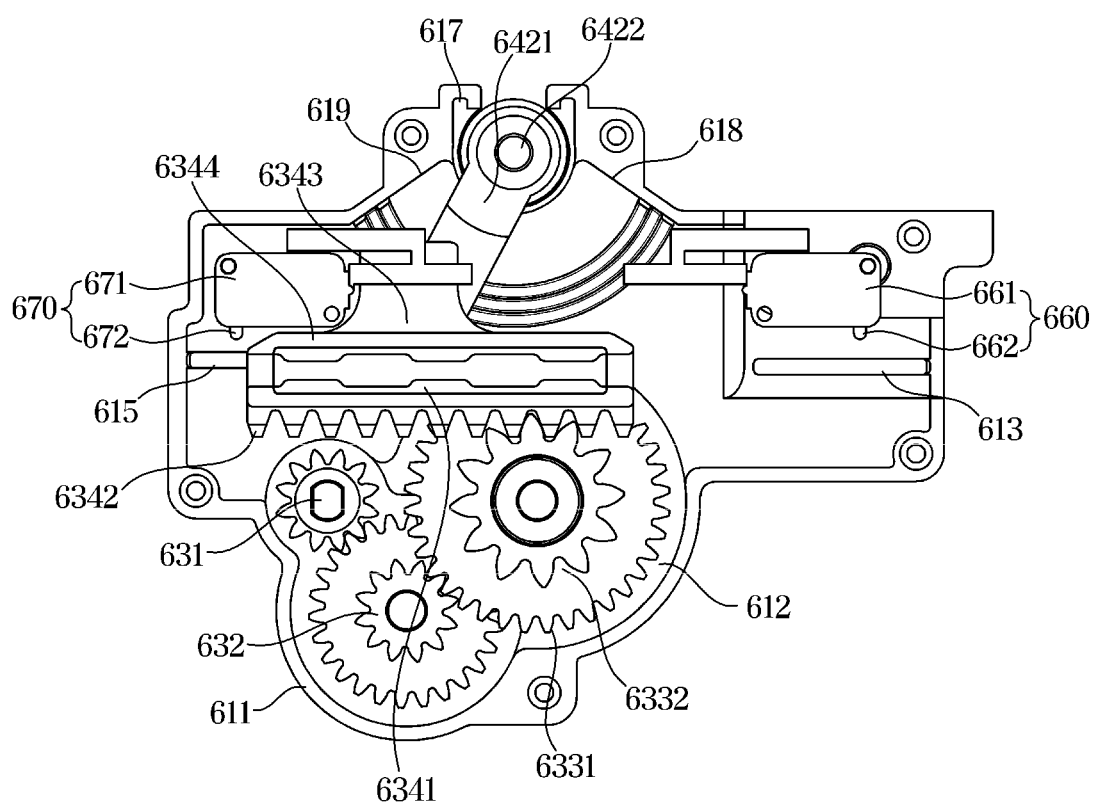
FIG. 17 is a view illustrating a process of adjusting an open state of the valve member to a correct position in the second driving device according to an embodiment of the disclosure.
Figure 18:
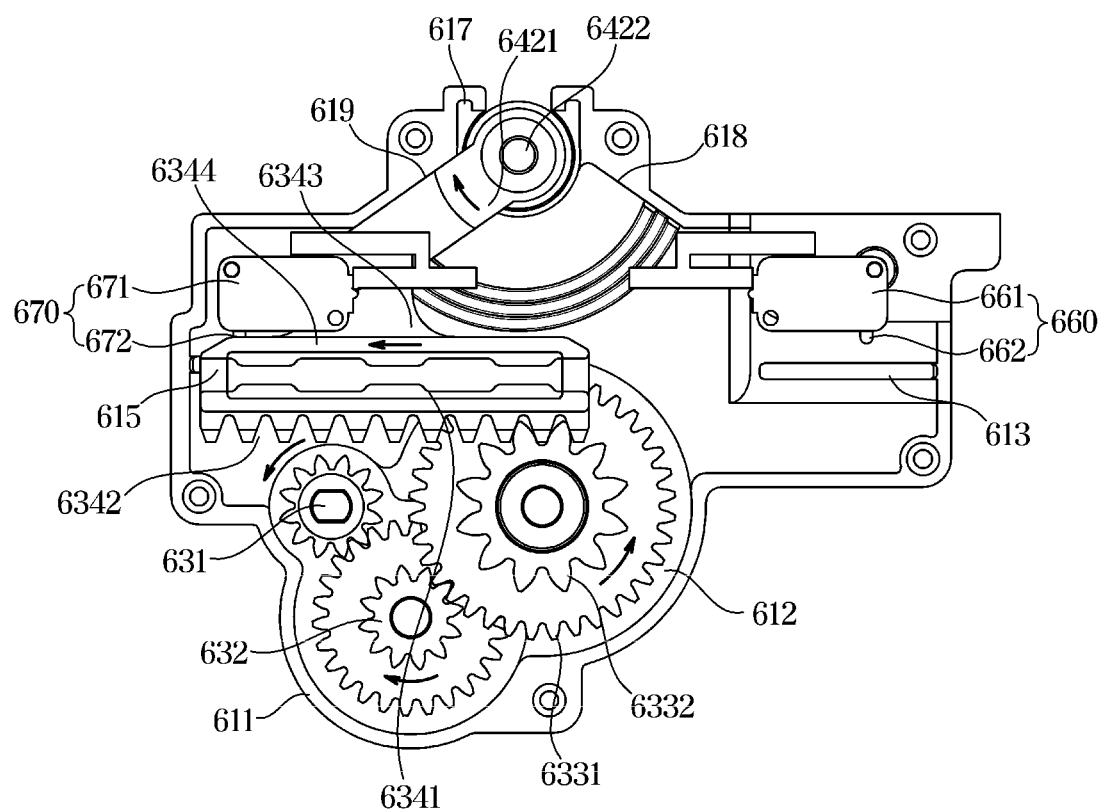
FIG. 18 is a view illustrating the process of adjusting the open state of the valve member to the correct position in the second driving device according to an embodiment of the disclosure.
Figure 19:
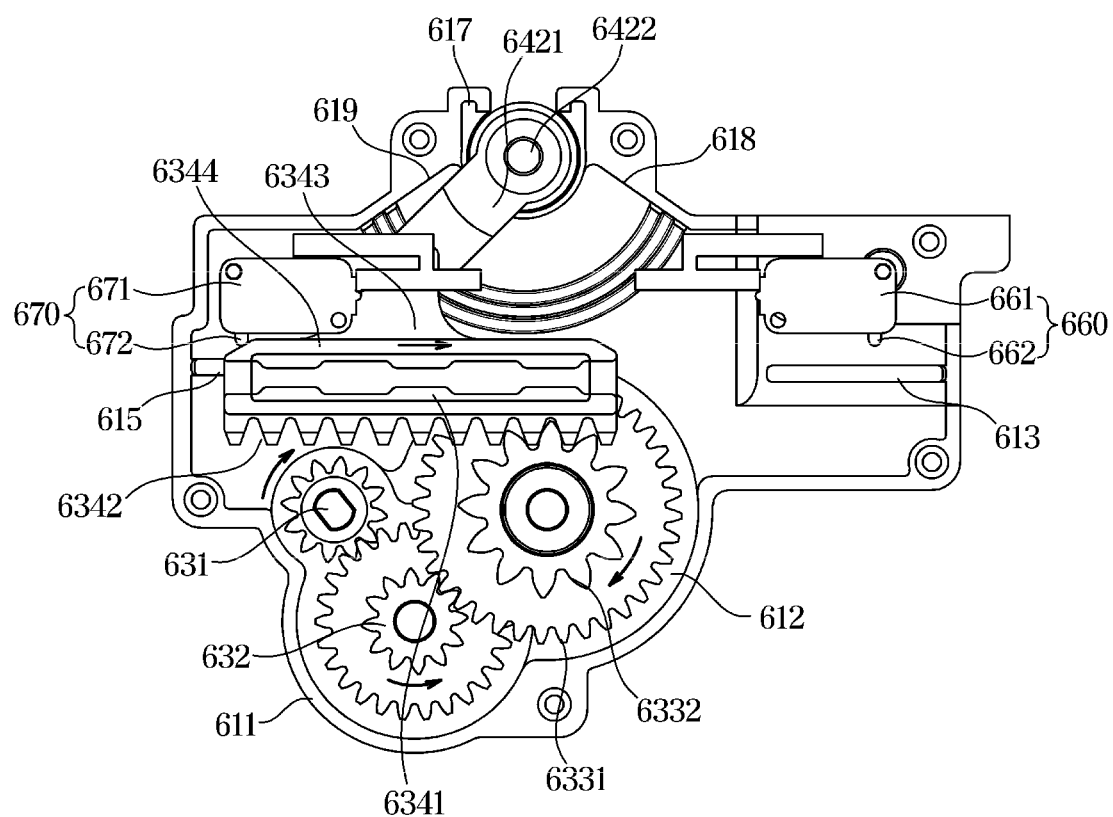
FIG. 19 is a view illustrating the process of adjusting the open state of the valve member to the correct position in the second driving device according to an embodiment of the disclosure.

FIGS. 14, 15 and 16 are views illustrating a process of adjusting a closed state of a valve member to a correct position in the second driving device according to an embodiment of the disclosure. FIGS. 17, 18, and 19 are views illustrating a process of adjusting an open state of the valve member to a correct position in the second driving device according to an embodiment of the disclosure.

A process of adjusting the closed state of the valve member to the correct position will be described with reference to FIGS. 14 to 16.

The holding member 640 of the second driving device 600 may be configured to be rotated with respect to the valve shaft 444 according to the movement of the power transmission member 630. For example, the first pinion gear 631, the second pinion gear 632, and the third pinion gear 633 may be rotated and then the rack gear 634 may be linearly moved in conjunction with the rotation of the gears. Accordingly, the holding member 640 may be rotated based the linear movement of the rack gear 634.

The holding member 640 may be rotated between the first interference portion 618 and the second interference portion 619 inside the second driving case 610. The holding member 640 may not have a variable position with respect to the holding member coupler 617 of the second driving case 610.

The first sensor 660 may include the first detection switch 662 protruding downward to be in contact with the upper surface of the rack gear 634. For example, the first detection switch 662 may be mounted on the first detection body 661 so as to protrude downward from the first detection body 661.

In addition, the first detection switch 662 may be in contact with the detection member 6344 of the rack gear 634.

The second sensor 670 may include the second detection switch 672 protruding downward to come into contact with the upper surface of the rack gear 634. For example, the second detection switch 672 may be mounted on the second detection body 671 so as to protrude downward from the second detection body 671.

In addition, the second detection switch 672 may be in contact with the detection member 6344 of the rack gear 634.

As shown in FIG. 14, the holding member 640 may be arranged at any position. This may be a case in which the valve assembly 44 is not at the correct position of the open or closed state in a situation such as when the food waste disposer 1 is suddenly turned off while the valve assembly 44 is operated.

When the power of the food waste disposer 1 is turned on again, the controller C may move the rack gear 634 toward the first direction. The first direction may be a direction in which the valve assembly 44 is closed.

In all cases in which the food waste disposer 1 is turned on, the controller C moves the rack gear 634 toward the first direction so as to allow the valve assembly 44 to be located at the correct position of the closed state.

When a signal is applied to the sensor as the power transmission member 630 is moved in the first direction and in contact with the sensor, the controller C may control the second driving motor 650 for a first period of time so as to allow the power transmission member 630 to be further moved toward the first direction.

For example, when a signal is applied to the first sensor 660 as the rack gear 634 is moved in the first direction and in contact with the first sensor 660, the controller C may control the second driving motor 650 for the first period of time so as to allow the rack gear 634 to be further moved toward the first direction.

When the power transmission member 630 is moved in the first direction for the first period of time, the holding member 640 and the interference portion may come into contact with each other.

For example, when the rack gear 634 is moved in the first direction for the first period of time, the swing member 6421 of the holding member 640 and the first interference portion 618 of the second driving case 610 may come into contact with each other.

The first period of time may be set as a sufficient time for the rack gear 634 to move in the first direction to an end (e.g., by a maximum amount of movement) inside the second driving case 610. The first period of time may be freely set according to the output of the motor and the gear ratio of the gear.

As shown in FIG. 15, when the controller C further moves the rack gear 634 toward the first direction for the first period of time, the swing member 6421 of the holding member 640 may come into contact with the first interference portion 618.

While the second driving device 600 is changed from the state of FIG. 14 to the state of FIG. 15, the rotation direction of the first pinion gear 631, the second pinion gear 632, and the third pinion gear 633 may be referred to as the first direction. In addition, the movement direction of the rack gear 634 may be referred to as the first direction and the rotation direction of the holding member 640 may also be referred to as the first direction.

Particularly, while the second driving device 600 is changed from the state of FIG. 14 to the state of FIG. 15, the rotation of the first pinion gear 631 in the first direction may be the clockwise direction, the rotation of the second pinion gear 632 in the first direction may be the counterclockwise direction, and the rotation of the third pinion gear 633 in the first direction may be the clockwise direction.

In addition, the movement of the rack gear 634 in the first direction may be a movement to the right side based on the drawing, and the rotation of the holding member 640 in the first direction may be the counterclockwise direction.

As shown in FIG. 16, the controller C may temporarily stop the second driving motor 650 after the first period of time elapses, and the controller C may control the second driving motor 650 for a second period of time, so as to allow the power transmission member 630 to be moved toward the second direction. The second direction may be opposite to the first direction.

For example, the controller C may temporarily stop the second driving motor 650 after the first period of time elapses, and the controller C may control the second driving motor 650 for the second period of time, so as to allow the rack gear 634 to be moved toward the second direction.

The controller C may detect an overcurrent of the second driving motor 650. When the controller C detects an overcurrent of the second driving motor 650, the controller C may control the second driving motor 650 to stop the second driving motor 650.

However, even when the controller C does not detect the overcurrent of the second driving motor 650, the controller C may control the second driving motor 650 to stop the second driving motor 650 in response to the expiration of the first period of time after the signal is applied to the first detection switch 662 of the first sensor 660.

Accordingly, the effect of heat generation due to the overcurrent in the motor may be minimized, and the lifespan of the motor may be increased.

In addition, this may be equally applied to a valve opening correction process to be described later.

When the power transmission member 630 is moved in the second direction for the second period of time, the valve member 442 connected to the holding member 640 may be arranged at the correct position to close the discharge hole.

For example, when the rack gear 634 is moved in the second direction for the second period of time, the valve member 442 connected to the holding member 640 may be arranged at the correct position to close the discharge hole.

While the second driving device 600 is changed from the state of FIG. 15 to the state of FIG. 16, the rotation direction of the first pinion gear 631, the second pinion gear 632, and the third pinion gear 633 may be referred to as the second direction. In addition, the movement direction of the rack gear 634 may be referred to as the second direction and the rotation direction of the holding member 640 may also be referred to as the second direction.

Particularly, while the second driving device 600 is changed from the state of FIG. 15 to the state of FIG. 16, the rotation of the first pinion gear 631 in the second direction may be the counterclockwise direction, the rotation of the second pinion gear 632 in the second direction may be the clockwise direction, and the rotation of the third pinion gear 633 in the second direction may be the counterclockwise direction.

In addition, the movement of the rack gear 634 in the second direction may be a movement to the left side based on the drawing, and the rotation of the holding member 640 in the second direction may be the clockwise direction.

That is, the state shown in FIG. 16 is a state in which the valve assembly 44 closes the discharge hole of the grinding case 41. In this case, the valve shaft 444 of the valve assembly 44 may be vertically arranged. In this case, the shaft through-groove 6411 of the holding member 640 may be arranged to open upward, and thus the valve shaft 444 may be freely separated from the holding member 640.

Therefore, when the detection switch is pressed and a signal is applied to the sensor, the controller C may control the driving motor to generate power in the first direction for the first period of time, and control the driving motor to generate power in the second direction for the second period of time.

A process of adjusting the open state of the valve member to a correct position will be described with reference to FIGS. 17 to 19.

The holding member 640 of the second driving device 600 may be configured to be rotated with respect to the valve shaft 444 according to the movement of the power transmission member 630. For example, the first pinion gear 631, the second pinion gear 632, and the third pinion gear 633 may be rotated and then the rack gear 634 may be linearly moved in conjunction with the rotation of the gears. Accordingly, the holding member 640 may be rotated based on the linear movement of the rack gear 634.

The holding member 640 may be rotated between the first interference portion 618 and the second interference portion 619 inside the second driving case 610. The holding member 640 may not have a variable position with respect to the holding member coupler 617 of the second driving case 610.

The first sensor 660 may include the first detection switch 662 protruding downward to be in contact with the upper surface of the rack gear 634. For example, the first detection switch 662 may be mounted on the first detection body 661 so as to protrude downward from the first detection body 661.

In addition, the first detection switch 662 may be in contact with the detection member 6344 of the rack gear 634.

The second sensor 670 may include the second detection switch 672 protruding downward to come into contact with the upper surface of the rack gear 634. For example, the second detection switch 672 may be mounted on the second detection body 671 so as to protrude downward from the second detection body 671.

In addition, the second detection switch 672 may be in contact with the detection member 6344 of the rack gear 634.

As shown in FIG. 17, the holding member 640 may be arranged at any position.

A case shown in FIG. 17 may be one of processes in which the power transmission member 630 and the holding member 640 are moved in the second direction to allow the valve assembly 44 to open the discharge hole in response to the completion of the disposal process of the disposal device 40 in the state in which the discharge hole of the valve assembly 44 shown in FIG. 16 is closed.

At this time, the controller C may move the rack gear 634 toward the second direction. The second direction may be a direction in which the valve assembly 44 is opened.

When a signal is applied to the sensor as the power transmission member 630 is moved in the second direction and in contact with the sensor, the controller C may control the second driving motor 650 for a third period of time so as to allow the power transmission member 630 to be further moved toward the second direction.

For example, when a signal is applied to the second sensor 670 as the rack gear 634 is moved in the second direction and in contact with the second sensor 670, the controller C may control the second driving motor 650 for the third period of time so as to allow the rack gear 634 to be further moved toward the second direction.

When the power transmission member 630 is moved in the second direction for the third period of time, the holding member 640 and the interference portion may come into contact with each other.

For example, when the rack gear 634 is moved in the second direction for the third period of time, the swing member 6421 of the holding member 640 and the second interference portion 619 of the second driving case 610 may come into contact with each other.

The third period of time may be set as a sufficient time for the rack gear 634 to move in the second direction to an end (e.g., by a maximum amount of movement) inside the second driving case 610. The third period of time may be freely set according to the output of the motor and the gear ratio of the gear.

As shown in FIG. 18, when the controller C further moves the rack gear 634 toward the second direction for the third period of time, the swing member 6421 of the holding member 640 may come into contact with the second interference portion 619.

While the second driving device 600 is changed from the state of FIG. 17 to the state of FIG. 18, the rotation direction of the first pinion gear 631, the second pinion gear 632, and the third pinion gear 633 may be referred to as the second direction. In addition, the movement direction of the rack gear 634 may be referred to as the second direction and the rotation direction of the holding member 640 may also be referred to as the second direction.

Particularly, while the second driving device 600 is changed from the state of FIG. 17 to the state of FIG. 18, the rotation of the first pinion gear 631 in the second direction may be the counterclockwise direction, the rotation of the second pinion gear 632 in the second direction may be the clockwise direction, and the rotation of the third pinion gear 633 in the second direction may be the counterclockwise direction.

In addition, the movement of the rack gear 634 in the second direction may be a movement to the left side based on the drawing, and the rotation of the holding member 640 in the second direction may be the clockwise direction.

As shown in FIG. 19, the controller C may temporarily stop the second driving motor 650 after the third period of time elapses, and the controller C may control the second driving motor 650 for a fourth period of time, so as to allow the power transmission member 630 to be moved toward the first direction. The second direction may be opposite to the first direction.

For example, the controller C may temporarily stop the second driving motor 650 after the third period of time elapses, and the controller C may control the second driving motor 650 for the fourth period of time, so as to allow the rack gear 634 to be moved toward the first direction.

When the power transmission member 630 is moved in the first direction for the fourth period of time, the valve member 442 connected to the holding member 640 may be arranged at the correct position to close the discharge hole.

For example, when the rack gear 634 is moved in the first direction for the fourth period of time, the valve member 442 connected to the holding member 640 may be arranged at the correct position to close the discharge hole.

While the second driving device 600 is changed from the state of FIG. 18 to the state of FIG. 19, the rotation direction of the first pinion gear 631, the second pinion gear 632, and the third pinion gear 633 may be referred to as the first direction. In addition, the movement direction of the rack gear 634 may be referred to as the first direction and the rotation direction of the holding member 640 may also be referred to as the first direction.

Particularly, while the second driving device 600 is changed from the state of FIG. 18 to the state of FIG. 19, the rotation of the first pinion gear 631 in the first direction may be the clockwise direction, the rotation of the second pinion gear 632 in the first direction may be the counterclockwise direction, and the rotation of the third pinion gear 633 in the first direction may be the clockwise direction.

In addition, the movement of the rack gear 634 in the first direction may be a movement to the right side based on the drawing, and the rotation of the holding member 640 in the first direction may be the counterclockwise direction.

That is, the state shown in FIG. 19 is a state (e.g., an open state of the valve member) in which the valve assembly 44 opens the discharge hole of the grinding case 41. In this case, the valve shaft 444 of the valve assembly 44 may be horizontally arranged. In this case, the shaft through-groove 6411 of the holding member 640 may be rotated from a state of being opened to the upper side to a state of being opened to the lateral side, and thus the valve shaft 444 may not be freely separated from the holding member 640.

Therefore, when the detection switch is pressed and a signal is applied to the sensor, the controller C may control the driving motor to generate power in the second direction for the third period of time, and control the driving motor to generate power in the first direction, which is opposite to the second direction, for the fourth period of time. This may be referred to as a valve opening correction operation.

Accordingly, the food waste disposer 1 of the disclosure may allow the closed state of the valve assembly 44 to be performed at the correct position through the processes of FIGS. 14 to 16, and allow the open state of the valve assembly 44 to be performed at the correct position through the processes of FIGS. 17 to 19.

In addition, even when the valve shaft 444 is not aligned with the holding member 640 due to assembly tolerance, etc., it is possible to allow the open and closed state of the valve assembly 44 to be performed at the correct position by resetting the first period of time, the second period of time, the third period of time, and the fourth period of time.

Figure 20:
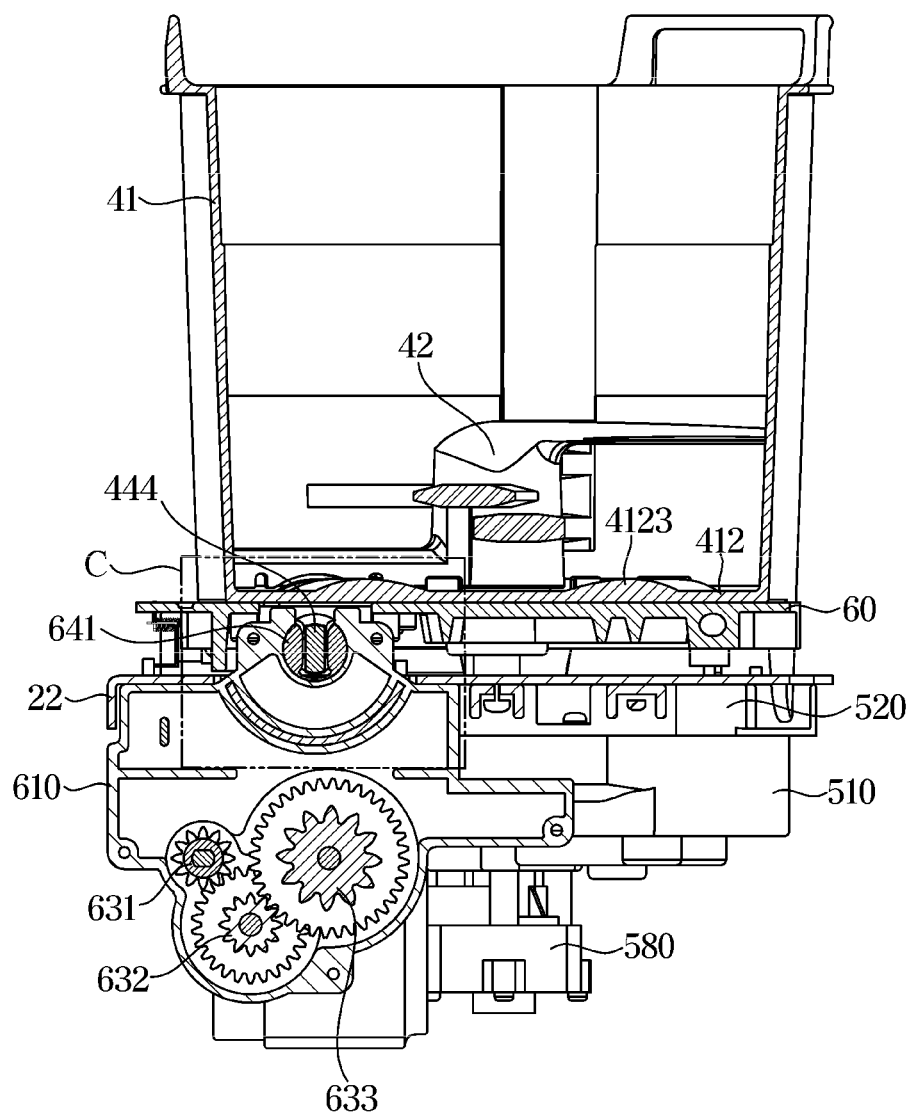
FIG. 20 is a cross-sectional view taken along line B-B' of FIG. 8.
Figure 21:
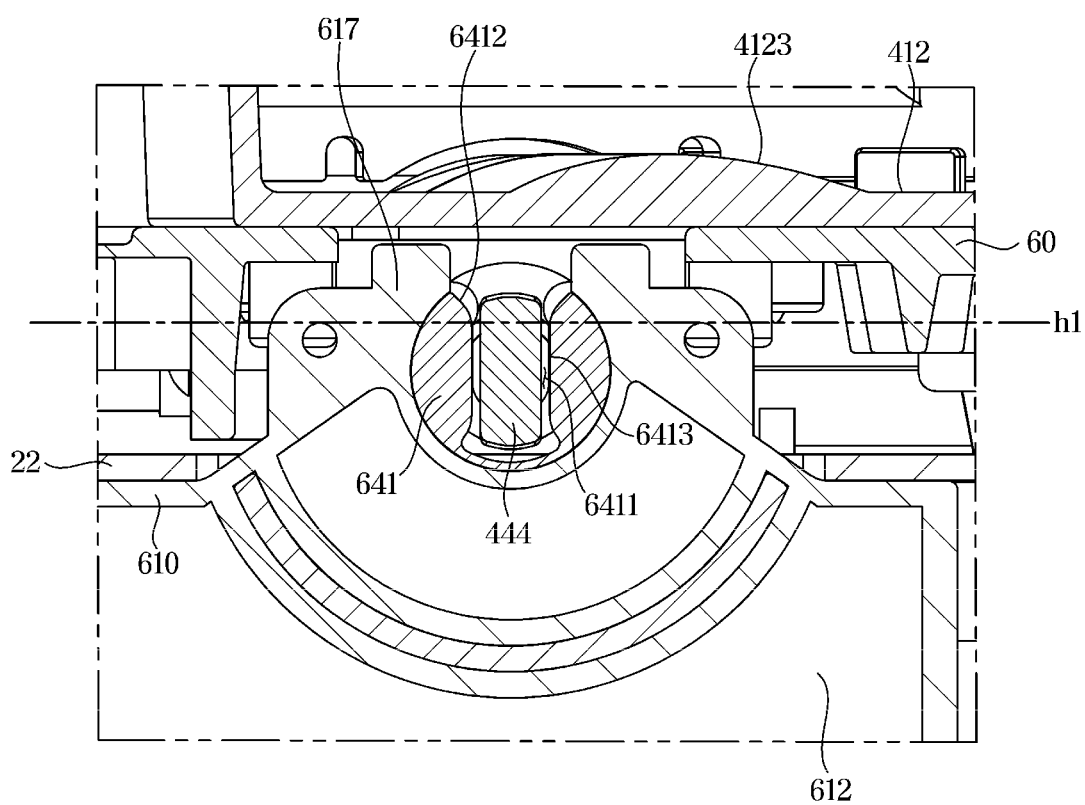
FIG. 21 is an enlarged view of part C of FIG. 20.

FIG. 20 is a cross-sectional view taken along line B-B' of FIG. 8. FIG. 21 is an enlarged view of part C of FIG. 20.

Referring to FIG. 20, when the disposal device 40 is mounted inside the housing 10, the heater 60 and the bottom surface 412 of the grinding case 41 of the disposal device 40 may completely contact each other and thus heat generated from the heater 60 may be effectively transferred to the disposal device 40.

In addition, the valve shaft 444 of the valve assembly 44 of the disposal device 40 may be arranged between the heater 60 and the support frame 22.

As shown in FIGS. 20 and 21, the valve shaft 444 may be accommodated in the shaft through-groove 6411, and spaced apart from the holding body 641 of the holding member 640 by a predetermined distance. The predetermined distance between the valve shaft 444 and the holding body 641 may be provided within 1 mm.

Therefore, the valve shaft 444 may be stably accommodated inside the holding member 640 even when an assembly tolerance or the like occurs.

The valve shaft 444 of the valve assembly 44 may be accommodated inside the holding body 641 to further protrude upward than a height h1 of a portion in which the guide 6412 and the shaft support 6413 of the holding member 640 are connected.

Accordingly, the rotational force of the holding member 640 may be more effectively transmitted to the valve shaft 444. For example, a contact area between the shaft support 6413 of the holding member 640 and the valve shaft 444 may be increased and thus the power transmission efficiency may be increased.

Figure 22:
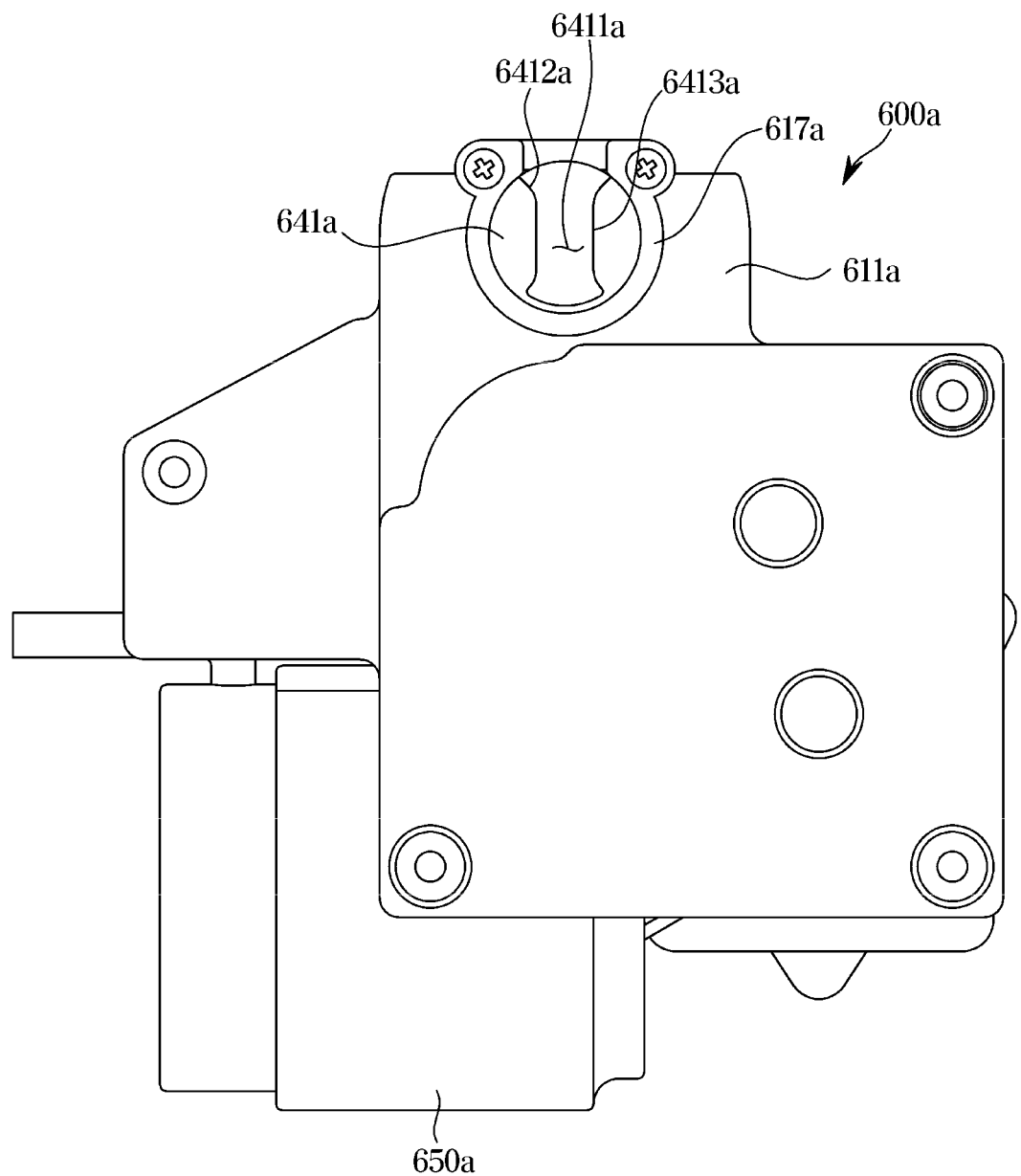
FIG. 22 is a view illustrating a second driving device according to an embodiment of the disclosure, when viewed from the inside.
Figure 23:
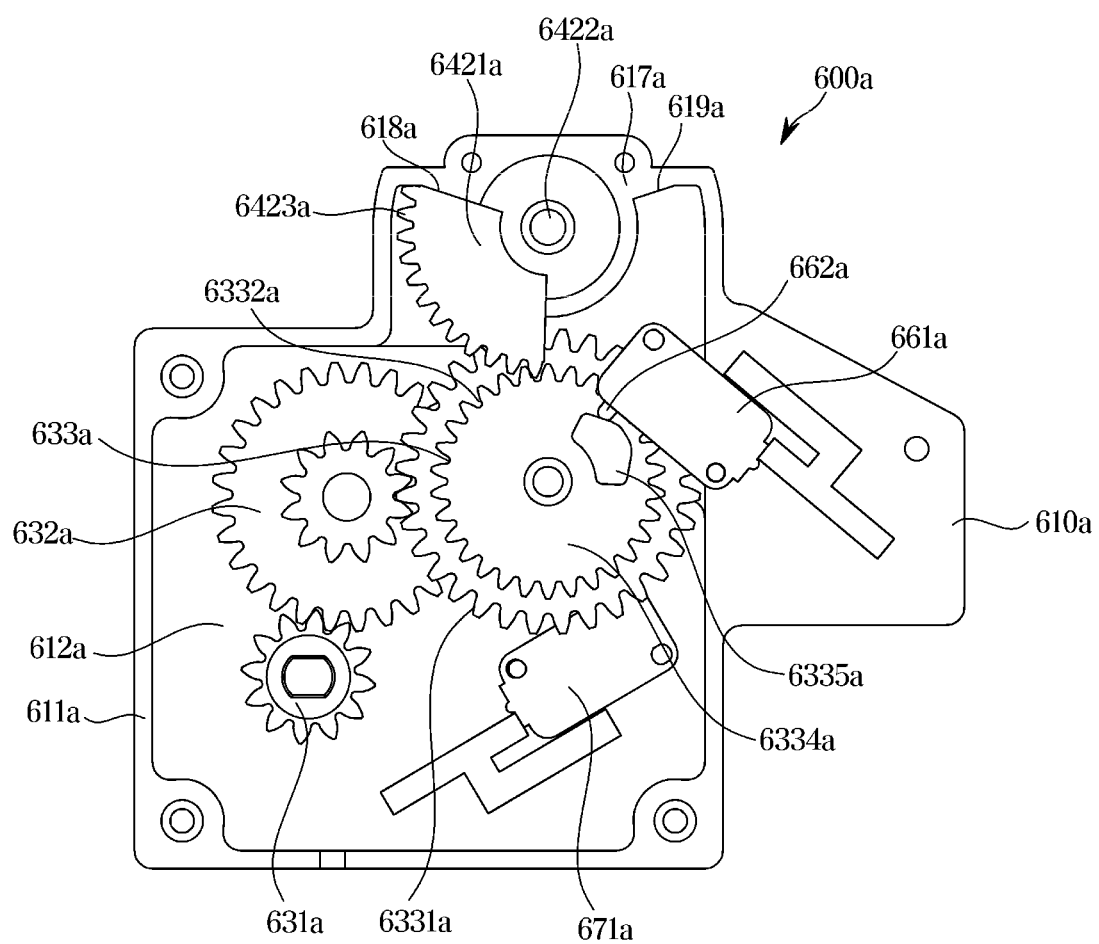
FIG. 23 is a view illustrating a process of adjusting a closed state of a valve member to a correct position in the second driving device according to an embodiment of the disclosure, when viewed from the outside.
Figure 24:
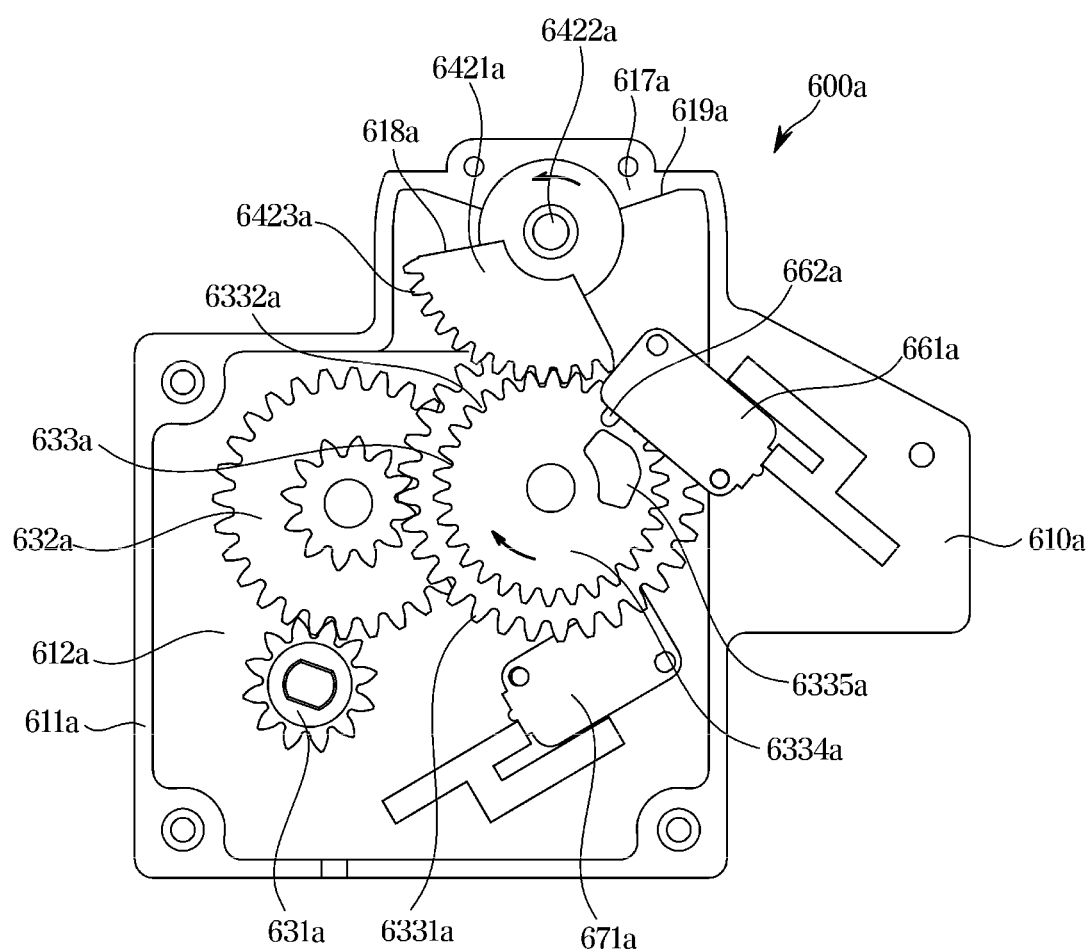
FIG. 24 is a view illustrating a process of adjusting the closed state of the valve member to the correct position in the second driving device according to an embodiment of the disclosure, when viewed from the outside.
Figure 25:
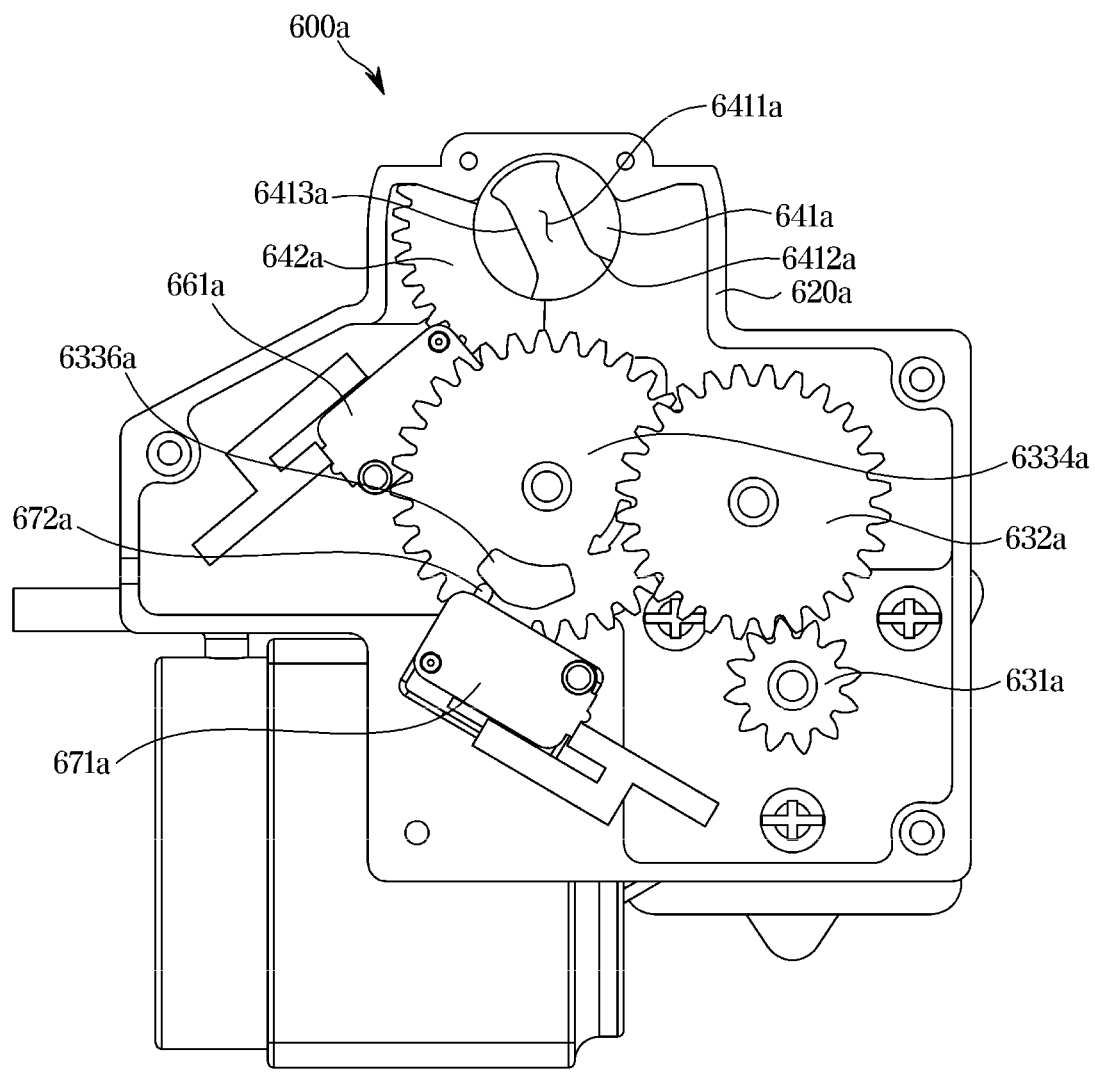
FIG. 25 is a view illustrating a process of adjusting an open state of the valve member to a correct position in the second driving device according to an embodiment of the disclosure, when viewed from the inside.
Figure 26:
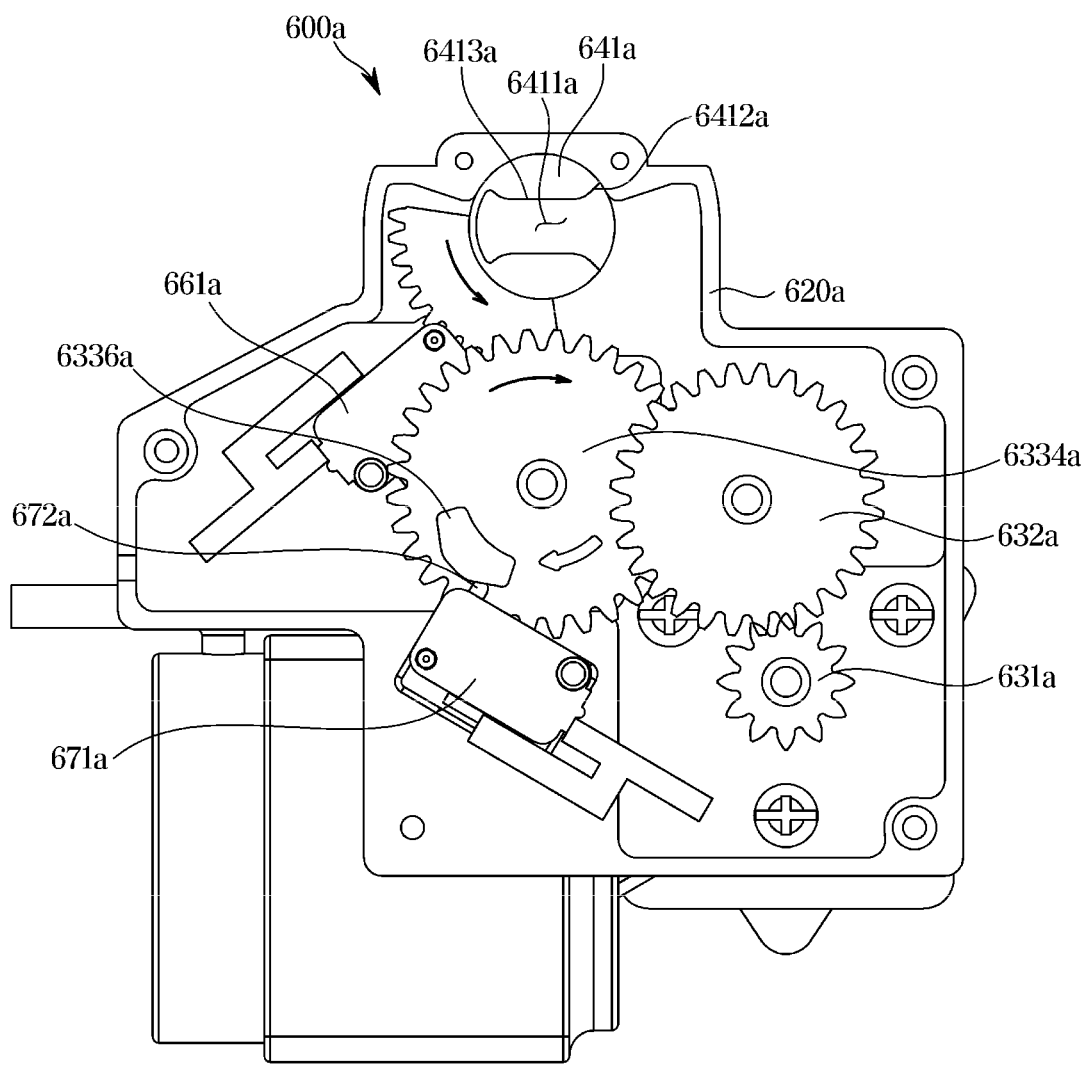
FIG. 26 is a view illustrating a process of adjusting the open state of the valve member to the correct position in the second driving device according to an embodiment of the disclosure, when viewed from the inside.

FIG. 22 is a view illustrating a second driving device according to an embodiment of the disclosure, when viewed from the inside. FIGS. 23 and 24 are views illustrating a process of adjusting a closed state of a valve member to a correct position in the second driving device according to an embodiment of the disclosure, when viewed from the outside. FIGS. 25 and 26 are views illustrating a process of adjusting an open state of the valve member to a correct position in the second driving device according to an embodiment of the disclosure, when viewed from the inside.

FIGS. 22 to 26 may include the same configuration as the food waste disposer 1 according to the above-described embodiment except for a configuration of a second driving device 600a, and thus a description thereof is omitted.

Accordingly, components not separately described may be described using the same reference numerals as those of the food waste disposer 1 according to an embodiment.

As shown in FIG. 22, a holding member 640a may be accommodated in a holding member coupler 617a of a second driving case 610a. The holding member 640a may be rotated with respect to the holding member coupler 617a of the second driving case 610a. For example, a holding body 641a of the holding member 640a may be accommodated in the holding member coupler 617a.

The holding body 641a may include a shaft through-groove 6411a, a guide 6412a, and a shaft support 6413a.

The shaft through-groove 6411a of the holding body 641a may be provided to accommodate the valve shaft 444 of the valve assembly 44. The shaft through-groove 6411a may be provided to open upward when the valve assembly 44 closes the grinding case 41.

In addition, when the valve assembly 44 opens the grinding case 41, the position of the shaft through-groove 6411a may be changed so as to open laterally. This is a positional movement based on rotation of the holding body 641a.

The shaft support 6413a may be provided to include a vertical support surface.

The guide 6412a may be inclined outwardly of the shaft through-groove 6411a to guide insertion of the valve shaft. For example, the guide 6412a may be inclined outwardly from the shaft support 6413a.

The coupling state between the holding member 640a and the valve shaft 444 according to an embodiment of the disclosure may be the same as the coupling state between the holding member 640 and the valve shaft 444 of the food waste disposer 1 according to an embodiment shown in FIG. 21.

For example, the valve shaft 444 may be accommodated in the shaft through-groove 6411a and spaced apart from the holding body 641a of the holding member 640a by a predetermined distance. The predetermined distance between the valve shaft and the holding body 641a may be provided within 1 mm.

The valve shaft of the valve assembly may be accommodated inside the holding body 641a to further protrude upward than a height of a portion in which the guide 6412a and the shaft support 6413a of the holding member 640a are connected.

A process of adjusting the closed state of the valve member to a correct position in the food waste disposer according to an embodiment of the disclosure will be described with reference to FIGS. 23 and 24.

As shown in FIGS. 23 and 24, the holding member 640a of the second driving device 600a may be rotated with respect to the valve shaft 444 according to the movement of a power transmission member 630a.

For example, the holding member 640a may be rotated based on rotation of a first pinion gear 631a, a second pinion gear 632a, and a third pinion gear 633a.

The second driving case 610a may include a second driving case body 611a forming an exterior. A gear accommodating member 612a may be formed inside the second driving case body 611a to accommodate the plurality of pinion gears and a holding member 640a.

The holding member 640a may be rotatably coupled to the holding member coupler 617a of the second driving case 610a. The second driving case 610a may include a first interference portion 618a formed as one sidewall of the case and a second interference portion 619a formed as the other sidewall of the case.

The first interference portion 618a and the second interference portion 619a may be symmetrically positioned with respect to the holding member coupler 617a.

For example, based on FIGS. 23 and 24, the first interference portion 618a may be formed on the upper left side of the second driving case 610a, and the second interference portion 619a may be formed on the upper right side of the second driving case 610a.

The power transmission member 630a of the second driving device 600a according to an embodiment of the disclosure may include a pinion gear. The pinion gear may be provided in plurality.

The holding member 640a may be rotated between the first interference portion 618a and the second interference portion 619a inside the second driving case 610a. The position of the holding member 640a may not be variable with respect to the holding member coupler 617a of the second driving case 610a.

The holding member 640a may include a holding body 641a and an extension body 642a.

As shown in FIG. 22, the holding body 641a may be accommodated in the holding member coupler 617a of the second driving case 610a and rotated with respect to the second driving case 610a. The valve shaft of the valve assembly may be accommodated in the shaft through-groove 6411a of the holding body 641a and thus the valve member 442 may be rotated based on the movement of the holding member 640a.

The extension body 642a may extend from the holding body 641a and be accommodated inside the second driving case 610a.

The extension body 642a may include a swing member 6421a, a holding shaft 6422a, and a pinion gear tooth 6423a.

The holding shaft 6422a may be provided as a rotational center of the holding member 640a. The swing member 6421a may be provided to be rotated in the left and right direction in the second driving case 610a according to rotation of the holding member 640a relative to the holding shaft 6422a.

The pinion gear tooth 6423*a* may be formed at an end of the swing member 6421*a*. The pinion gear tooth 6423*a* may be provided to engage with a holding member tooth 6332*a* of the third pinion gear 633*a* to be described later. The pinion gear tooth 6423*a* may be formed in a lower portion of the swing member 6421*a*.

The plurality of pinion gears may include the first pinion gear 631*a*, the second pinion gear 632*a*, and the third pinion gear 633*a*. Although three pinion gears are shown in FIGS. 23 to 26, the number of pinion gears may not be limited thereto.

The first pinion gear 631*a* may be rotated by receiving power from the second driving motor 650*a*. The second pinion gear 632*a* may be rotated while meshing with the first pinion gear 631*a*. The third pinion gear 633*a* may be rotated while meshing with the second pinion gear 632*a*.

The third pinion gear 633*a* may include a gear tooth 6331*a* and a holding member tooth 6332*a*.

The gear tooth 6331*a* may be provided to engage with the second pinion gear 632*a*.

The pinion gear may include a detection member protruding from the pinion gear.

For example, the third pinion gear 633*a* may include a detection member protruding from the third pinion gear 633*a*.

The third pinion gear 633*a* may include a first surface 6333*a* provided perpendicular to a rotation axis of the third pinion gear 633*a* and a second surface 6334*a* (refer to FIG. 25) opposite to the first surface 6333*a*.

For example, the first surface 6333*a* may be provided on the outside of the third pinion gear 633*a*, and the second surface 6334*a* may be provided on the inside of the third pinion gear 633*a*.

The detection member of the third pinion gear 633*a* may include a first detection member 6335*a* and a second detection member 6336*a* (refer to FIG. 25).

The first detection member 6335*a* may protrude from the first surface 6333*a* of the third pinion gear 633*a*. The first detection member 6335*a* may extend in a direction away from the first surface 6333*a* of the third pinion gear 633*a*.

The second detection member 6336*a* may protrude from the second surface 6334*a* of the third pinion gear 633*a*. The second detection member 6336*a* may extend in a direction away from the second surface 6334*a* of the third pinion gear 633*a*.

The first sensor 660*a* may be arranged outside the third pinion gear 633*a* to be in contact with the first detection member 6335*a*.

The second sensor 670*a* (refer to FIG. 25) may be arranged inside the third pinion gear 633*a* to be in contact with the second detection member 6336*a*.

The first sensor 660*a* may include a first detection switch 662*a* protruding downward to be in contact with the first detection member 6335*a* of the third pinion gear 633*a*. For example, the first detection switch 662*a* may be mounted on a first detection body 661*a* so as to protrude downward from the first detection body 661*a*.

The second sensor 670*a* may include a second detection switch 672*a* (refer to FIG. 25) protruding upward to be in contact with the second detection member 6336*a* of the third pinion gear 633*a*. For example, the second detection switch 672*a* may be mounted on a second detection body 671*a* (refer to FIG. 25) so as to protrude upward from the second detection body 671*a*.

Although not shown in the drawing, the holding member 640*a* may be arranged at any position. This may be a case in which the valve assembly is not at the correct position of the open or closed state in a situation such as when the food waste disposer 1 is suddenly turned off while the food waste disposer according to an embodiment operates the valve assembly.

When the power of the food waste disposer is turned on again, the controller C may move the pinion gear toward the first direction. For example, the controller C may rotate the third pinion gear 633*a* toward the first direction. The first direction may be a direction in which the valve assembly 44 is closed.

In all cases in which the food waste disposer is turned on, the controller C moves the third pinion gear 633*a* toward the first direction so as to allow the holding member 640*a* to be located at the correct position of the closed state.

When a signal is applied to the sensor as the power transmission member 630*a* is moved in the first direction and comes into contact with the sensor, the controller C may control the second driving motor 650*a* for a first period of time so as to allow the power transmission member 630*a* to be further moved toward the first direction.

For example, when a signal is applied to the first sensor 660*a* as the third pinion gear 633*a* is moved to the first direction and comes into contact with the first sensor 660*a*, the controller C may control the second driving motor 650*a* for the first period of time so as to allow the third pinion gear 633*a* to be further moved toward the first direction.

When the power transmission member 630*a* is moved in the first direction for the first period of time, the holding member 640*a* and the interference portion may come into contact with each other.

For example, when the third pinion gear 633*a* is moved in the first direction for the first period of time, the swing member 6421*a* of the holding member 640*a* and the first interference portion 618*a* of the second driving case 610*a* may come into contact with each other. For example, when the third pinion gear 633*a* is rotated in the first direction for the first period of time, a side surface of the swing member 6421*a* of the holding member 640*a* and an inner surface of the first interference portion 618*a* of the second driving case 610*a* may come into contact with each other.

The first period of time may be set as a sufficient time for the holding member 640*a* to move in the first direction to an end (e.g., by a maximum amount of movement) inside the second driving case 610*a*. The first period of time may be freely set according to the output of the motor and the gear ratio of the gear.

As shown in FIG. 23, when the controller C further moves the third pinion gear 633*a* toward the first direction for the first period of time, the swing member 6421*a* of the holding member 640*a* may come into contact with the first interference portion 618*a*.

While the second driving device 600*a* is changed to the state shown in FIG. 23, the rotation direction of the first pinion gear 631*a*, the second pinion gear 632*a*, and the third pinion gear 633*a* may be referred to as the first direction. The rotation direction of the holding member 640*a* may be referred to as the first direction.

Particularly, while the second driving device 600*a* is changed to the state shown in FIG. 23, the rotation of the first pinion gear 631*a* in the first direction may be the counterclockwise direction, the rotation of the second pinion gear 632*a* in the first direction may be the clockwise direction, and the rotation of the third pinion gear 633*a* in the first direction may be the counterclockwise direction.

In addition, the movement of the holding member 640*a* in the first direction may be a movement in the clockwise direction, and may be a movement to the left side based on the drawing.

As shown in FIG. 24, the controller C may temporarily stop the second driving motor 650*a* after the first period of time elapses, and the controller C may control the second driving motor 650*a* for a second period of time, so as to allow the power transmission member 630*a* to be moved toward the second direction. The second direction may be opposite to the first direction.

For example, the controller C may temporarily stop the second driving motor 650*a* after the first period of time elapses, and the controller C may control the second driving motor 650*a* for the second period of time, so as to allow the third pinion gear 633*a* to be moved toward the second direction.

When the power transmission member 630 is moved in the second direction for the second period of time, the valve member connected to the holding member 640*a* may be arranged at the correct position to close the discharge hole.

For example, when the third pinion gear 633*a* is moved in the second direction for the second period of time, the valve member connected to the holding member 640*a* may be arranged at the correct position to close the discharge hole.

While the second driving device 600*a* is changed from the state of FIG. 23 to the state of FIG. 24, the rotation direction of the first pinion gear 631*a*, the second pinion gear 632*a*, and the third pinion gear 633*a* may be referred to as the second direction. In addition, the rotation direction of the holding member 640*a* may also be referred to as the second direction.

Particularly, while the second driving device 600*a* is changed from the state of FIG. 23 to the state of FIG. 24, the rotation of the first pinion gear 631*a* in the second direction may be the clockwise direction, the rotation of the second pinion gear 632*a* in the second direction may be the counterclockwise direction, and the rotation of the third pinion gear 633*a* in the second direction may be the clockwise direction.

Further, the rotation of the holding member 640*a* in the second direction may be the counterclockwise direction.

That is, the state shown in FIG. 24 is a state in which the valve assembly closes the discharge hole of the grinding case. In this case, the valve shaft of the valve assembly may be vertically arranged. In this case, the shaft through-groove 6411*a* of the holding member 640*a* may be arranged to open upward, and thus the valve shaft may be freely separated from the holding member 640*a*.

Therefore, when the first detection switch 662*a* of the first sensor 660*a* is pressed and a signal is applied to the sensor, the controller C may control the driving motor to generate power in the first direction for the first period of time, and control the driving motor to generate power in the second direction, which is opposite to the first direction, for the second period of time. This may be referred to as a valve closing correction operation.

A process of adjusting the open state of the valve member to a correct position will be described with reference to FIGS. 25 and 26.

The holding member 640*a* of the second driving device 600*a* may be configured to be rotated with respect to the valve shaft according to the movement of the power transmission member 630*a*. For example, the holding member 640*a* may be rotated based on the rotation of the first pinion gear 631*a*, the second pinion gear 632*a*, and the third pinion gear 633*a*.

The holding member 640*a* may be rotated between the first interference portion 618*a* and the second interference portion 619*a* inside the second driving case 610*a*. The holding member 640*a* may not have a variable position with respect to the holding member coupler 617*a* of the second driving case 610*a*.

The first sensor 660*a* may include the first detection switch 662*a* protruding downward to be in contact with the third pinion gear 633*a*. For example, the first detection switch 662*a* may be mounted on the first detection body 661*a* so as to protrude downward from the first detection body 661*a*.

Further, the first detection switch 662*a* may be in contact with the first detection member 6335*a* of the third pinion gear 633*a*.

The second sensor 670*a* may include the second detection switch 672*a* protruding upward to be in contact with the third pinion gear 633*a*. For example, the second detection switch 672*a* may be mounted on the second detection body 671*a* so as to protrude upward from the second detection body 671*a*.

Further, the second detection switch 672*a* may be in contact with the second detection member 6336*a* of the third pinion gear 633*a*.

The holding member 640*a* may be arranged at any position. That is, arranging the holding member 640*a* at any position may be one of processes in which the power transmission member 630*a* and the holding member 640*a* are moved in the second direction to allow the valve assembly to open the discharge hole in response to the completion of the disposal process of the disposal device in the state in which the discharge hole of the valve assembly is closed.

At this time, the controller C may move the third pinion gear 633*a* toward the second direction. The second direction may be a direction for opening the valve assembly.

When a signal is applied to the sensor as the power transmission member 630*a* is moved in the second direction and comes into contact with the sensor, the controller C may control the second driving motor 650*a* for a third period of time so as to allow the power transmission member 630*a* to be further moved toward the second direction.

For example, when a signal is applied to the second sensor 670*a* as the third pinion gear 633*a* is moved to the second direction and comes into contact with the second sensor 670*a*, the controller C may control the second driving motor 650*a* for the third period of time so as to allow the third pinion gear 633*a* to be further moved toward the second direction.

When the power transmission member 630*a* is moved in the second direction for the third period of time, the holding member 640*a* and the interference portion may come into contact with each other.

For example, when the third pinion gear 633*a* is moved in the second direction for the third period of time, the swing member 6421*a* of the holding member 640*a* and the second interference portion 619*a* of the second driving case 610*a* may come into contact with each other. For example, when the third pinion gear 633*a* is moved in the second direction for the third period of time, a side surface of the swing member 6421*a* of the holding member 640*a* and an inner surface of the second interference portion 619*a* of the second driving case 610*a* may come into contact with each other.

The third period of time may be set as a sufficient time for the holding member 640*a* to move in the second direction to an end (e.g., by a maximum amount of movement) inside the second driving case 610*a*. The third period of time may be freely set according to the output of the motor and the gear ratio of the gear.

As shown in FIG. 25, when the controller C further moves the third pinion gear 633*a* toward the second direction for the third period of time, the swing member 6421*a* of the holding member 640*a* may come into contact with the second interference portion 619*a*.

While the second driving device 600*a* is changed to the state shown in FIG. 25, the rotation direction of the first pinion gear 631*a*, the second pinion gear 632*a*, and the third pinion gear 633*a* may be referred to as the second direction. The rotation direction of the holding member 640*a* may be referred to as the second direction.

Particularly, while the second driving device 600*a* is changed to the state shown in FIG. 25, the rotation of the first pinion gear 631*a* in the second direction may be the counterclockwise direction, the rotation of the second pinion gear 632*a* in the second direction may be the clockwise direction, and the rotation of the third pinion gear 633*a* in the second direction may be the counterclockwise direction.

Further, the rotation of the holding member 640*a* in the second direction may be the clockwise direction.

As shown in FIG. 26, the controller C may temporarily stop the second driving motor 650*a* after the third period of time elapses, and the controller C may control the second driving motor 650*a* for a fourth period of time, so as to allow the power transmission member 630*a* to be moved toward the first direction. The second direction may be opposite to the first direction.

For example, the controller C may temporarily stop the second driving motor 650*a* after the third period of time elapses, and the controller C may control the second driving motor 650*a* for the fourth period of time, so as to allow the third pinion gear 633*a* to be moved toward the first direction.

When the power transmission member 630 is moved in the first direction for the fourth period of time, the valve member connected to the holding member 640*a* may be arranged at the correct position to close the discharge hole.

For example, when the third pinion gear 633*a* is moved in the first direction for the fourth period of time, the valve member connected to the holding member 640*a* may be arranged at the correct position to close the discharge hole.

While the second driving device 600*a* is changed from the state of FIG. 25 to the state of FIG. 26, the rotation direction of the first pinion gear 631*a*, the second pinion gear 632*a*, and the third pinion gear 633*a* may be referred to as the first direction. In addition, the rotation direction of the holding member 640*a* may also be referred to as the first direction.

Particularly, while the second driving device 600*a* is changed from the state of FIG. 25 to the state of FIG. 26, the rotation of the first pinion gear 631*a* in the first direction may be the clockwise direction, the rotation of the second pinion gear 632*a* in the first direction may be the counterclockwise direction, and the rotation of the third pinion gear 633*a* in the first direction may be the clockwise direction.

Further, the rotation of the holding member 640*a* in the first direction may be the counterclockwise direction.

That is, the state shown in FIG. 26 is a state in which the valve assembly opens the discharge hole of the grinding case. In this case, the valve shaft of the valve assembly may be horizontally arranged. In this case, the shaft through-groove 6411*a* of the holding member 640*a* may be rotated from a state of being opened to the upper side to a state of being opened to the lateral side and thus the valve shaft may not be freely separated from the holding member 640*a*.

Therefore, when the detection switch is pressed and a signal is applied to the second sensor 670*a*, the controller C may control the driving motor to generate power in the second direction for the third period of time, and control the driving motor to generate power in the first direction, which is opposite to the second direction, for the fourth period of time. This may be referred to as the valve opening correction operation.

Accordingly, the food waste disposer 1 according to an embodiment of the disclosure may allow the closed state of the valve assembly to be performed at the correct position through the processes of FIGS. 23 and 24, and allow the open state of the valve assembly to be performed at the correct position through the processes of FIGS. 25 and 26.

Figure 27:
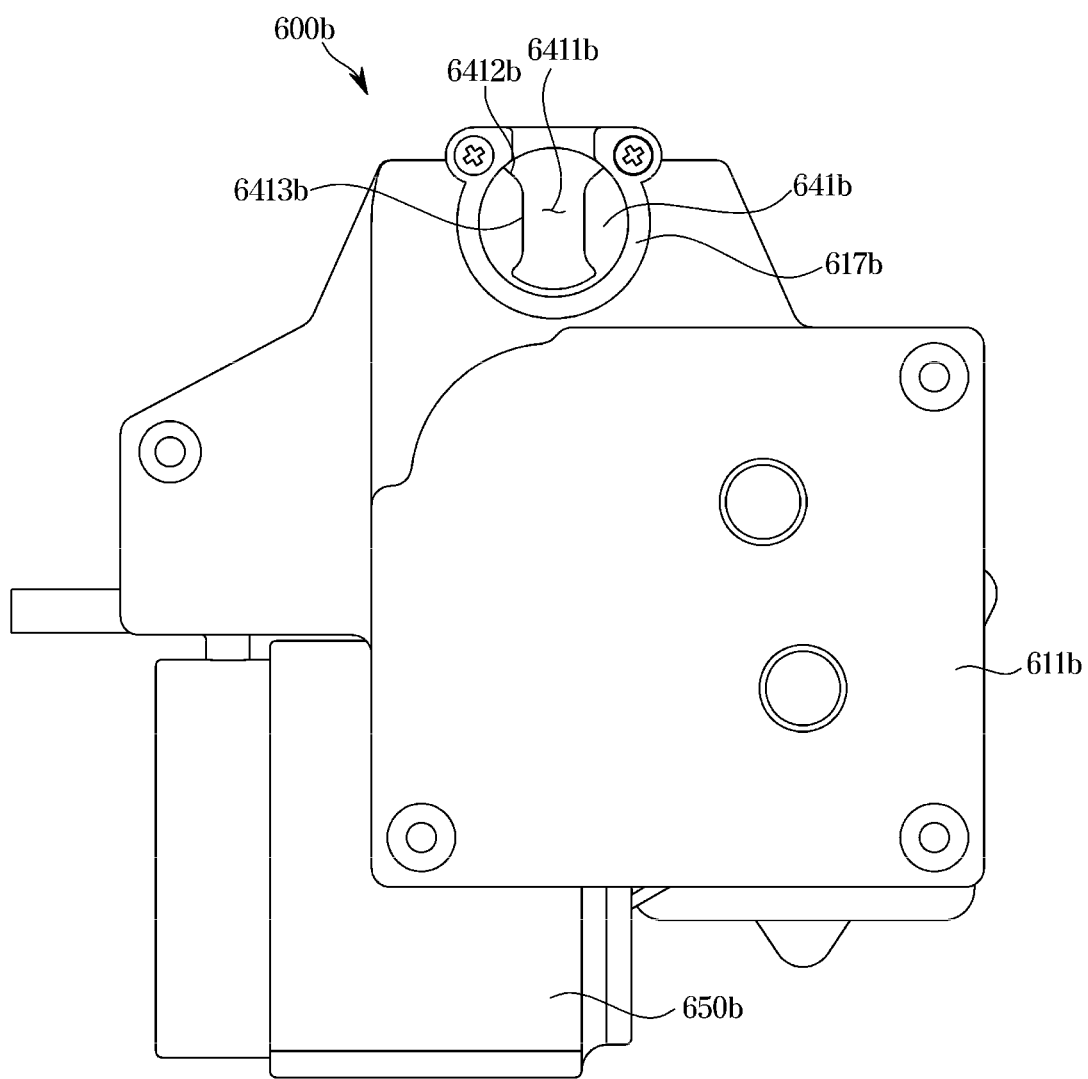
FIG. 27 is a view illustrating a second driving device according to an embodiment of the disclosure, when viewed from the inside.
Figure 28:
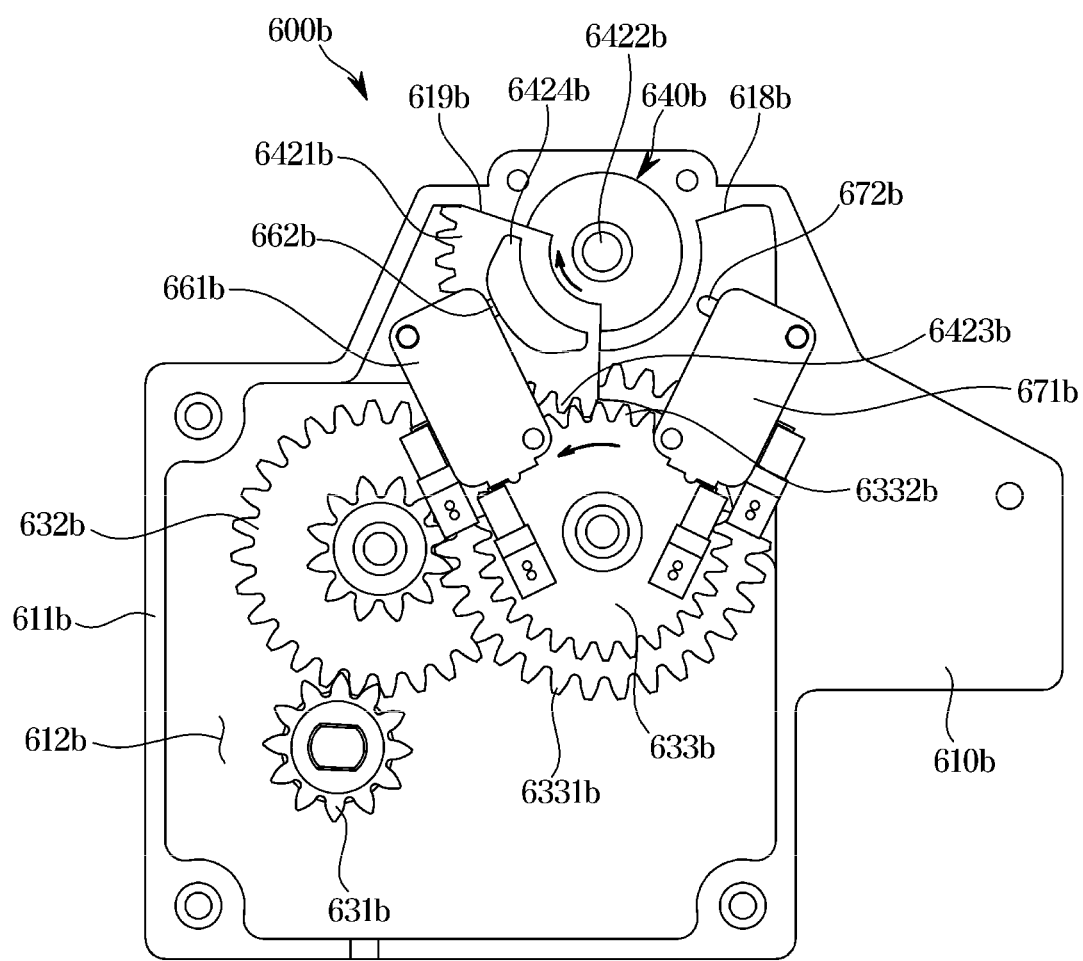
FIG. 28 is a view illustrating a process of adjusting a closed state of a valve member to a correct position in the second driving device according to an embodiment of the disclosure, when viewed from the outside.
Figure 29:
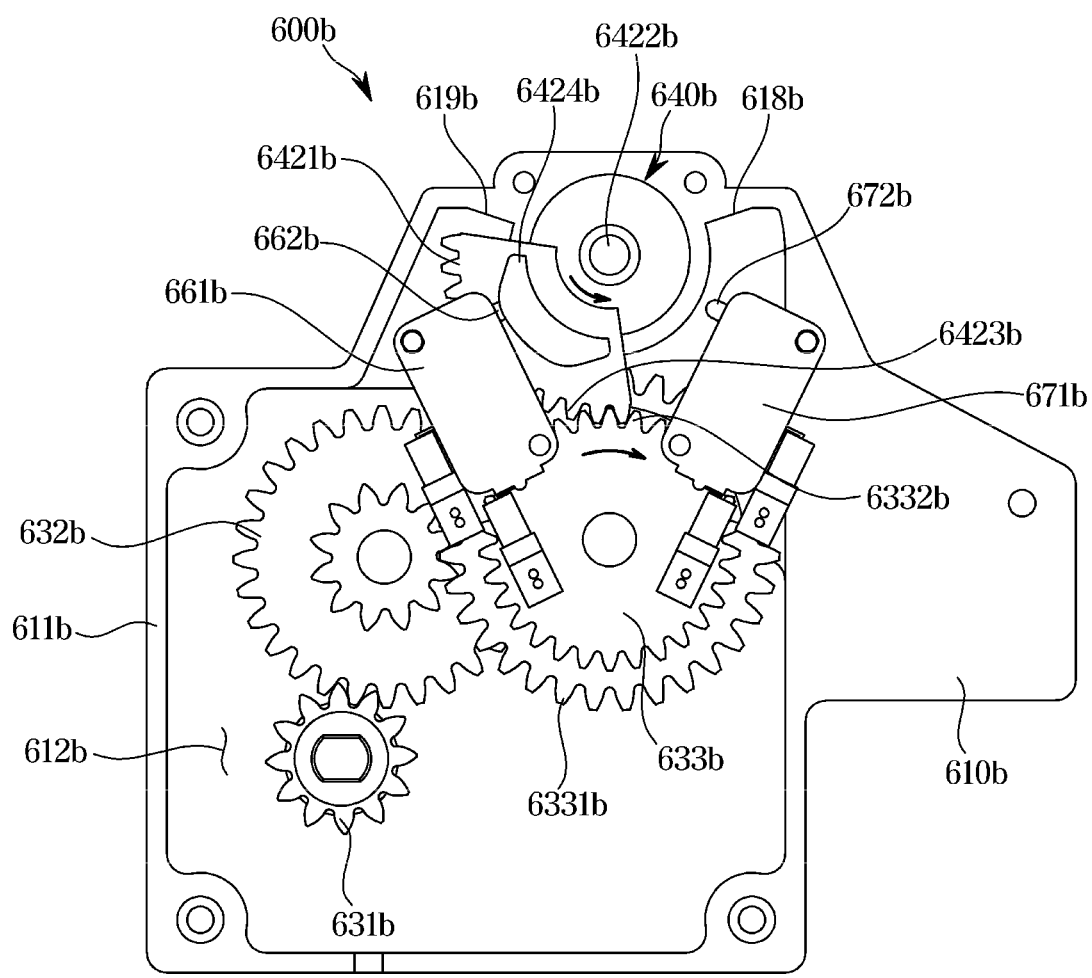
FIG. 29 is a view illustrating a process of adjusting the closed state of the valve member to the correct position in the second driving device according to an embodiment of the disclosure, when viewed from the outside.

FIG. 27 is a view illustrating a second driving device according to an embodiment of the disclosure, when viewed from the inside. FIGS. 28 and 29 are views illustrating a process of adjusting a closed state of a valve member to a correct position in the second driving device according to an embodiment of the disclosure, when viewed from the outside.

Referring to FIG. 27, a holding member 640*b* may be accommodated in a holding member coupler 617*b* of a second driving case 610*b*. The holding member 640*b* may be rotated with respect to the holding member coupler 617*b* of the second driving case 610*b*. For example, the holding body 641*b* of the holding member 640*b* may be accommodated in the holding member coupler 617*b*.

The holding body 641*b* may include a shaft through-groove 6411*b*, a guide 6412*b*, and a shaft support 6413*b*.

The shaft through-groove 6411*b* of the holding body 641*b* may be provided to accommodate the valve shaft 444 of the valve assembly 44. The shaft through-groove 6411*b* may be provided to open upward when the valve assembly 44 closes the grinding case 41.

In addition, when the valve assembly 44 opens the grinding case 41, the position of the shaft through-groove 6411*b* may be changed so as to open laterally. This is a positional movement based on rotation of the holding body 641*b*.

The shaft support 6413*b* may be provided to include a vertical support surface.

The guide 6412*b* may be inclined outwardly of the shaft through-groove 6411*b* to guide insertion of the valve shaft 444. For example, the guide 6412*b* may be inclined outwardly from the shaft support 6413*b*.

The coupling state between the holding member 640*b* and the valve shaft 444 according to an embodiment of the disclosure may be the same as the coupling state between the holding member 640 and the valve shaft 444 of the food waste disposer 1 according to an embodiment shown in FIG. 21.

For example, the valve shaft 444 may be accommodated in the shaft through-groove 6411*b* and spaced apart from the holding body 641*b* of the holding member 640*b* by a predetermined distance. The predetermined distance between the valve shaft 444 and the holding body 641*b* may be provided within 1 mm.

The valve shaft 444 of the valve assembly 44 may be accommodated inside the holding body 641*b* to further protrude upward than a height of a portion in which the guide 6412*b* and the shaft support 6413*b* of the holding member 640*b* are connected.

A process of adjusting the closed state of the valve member 442 to a correct position in the food waste disposer 1 according to an embodiment of the disclosure will be described with reference to FIGS. 28 and 29.

As shown in FIGS. 28 and 29, the holding member 640*b* of the second driving device 600*b* may be rotated with respect to the valve shaft 444 according to the movement of a power transmission member 630*b*.

For example, the holding member 640*b* may be rotated based on rotation of a screw gear 636*b*, a first pinion gear 631*b*, a second pinion gear 632*b*, and a third pinion gear 633*b*.

The second driving case 610*b* may include a second driving case body 611*b* forming an exterior. A gear accommodating member 612*b* may be formed inside the second driving case body 611*b* to accommodate the screw gear 636*b*, the plurality of pinion gears and the holding member 640*b*.

The holding member 640*b* may be rotatably coupled to the holding member coupler 617*b* of the second driving case 610*b*. The second driving case 610*b* may include a first interference portion 619*b* formed as one sidewall of the case and a second interference portion 618*b* formed as the other sidewall of the case.

The first interference portion 619*b* and the second interference portion 618*b* may be symmetrically positioned with respect to the holding member coupler 617*b*.

For example, based on FIGS. 27 to 29, the first interference portion 619*b* may be formed on the upper left side of the second driving case 610*b*, and the second interference portion 618*b* may be formed on the upper right side of the second driving case 610*b*.

The power transmission member 630*b* of the second driving device 600*b* according to an embodiment of the disclosure may include a pinion gear. The pinion gear may be provided in plurality.

The holding member 640*b* may be rotated between the first interference portion 619*b* and the second interference portion 618*b* inside the second driving case 610*b*. The position of the holding member 640*b* may not be variable with respect to the holding member coupler 617*b* of the second driving case 610*b*.

The holding member 640*b* may include a holding body 641*b* and an extension body 642*b*.

As shown in FIG. 27, the holding body 641*b* may be accommodated in the holding member coupler 617*b* of the second driving case 610*b* and rotated with respect to the second driving case 610*b*. The valve shaft 444 of the valve assembly 44 may be accommodated in the shaft throughgroove 6411*b* of the holding body 641*b* and thus the valve member 442 may be rotated based on the movement of the holding member 640*b*.

The extension body 642*b* may extend from the holding body 641*b* and be accommodated inside the second driving case 610*b*.

The extension body 642*b* may include a swing member 6421*b*, a holding shaft 6422*b*, a pinion gear tooth 6423*b*, and a holding detection member 6424*b*.

The holding shaft 6422*b* may be provided as a rotational center of the holding member 640*b*. The swing member 6421*b* may be provided to be rotated in the left and right direction in the second driving case 610*b* according to rotation of the holding member 640*b* relative to the holding shaft 6422*b*.

The pinion gear tooth 6423*b* may be formed at an end of the swing member 6421*b*. The pinion gear tooth 6423*b* may be provided to engage with a holding member tooth 6332*b* of the third pinion gear 633*b*. The pinion gear tooth 6423*b* may be formed in a lower portion of the swing member 6421*b*.

The holding detection member 6424*b* may be formed to protrude from the swing member 6421*b*. The holding detection member 6424*b* may protrude from one surface of the swing member 6421*b* toward the first sensor 660*b*.

The plurality of pinion gears may include the first pinion gear 631*b*, the second pinion gear 632*b*, and the third pinion gear 633*b*. Although three pinion gears are shown in FIGS. 28 and 29, the number of pinion gears may not be limited thereto.

The first pinion gear 631*b* may be rotated by receiving power from the second driving motor 650*b*. The second pinion gear 632*b* may be rotated while meshing with the first pinion gear 631*b*. The third pinion gear 633*b* may be rotated while meshing with the second pinion gear 632*b*.

The third pinion gear 633*a* may include a gear tooth 6351*a* and a holding member tooth 6332*b*.

The gear tooth 6351*b* may be provided to engage with the third pinion gear 633*b*.

The first sensor 660*b* may be arranged on one inner side of the second driving case 610*b* to come into contact with the holding detection member 6424*b* of the holding member 640*b*.

The second sensor 670*b* may be arranged on the other inner side of the second driving case 610*b* to come into contact with the detection member 6424*b* of the holding member 640*b*.

The first sensor 660*b* may include a first detection switch 662*b* protruding upward to be in contact with the holding detection member 6424*b* of the holding member 640*b*. For example, the first detection switch 662*b* may be mounted on the first detection body 661*b* so as to protrude upward from the first detection body 661*b*.

The second sensor 670*b* may include a second detection switch 672*b* protruding upward to be in contact with the holding detection member 6424*b* of the holding member 640*b*. For example, the second detection switch 672*b* may be mounted on the second detection body 671*b* so as to protrude upward from the second detection body 671*b*.

Although not shown in the drawing, the holding member 640*b* may be arranged at any position. This may be a case in which the valve assembly is not at the correct position of the open or closed state in a situation such as when the food waste disposer 1 is suddenly turned off while the food waste disposer 1 according to an embodiment operates the valve assembly 44.

When the power of the food waste disposer is turned on again, the controller C may move the pinion gear toward the first direction. For example, the controller C may rotate the third pinion gear 633*b* toward the first direction. The first direction may be a direction in which the valve assembly 44 is closed.

In all cases in which the food waste disposer 1 is turned on, the controller C moves a fifth pinion gear 635*b* toward the first direction so as to allow the third pinion gear 633*b* to be located at the correct position of the closed state.

When a signal is applied to the sensor as the power transmission member 630*b* is moved in the first direction and the holding member 640*b* comes into contact with the sensor, the controller C may control the second driving motor 650*a* for a first period of time so as to allow the power transmission member 630*a* and the holding member 640*b* to be further moved toward the first direction.

For example, when a signal is applied to the first sensor 660*b* as the third pinion gear 633*b* is moved to the first direction and the holding detection member 6424*b* of the holding member 640*b* comes into contact with the first sensor 660*b*, the controller C may control the second driving motor 650*b* for the first period of time so as to allow the third pinion gear 633*b* to be further moved toward the first direction.

When the power transmission member 630*b* is moved in the first direction for the first period of time, the holding member 640*b* and the interference portion may come into contact with each other.

For example, when the third pinion gear 633*b* is moved in the first direction for the first period of time, the swing member 6421*b* of the holding member 640*b* and the first interference portion 619*b* of the second driving case 610*b* may come into contact with each other. For example, when the third pinion gear 633*b* is moved in the first direction for the first period of time, a side surface of the swing member 6421*b* of the holding member 640*b* and an inner surface of the first interference portion 619*b* of the second driving case 610*b* may come into contact with each other.

The first period of time may be set as a sufficient time for the holding member 640*b* to move in the first direction to an end (e.g., by a maximum amount of movement) inside the second driving case 610*b*. The first period of time may be freely set according to the output of the motor and the gear ratio of the gear.

As shown in FIG. 28, when the controller C further moves the third pinion gear 633*b* toward the first direction for the first period of time, the swing member 6421*b* of the holding member 640*b* may come into contact with the first interference portion 619*b*.

While the second driving device 600*b* is changed to the state shown in FIG. 28, the rotation direction of the first pinion gear 631*b*, the second pinion gear 632*b*, and the third pinion gear 633*b* may be referred to as the first direction. The rotation direction of the holding member 640*b* may be referred to as the first direction.

Particularly, while the second driving device 600*b* is changed to the state shown in FIG. 28, the rotation of the first pinion gear 631*b* in the first direction may be the counterclockwise direction, the rotation of the second pinion gear 632*b* in the first direction may be the clockwise direction, and the rotation of the third pinion gear 633*b* in the first direction may be the counterclockwise direction.

In addition, the movement of the holding member 640*b* in the first direction may be a movement in the clockwise direction, and may be a movement to the left side based on the drawing.

As shown in FIG. 29, the controller C may temporarily stop the second driving motor 650*b* after the first period of time elapses, and the controller C may control the second driving motor 650*b* for a second period of time, so as to allow the power transmission member 630*b* to be moved toward the second direction. The second direction may be opposite to the first direction.

For example, the controller C may temporarily stop the second driving motor 650*b* after the first period of time elapses, and the controller C may control the second driving motor 650*b* for the second period of time, so as to allow the third pinion gear 633*b* to be moved toward the second direction.

When the power transmission member 630*b* is moved in the second direction for the second period of time, the valve member 442 connected to the holding member 640*b* may be arranged at the correct position to close the discharge hole.

For example, when the third pinion gear 633*b* is moved in the second direction for the second period of time, the valve member 442 connected to the holding member 640*b* may be arranged at the correct position to close the discharge hole.

While the second driving device 600*b* is changed from the state of FIG. 28 to the state of FIG. 29, the rotation direction of the first pinion gear 631*b*, the second pinion gear 632*b*, and the third pinion gear 633*b* may be referred to as the second direction. In addition, the rotation direction of the holding member 640*b* may also be referred to as the second direction.

Particularly, while the second driving device 600*b* is changed from the state of FIG. 28 to the state of FIG. 29, the rotation of the first pinion gear 631*b* in the second direction may be the clockwise direction, the rotation of the second pinion gear 632*b* in the second direction may be the counterclockwise direction, and the rotation of the third pinion gear 633*b* in the second direction may be the clockwise direction.

Further, the rotation of the holding member 640*b* in the second direction may be the counterclockwise direction.

That is, the state shown in FIG. 29 is a state in which the valve assembly 44 closes the discharge hole of the grinding case. In this case, the valve shaft 444 of the valve assembly 44 may be vertically arranged. In this case, the shaft through-groove 6411*b* of the holding member 640*b* may be arranged to open upward, and thus the valve shaft 444 may be freely separated from the holding member 640*b*.

Therefore, when the first detection switch 662*b* of the first sensor 660*b* is pressed by the holding member 640*b* and a signal is applied to the sensor, the controller C may control the driving motor to generate power in the first direction for the first period of time, and control the driving motor to generate power in the second direction, which is opposite to the first direction, for the second period of time. This may be referred to as the valve closing correction operation.

In the valve opening correction operation, the holding member 640*b* is rotated until the holding member 640*b* comes into contact with the second interference portion 618*b*, and then the holding member 640*b* is rotated to an opposite direction, thereby correcting the position, which is opposite to the description shown in FIGS. 28 and 29. Therefore, a description of the valve opening correction operation will be omitted.

Figure 30:
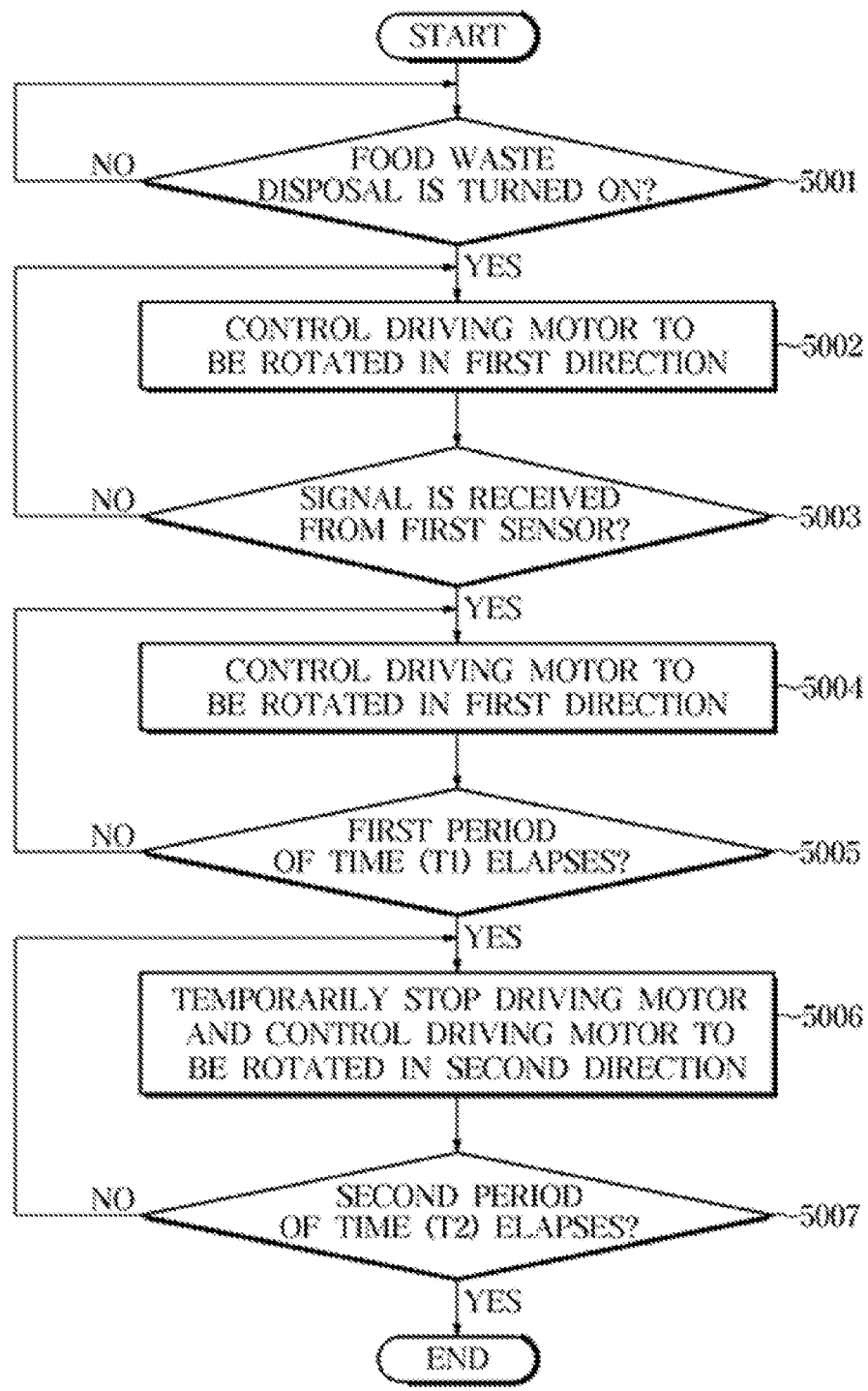
FIG. 30 is a flow chart of a process of adjusting the closed state of the valve member to the correct position in the food waste disposer according to an embodiment of the disclosure.
Figure 31:
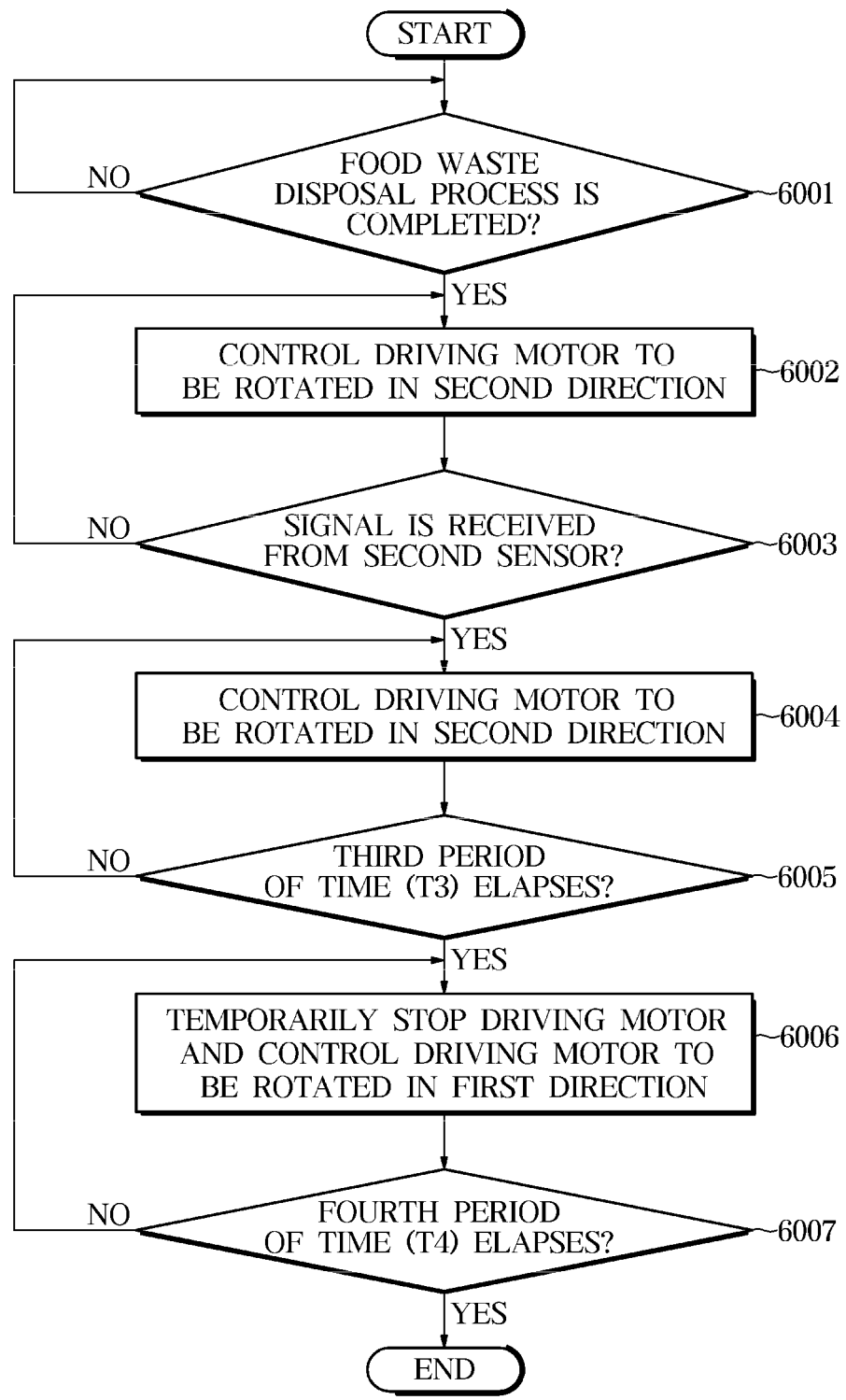
FIG. 31 is a flowchart illustrating a process of adjusting the open state of the valve member to the correct position in the food waste disposer according to an embodiment of the disclosure.

FIG. 30 is a flow chart of a process of adjusting the closed state of the valve member to the correct position in the food waste disposer according to an embodiment of the disclosure. FIG. 31 is a flowchart illustrating a process of adjusting the open state of the valve member to the correct position in the food waste disposer according to an embodiment of the disclosure.

The process of the valve closed state correction operation the controller C will be described with reference to FIG. 30.

The controller C may detect whether the power of the food waste disposer 1 is turned on or off (5001).

In response to the food waste disposer 1 being turned on, the controller C may control the driving motor 650, 650*a*, or 650*b* to allow the driving motor 650, 650*a*, or 650*b* to be rotated in the first direction. Based on the control of the driving motor 650, 650*a*, or 650*b*, the power transmission member 630, 630*a*, or 630*b* and the holding member 640, 640*a*, or 640*b* may be rotated.

The holding member 640, 640*a*, or 640*b* or the power transmission member 630, 630*a*, or 630*b* may be in contact with the first sensor 660, 660*a*, or 660*b*. In response to the first sensor 660, 660*a*, or 660*b* coming into contact with the holding member 640, 640*a*, or 640*b* or the power transmission member 630, 630*a*, or 630*b*, the first sensor 660, 660*a*, or 660*b* may transmit a signal to the controller C.

The controller C may receive the signal from the first sensor 660, 660*a*, or 660*b* (5003).

In response to receiving the signal from the first sensor 660, 660a, or 660b, the controller C may control the driving motor 650, 650a or 650b to allow the driving motor 650, 650a or 650b to continue to rotate in the first direction.

The controller C may detect whether or not the first period of time T1 elapses since the controller C controls the driving motor 650, 650a or 650b by receiving the signal from the first sensor 660, 660a, or 660b (5005).

In response to the detection that the first period of time T1 elapses since the controller C controls the driving motor 650, 650a or 650b by receiving the signal from the first sensor 660, 660a, or 660b, the controller C may temporarily stop the driving motor 650, 650a or 650b and then control the driving motor 650, 650a or 650b to allow the driving motor 650, 650a or 650b to be rotated in the second direction (5006). The second direction may be movement in a direction opposite to the first direction.

The controller C may detect whether or not the second period of time T2 elapses since the controller C controls the driving motor 650, 650a or 650b to allow the driving motor 650, 650a or 650b to be rotated in the second direction (5007).

In response to the detection that the second period of time T2 elapses since the controller C controls the driving motor 650, 650a or 650b to be rotated in the second direction, the controller C may complete the valve closed state correction operation.

The process of the valve open state correction operation the controller C will be described with reference to FIG. 31.

The controller C may detect whether the food waste disposal process is completed (6001).

In response to receiving a completion signal of the food waste disposal process, the controller C may control the driving motor 650, 650a, or 650b to be rotated in the second direction (6002).

The controller C may receive a signal from the second sensor 670, 670a, or 670b (6003).

In response to receiving the signal from the second sensor 670, 670a, or 670b, the controller C may control the driving motor 650, 650a or 650b to allow the driving motor 650, 650a or 650b to continue to rotate in the second direction (6004).

The controller C may detect whether or not the third period of time T3 elapses since the controller C controls the driving motor 650, 650a or 650b by receiving the signal from the second sensor 670, 670a, or 670b (6005).

In response to the detection that the third period of time T3 elapses since the controller C controls the driving motor 650, 650a or 650b by receiving the signal from the second sensor 670, 670a, or 670b, the controller C may temporarily stop the driving motor 650, 650a or 650b and then control the driving motor 650, 650a or 650b to allow the driving motor 650, 650a or 650b to be rotated in the first direction (6006). The first direction may be movement in a direction opposite to the second direction.

The controller C may detect whether or not the fourth period of time T4 elapses since the controller C controls the driving motor 650, 650a or 650b to allow the driving motor 650, 650a or 650b to be rotated in the first direction (6007).

In response to the detection that the fourth period of time T4 elapses since the controller C controls the driving motor 650, 650a or 650b to be rotated in the first direction, the controller C may complete the valve open state correction operation.

As is apparent from the above description, a driving device may be controlled to allow open and closed states of a valve member to be implemented at a correct position regardless of assembly tolerances that may occur during an assembly process.

Although a few embodiments of the disclosure have been shown and described, it would be appreciated by those skilled in the art that changes may be made in these embodiments without departing from the principles and spirit of the disclosure, the scope of which is defined in the claims and their equivalents.

Although the present disclosure has been described with various embodiments, various changes and modifications may be suggested to one skilled in the art. It is intended that the present disclosure encompass such changes and modifications as fall within the scope of the appended claims.

What is claimed is:

1. A food waste disposer comprising:
a housing;
a grinding case positioned inside the housing to dispose of food waste, the grinding case including a discharge hole formed on a bottom surface;
a valve assembly mounted to a lower portion of the grinding case and including a valve member configured to open or close the discharge hole; and
a driving device positioned on one side of the valve assembly to operate the valve assembly,
wherein the driving device includes:
a driving motor configured to generate power;
a power transmission member connected to the driving motor and configured to move in a first direction and a second direction opposite to the first direction;
a holding member configured to rotate based on movement of the power transmission member, and connected to the valve member to guide an open or closed state of the valve member; and
a sensor in contact with the power transmission member; and
a controller configured to, in response to a signal being applied to the sensor as the power transmission member is moved in the first direction and in contact with the sensor, control the driving motor for a first period of time to allow the power transmission member to be further moved in the first direction.

2. The food waste disposer of claim 1, wherein
the driving device further includes a case to accommodate the holding member and includes an interference portion to interfere with the holding member, and,
the holding member contacts the interference portion in response to the power transmission member being moved in the first direction for the first period of time.

3. The food waste disposer of claim 1, wherein:
the controller is configured to temporarily stop the driving motor after the first period of time elapses, and to control the driving motor for a second period of time to allow the power transmission member to be moved in the second direction.

4. The food waste disposer of claim 3, wherein:
the valve member connected to the holding member is positioned at a correct position to close the discharge hole in response to the power transmission member being moved in the second direction for the second period of time.

5. The food waste disposer of claim 1, wherein:
the valve assembly includes a valve shaft configured to connect the valve member and the holding member;
the holding member includes a shaft through-groove opened upward to allow the valve shaft to be separated from the holding member in a first state in which the valve member closes the discharge hole.

6. The food waste disposer of claim 5, wherein:
the holding member further includes a holding body that accommodates the valve shaft to prevent the valve shaft from separating from the holding member in a second state in which the valve member opens the discharge hole.

7. The food waste disposer of claim 6, wherein:
the holding body includes a guide portion inclined outwardly of the shaft through-groove to guide insertion of the valve shaft.

8. The food waste disposer of claim 6, wherein:
the valve shaft is accommodated in the shaft through-groove to be spaced apart from the holding body by a predetermined distance.

9. The food waste disposer of claim 5, wherein:
the holding member is configured to rotate with respect to the valve shaft according to the movement of the power transmission member.

10. The food waste disposer of claim 1, wherein The power transmission member includes:
a pinion gear connected to the driving motor; and
a rack gear configured to be linearly moved by engaging with the pinion gear, and connected to the holding member to rotate the holding member.

11. The food waste disposer of claim 10, wherein
the sensor includes a detection switch protruding to be in contact with the rack gear.

12. The food waste disposer of claim 1, wherein the power transmission member includes:
a pinion gear; and
a detection member protruding from the pinion gear.

13. The food waste disposer of claim 12, wherein the detection member includes:
a first detection member protruding from a first surface that is perpendicular to a rotation axis of the pinion gear; and
a second detection member protruding from a second surface opposite to the first surface.

14. The food waste disposer of claim 13, further comprising
a first sensor positioned outside the pinion gear and in contact with the first detection member; and
a second sensor positioned inside the pinion gear and in contact with the second detection member.

15. The food waste disposer of claim 1, wherein
the sensor is a first sensor,
wherein the sensor further includes a second sensor,
wherein the controller is configured to, in response to a signal being applied to the second sensor as the power transmission member is moved in the second direction, control the driving motor for a third period of time to allow the power transmission member to be further moved in the second direction; and
in order to allow the valve member to be positioned at a correct position to open the discharge hole, the controller is configured to temporarily stop the driving motor after the third period of time elapses, and configured to control the driving motor for a fourth period of time to allow the power transmission member to be moved in the first direction.

16. A driving device for operating a valve assembly of a food waste disposer, the valve assembly including a valve shaft and a valve member connected to the valve shaft, the driving device comprising:
a driving motor configured to generate power;
a power transmission member connected to the driving motor and configured to move in a first direction and a second direction opposite to the first direction;
a holding member configured to rotate based on movement of the power transmission member, and to connect to the valve member to guide an open or closed state of the valve member; and
a sensor in contact with the power transmission member.

17. The driving device of claim 16, further comprising:
a case to accommodate the holding member; and
an interference portion to interfere with the holding member,
wherein the holding member contacts the interference portion in response to the power transmission member being moved in the first direction for a first period of time.

18. The driving device of claim 16, wherein the holding member includes:
a shaft through-groove opened upward to allow the valve shaft to be separated from the holding member in a first state in which the valve member is in the closed state.

19. The driving device of claim 18, wherein the holding member further includes a holding body configured to:
accommodate the valve shaft that is configured to connect the valve member and the holding member; and
prevent the valve shaft from separating from the holding member in a second state in which the valve member is in the open state.

20. The driving device of claim 16, wherein:
the holding member is configured rotate with respect to the valve shaft according to the movement of the power transmission member.

* * * * *